US012545919B2

(12) United States Patent
Khan et al.

(10) Patent No.: US 12,545,919 B2
(45) Date of Patent: Feb. 10, 2026

(54) METHODS OF SUGARCANE TRANSFORMATION USING MORPHOGENES

(71) Applicants: CENTRO DE TECNOLOGIA CANAVIEIRA S.A., São Paulo (BR); CTC Genomics, LLC, St. Louis, MO (US)

(72) Inventors: Tanveer Khan, São Paulo (BR); Valter Miotto Alessio, São Paulo (BR); Joao Paulo de Oliveira Correa, São Paulo (BR); Carlos Manuel Hernandez Garcia, St. Louis, MO (US); Viktoriya Coneva, St. Louis, MO (US); Chuanmei Zhu, St. Louis, MO (US)

(73) Assignees: Centro de Tecnologia Canavieira S.A., São Paulo (BR); CTC Genomics, LLC, St. Louis, MO (US)

( * ) Notice: Subject to any disclaimer, the term of this patent is extended or adjusted under 35 U.S.C. 154(b) by 0 days.

(21) Appl. No.: 18/742,420

(22) Filed: Jun. 13, 2024

(65) Prior Publication Data

US 2024/0318190 A1 Sep. 26, 2024

Related U.S. Application Data

(62) Division of application No. 17/504,264, filed on Oct. 18, 2021, now Pat. No. 12,049,634.

(Continued)

(51) Int. Cl.
*C12N 15/82* (2006.01)

(52) U.S. Cl.
CPC ................................ *C12N 15/8205* (2013.01)

(58) Field of Classification Search
None
See application file for complete search history.

(56) References Cited

U.S. PATENT DOCUMENTS

| | | | |
|---|---|---|---|
| 4,683,195 | A | 7/1987 | Mullis et al. |
| 4,683,202 | A | 7/1987 | Mullis |

(Continued)

FOREIGN PATENT DOCUMENTS

| | | | |
|---|---|---|---|
| EP | 116718 | A1 | 8/1984 |
| EP | 242246 | A1 | 10/1987 |

(Continued)

OTHER PUBLICATIONS

Lowe et al. "Rapid genotype independent *Zea mays* L. (maize) transformation via direct somatic embryogenesis" 2018 In Vitro Cells & Developmental Biology—Plant 54:240-252. (Year: 2018).*

(Continued)

*Primary Examiner* — Matthew R Keogh
*Assistant Examiner* — Rebecca Stephens
(74) *Attorney, Agent, or Firm* — MORRISON & FOERSTER LLP

(57) ABSTRACT

Aspects of the present disclosure relate to methods and compositions for sugarcane transformation using morphogenic genes. In particular, the present disclosure relates to the use of morphogenic sequences that improve the efficiency of sugarcane cell or tissue transformation and genomic modification. The present disclosure further relates to genetically altered sugarcane cells, tissues, and plants produced using these methods and compositions.

6 Claims, 9 Drawing Sheets

Specification includes a Sequence Listing.

Related U.S. Application Data

(60) Provisional application No. 63/092,950, filed on Oct. 16, 2020.

(56) References Cited

U.S. PATENT DOCUMENTS

| | | | |
|---|---|---|---|
| 4,800,159 | A | 1/1989 | Mullis et al. |
| 12,049,634 | B2 | 7/2024 | Khan et al. |
| 2017/0121722 | A1 | 5/2017 | Anand et al. |
| 2022/0135990 | A1 | 5/2022 | Khan et al. |

FOREIGN PATENT DOCUMENTS

| | | | |
|---|---|---|---|
| EP | 270822 | A1 | 6/1988 |
| WO | WO-1984002913 | A1 | 8/1984 |
| WO | WO-1996006932 | A1 | 3/1996 |
| WO | WO-1997048819 | A1 | 12/1997 |

OTHER PUBLICATIONS

Hoerster et al. "Use of non-integrating Zm-Wus2 vectors to enhance maize transformation" Jan. 2, 2020 In Vitro Cellular & Developmental Biology—Plant 56:265-279. (Year: 2020).*
Dafny-Yelin and Tzfira "Delivery of Multiple Transgenes to Plant Cells" 2007 Plant Physiology 145:1118-1128. (Year: 2007).*
Altschul et al., (1990). "Basic local alignment search tool," J. Mol. Biol., 215:403-410.
Altschul et al., (1997). "Gapped Blast and PSI-Blast: a new generation of protein database search programs," Nucl. Acids. Res., 25:3389-3402.
An et al., (1996). "Strong, constitutive expression of the *Arabidopsis* ACT2/ACT8 actin subclass in vegetative tissues," The Plant J, 10(1):107-121.
Boutilier et al., (2002). "Ectopic Expression of Baby Boom Triggers a Conversion from Vegetative to Embryonic Growth," Plant Cell, 14(8):1737-1749.
Brand et al., (2019). "*Arabidopsis* LEC1 and LEC2 Orthologous Genes Are Key Regulators of Somatic Embryogenesis in Cassava," Front Plant Sci, 10:673, 14 pages.
Chardin et al., (2014). "The plant RWP-RK transcription factors: key regulators of nitrogen responses and of gametophyte development," Journal of Experimental Botany, 65(19):5577-5587.
Cona et al., (2003). "Polyamine Oxidase, a Hydrogen Peroxide-Producing Enzyme, Is Up-Regulated by Light and Down-Regulated by Auxin in the Outer Tissues of the Maize Mesocotyl," Plant Physiology, 133:803-816.
Coussens et al., (2012). "Brachypodium distachyon promoters as efficient building blocks for transgenic research in maize," Journal of Experimental Botany, 63(11):4263-4273.
De Pater et al., (1992). "The promoter of the rice gene GOS2 is active in various different monocot tissues and binds rice nuclear factor ASF-1," The Plant J, 2(6):837-844.
Franck et al., (1980). "Nucleotide sequence of cauliflower mosaic virus DNA," Cell, 21(1):285-294.
Gardner et al., (1981). "The complete nucleotide sequence of an infectious clone of cauliflower mosaic virus by M13mp7 shotgun sequencing," Nucleic Acids Res, 9(12):2871-2888.
Gielen et al., (1984). "The complete nucleotide sequence of the TL-DNA of the Agrobacterium tumefaciens plasmid pTiAch5," EMBO J, 3:835-845.
Hecht et al., (2001). "The *Arabidopsis* Somatic Embryogenesis Receptor Kinase 1 Gene Is Expressed in Developing Ovules and Embryos and Enhances Embryogenic Competence in Culture," Plant Physiol., 127:803-816.
Horstman et al., (2017). "The Baby Boom Transcription Factor Activates the LEC1-ABI3-FUS3-LEC2 Network to Induce Somatic Embryogenesis," Plant Physiology, 175(2):848-857.
Iwase et al., (2011). "WIND1 a key molecular switch for plant cell dedifferentiation," Plant Signaling and Behavior, 6(12):1943-1945.
Iwase et al., (2017). "WIND1 Promotes Shoot Regeneration through Transcriptional Activation of Enhancer of Shoot Regeneration1 in *Arabidopsis*," Plant Cell, 29:54-69.
Karlin et al., (1990). "Methods for assessing the statistical significance of molecular sequence features by using general scoring schemes" PNAS USA, 87:2264-2268.
Karlin et al., (1993). "Applications and statistics for multiple high-scoring segments in molecular sequences," PNAS USA, 90:5873-5877.
Last et al., (1990). "pEmu: an improved promoter for gene expression in cereal cells," Theor Appl Genet, 81:581-588.
Lowe et al., (2016). "Morphogenic Regulators Baby boom and Wuschel Improve Monocot Transformation," Plant Cell, 28(9):1998-2015.
Nozaki et al., (2010). "an3-Mediated Compensation Is Dependent on a Cell-Autonomous Mechanism in Leaf Epidermal Tissue," Plant and Cell Phys, 61(6):1181-1190.
Ouakfaoui et al., (2010). "Control of somatic embryogenesis and embryo development by AP2 transcription factors," Plant Molecular Biology, 74(4-5):313-326.
Saiki et al., (1985). "Enzymatic Amplification of β-Globin Genomic Sequences and Restriction Site Analysis for Diagnosis of Sickle Cell Anemia," Science, 230:1350-1354.
Sinha et al., (1993). "Overexpression of the maize homeo box gene, Knotted-1, causes a switch from determinate to indeterminate cell fates," Genes Fev., 7:787-795.
Su et al., (2009). "Auxin-induced WUS expression is essential for embryonic stem cell renewal during somatic embryogenesis in *Arabidopsis*," Plant Journal, 59(3):448-460.
Szczygiel-Sommer et al., (2019). "The miR396-GRF Regulatory Module Controls the Embryogenic Response in *Arabidopsis* via an Auxin-Related Pathway," Int J Mol Sci, 20(20):5221, 18 pages.
Thakare et al., (2008). "The MADS-Domain Transcriptional Regulator Agamous-Like15 Promotes Somatic Embryo Development in *Arabidopsis* and Soybean," Plant Physiology, 146:1663-1672.
Velten et al., (1984). "Isolation of a dual plant promoter fragment from the Ti plasmid of Agrobacterium tumefaciens," EMBO J, 3(12):2723-2730.
Velten et al., (1985). "Selection-expression plasmid vectors for use in genetic transformation of higher plants," Nucleic Acids Res, 13(19):6981-6998.
Verdaguer et al., (1998). "Functional organization of the cassava vein mosaic virus (CsVMV) promoter," Plant Mol Biol, 37:1055-1067.
Waki et al., (2011). "The *Arabidopsis* RWP-RK protein RKD4 triggers gene expression and pattern formation in early embryogenesis," Curr Biol., 21(15):1277-1281.
Zhang et al., (1991). "Analysis of rice Act1 5' region activity in transgenic rice plants," The Plant Cell, 3:1155-1165.
Zuo et al., (2002). "The WUSCHEL gene promotes vegetative-to-embryonic transition in *Arabidopsis*," Plant Journal, 30(3):349-359.
Christensen et al., (1992). "Maize polyubiquitin genes: structure, thermal perturbation of expression and transcript splicing, and promoter activity following transfer to protoplasts by electroporation," Plant Mol Biol, 18(4):675-689.
Depicker et al., (1982). "Nopaline synthase: Transcript mapping and DNA sequence," J. Molec Appl Gen, 1:561-573.
Hull et al., (1978). "Structure of the cauliflower mosaic virus genome II. Variation in DNA structure and sequence between isolates," Virology, 86(2):482-493.
Liu et al., (2018). "Overexpression of the CsFUS3 gene encoding a B3 transcription factor promotes somatic embryogenesis in Citrus" Plant Sci, 277:121-131.
Schunmann et al., (2003). "A suite of novel promoters and terminators for plant biotechnology. II. The pPLEX series for use in monocots," Funct Plant Biol, 30(4):453-460.
Tsuwamoto et al., (2010). "*Arabidopsis* EmbryoMaker encoding an AP2 domain transcription factor plays a key role in developmental change from vegetative to embryonic phase," Plant Molecular Biology, 73(4-5):481-492.
Dafny-Yelin et al., (2007). "Delivery of Multiple Transgenes to Plant Cells," Plant Physiology, 145:1118-1128.

(56) References Cited

OTHER PUBLICATIONS

Hoerster et al., (2020). "Use of non-integrating Zm-Wus2 vectors to enhance maize transformation," In Vitro Cellular & Developmental Biology—Plant, 56:265-27.
Lowe et al., (2018). "Rapid genotype 'independent' *Zea mays* L. (maize) transformation via direct somatic embryogenesis," In Vitro Cells & Developmental Biology—Plant 54:240-252.
UniProtKB Accession A0A2T8ILJ3 entitled "RWP-RK domain-containing protein", version 9, dated Jul. 31, 2019.

* cited by examiner

*PhRKD4*

*ZmWUS* (+ control)

No morphogene (- control)

*ZmWUS* *RKD4*

FIG. 5E

METHODS OF SUGARCANE TRANSFORMATION USING MORPHOGENES

CROSS-REFERENCE TO RELATED APPLICATION

This application is a Divisional application of U.S. Ser. No. 17/504,264, filed on Oct. 18, 2021, which claims the benefit of U.S. Provisional Application No. 63/092,950, filed on Oct. 16, 2020, which is hereby incorporated by reference in its entirety.

REFERENCE TO AN ELECTRONIC SEQUENCE LISTING

The content of the electronic sequence listing (207422000110seqlist.xml; Size: 68,078 bytes; and Date of Creation: Jun. 11, 2024) is herein incorporated by reference in its entirety.

TECHNICAL FIELD

Aspects of the present disclosure relate to methods and compositions for sugarcane transformation using morphogenic genes. In particular, the present disclosure relates to the use of morphogenic sequences that improve the efficiency of sugarcane cell or tissue transformation and genomic modification. The present disclosure further relates to genetically altered sugarcane cells, tissues, and plants produced using these methods and compositions.

BACKGROUND

The complexity of the allopolyploid sugarcane genome has presented technical challenges in developing commercial cultivars using traditional breeding methods. Commercial sugarcane cultivars containing *Saccharum officinarum* and *S. spontaneum* genomes have over 100 chromosomes. Plant biotechnology and, more recently, genome editing, have presented opportunities to overcome these obstacles. However, even these more modern techniques present their own set of challenges.

Sugarcane is a vegetatively propagated crop that has a complex genome. Unlike in other row crops such as maize and soybean, the introduction (e.g., of transgenes) or alteration of genes (e.g., gene editing) cannot be done once in donor germplasm and then back-crossed into elite germplasm. Instead, elite sugarcane germplasm cells must be transformed or modified in order to develop new commercial cultivars, and transformation is required for both transgene and genome editing technology. Although the development of commercial sugarcane cultivars requires transformation, current transformation methods are not optimized for sugarcane. Further, as in other crop species, recalcitrance to tissue culture and transformation is observed in sugarcane, especially in elite varieties. In addition, recalcitrance to either genetic transformation and/or tissue culture and regeneration is highly genotype dependent.

There exists a clear need to develop an efficient method of sugarcane cell transformation and genomic modification and to decrease negative genotype-dependent effects on the process. There also exists a need to improve the efficiency of sugarcane genome modification. In order to satisfy the needs of a high-throughput commercial sugarcane biotechnology pipeline, new transformation and genomic modification methods and approaches are needed.

BRIEF SUMMARY

In order to meet these needs, the present disclosure provides methods and compositions for sugarcane transformation and genomic modification using morphogenic genes optimal for sugarcane. In particular, the present disclosure relates to the use of morphogenic sequences that improve the efficiency of sugarcane cell transformation and genomic modification. The present disclosure further relates to genetically altered sugarcane cells, tissues, and plants produced using these methods and compositions. The methods of the present disclosure reduces genotype dependence of transformation process, providing robust transformation and genomic modification protocols. Further, the methods of the present disclosure improve the number and quality of independent transgenic events per variety.

An aspect of the disclosure includes methods of producing a genetically altered sugarcane plant, including: (a) providing sugarcane cells or tissue; (b) introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 and at least one transgene nucleotide sequence to produce transgenic sugarcane cells; and (c) cultivating the transgenic sugarcane cells for proliferation and/or regeneration. Some embodiments of this aspect further include (d) cultivating the transgenic sugarcane cells into genetically altered plantlets; and (c) growing the genetically altered plantlets into genetically altered plants including the at least one transgene nucleotide sequence. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. Some embodiments of this aspect further include screening the sugarcane cells between steps (b) and (c), screening the sugarcane cells during step (c), or screening the sugarcane cells after step (c), and optionally further selecting the transgenic sugarcane cells between steps (b) and (c), or selecting the transgenic sugarcane cells after step (c), optionally by using selectable markers. In some embodiments of this aspect, step (b) is achieved through *Agrobacterium* transformation, microprojectile bombardments, nanoparticle delivery, viral delivery, or a combination thereof. In some embodiments of this aspect, a combination of morphogenes is used. In some embodiments, one morphogene nucleotide sequence, two morphogene nucleotide sequences, or three morphogene nucleotide sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one morphogene nucleotide sequence is introduced with a first vector and the at least one transgene nucleotide sequence is introduced with a second vector. In some embodiments of this aspect, the first vector includes a first promoter operably linked to the at least one morphogene nucleotide sequence, and the second vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene nucleotide sequence is introduced before the at least one transgene nucleotide sequence. In some embodiments of this aspect, the at least one morphogene nucleotide sequence is introduced at the same time as the at least one transgene nucleotide sequence. In some embodiments of this aspect, the at least one morphogene nucleotide sequence and the at least one transgene nucleotide sequence are co-introduced with a vector. In some embodiments of this aspect, the vector includes a first promoter operably linked to the at least one morphogene nucleotide sequence, and the vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the introduction of the at least one morphogene nucleotide sequence is transient. In some embodiments of this aspect, the genetically altered plant of step (e) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox. In some embodiments of this aspect, the method improves the number and quality of independent transgenic events per variety.

An additional aspect of the disclosure includes methods of producing a genetically altered sugarcane plant, including: (a) providing sugarcane cells or tissue; (b) introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 and at least one transgene nucleotide sequence to produce transgenic sugarcane cells; and (c) cultivating the transgenic sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect further include screening the sugarcane cells between steps (b) and (c), screening the sugarcane cells during step (c), or screening the sugarcane cells after step (c), and optionally further selecting the transgenic sugarcane cells between steps (b) and (c), or selecting the transgenic sugarcane cells after step (c), optionally by using selectable markers. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, a combination of morphogene proteins is used. In some embodiments, one morphogene protein sequence, two morphogene protein sequences, or three morphogene protein sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one transgene nucleotide sequence is introduced with a vector. In some embodiments of this aspect, the vector includes a promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene protein sequence is introduced through microprojectile bombardments or nanoparticle delivery. In some embodiments of this aspect, the at least one morphogene protein sequence is introduced before the at least one transgene nucleotide sequence. In some embodiments of this aspect, the at least one morphogene protein sequence is introduced at the same time as the at least one transgene nucleotide sequence. In some embodiments of this aspect, the introduction of the at least one morphogene protein sequence is transient. In some embodiments of this aspect, the genetically altered plant of step (d) does not include the at least one morphogene protein sequence. In some embodiments of this aspect, the method improves the number and quality of independent transgenic events per variety.

In some aspects, the present disclosure relates to a seed, plant part, or plant tissue from the genetically altered sugarcane plant of any of the above embodiments.

A further aspect of the disclosure includes methods of modifying the genome of a sugarcane cell, including (a) providing a sugarcane cell or tissue; (b) introducing a genome editing component, wherein the genome editing component targets one or more gene sequences in the sugarcane genome, and introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 into the sugarcane cell to produce a genetically modified sugarcane cell including one or more edited gene sequences; and (c) cultivating the genetically modified sugarcane cell for proliferation and/or regeneration. Some embodiments of this aspect further include (d) cultivating the genetically modified sugarcane cell into a genetically altered plantlet; and (e) growing the genetically altered plantlet into a genetically altered plant including the one or more edited gene sequences. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. Some embodiments of this aspect further include screening the sugarcane cell between steps (b) and (c), screening the sugarcane cell during step (c), or screening the sugarcane cell after step (c), and optionally further include selecting the genetically modified sugarcane cells between steps (b) and (c), or selecting the genetically modified sugarcane cell after step (c), optionally by using nucleotide-based screening methods or by using selectable markers. In some embodiments of this aspect, step (b) is achieved through *Agrobacterium* transformation, microprojectile bombardments, nanoparticle delivery, viral delivery, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, a combination of morphogenes is used. In some embodiments, one morphogene nucleotide sequence, two morphogene nucleotide sequences, or three morphogene nucleotide sequences are introduced in step (b). In some embodiments of this aspect, the genome editing component is introduced with a first vector and the at least one morphogene nucleotide sequence is introduced with a second vector. In some embodiments of this aspect, the first vector includes a first promoter operably linked to the genome editing component, and wherein the second vector includes a second promoter operably linked to the at least one morphogene nucleotide sequence. In some embodiments of this aspect, the first and second promoters are selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the genome editing component is introduced at the same time as the at least one morphogene nucleotide sequence. In some embodiments of this aspect, the genome editing component and the at least one morphogene nucleotide sequence are co-introduced with a vector. In some embodiments of this aspect, the vector includes a first promoter operably linked to the at least one morphogene nucleotide sequence, and the vector includes a second promoter operably linked to the genome editing component. In some embodiments of this aspect, the first and second promoters are selected from the group of a constitutive promoter, an inducible promoter, or a tissue-specific or cell-type-specific promoter. In some embodiments of this aspect, the introduction of the at least one morphogene nucleotide sequence is transient. In some embodiments of this aspect, the genetically altered plant of step (d) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox.

An additional aspect of the disclosure includes methods of modifying the genome of a sugarcane cell, including (a) providing a sugarcane cell or tissue; (b) introducing a genome editing component, wherein the genome editing component targets one or more gene sequences in the sugarcane genome, and introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 into the sugarcane cell to produce a genetically modified sugarcane cell including one or more edited gene sequences; and (c) cultivating the genetically modified sugarcane cells for proliferation and/or regeneration. Some embodiments of this aspect further include (d) cultivating the genetically modified sugarcane cell into a genetically altered plantlet; and (e) growing the genetically altered plantlet into a genetically altered plant including the one or more edited gene sequences. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect further include screening the sugarcane cells between steps (b) and (c), screening the sugarcane cells during step (c), or screening the sugarcane cells after step (c), and optionally further include selecting the genetically modified sugarcane cells between steps (b) and (c), or selecting the genetically modified sugarcane cells after step (c), optionally by using nucleotide-based screening methods or by using selectable markers. In some embodiments of this aspect, step (b) is achieved through Agrobacterium transformation, microprojectile bombardments, nanoparticle delivery, viral delivery, any other protein delivery technology, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, a combination of morphogenes is used. In some embodiments, one morphogene protein sequence, two morphogene protein sequences, or three morphogene protein sequences are introduced in step (b). In some embodiments of this aspect, the at least one morphogene protein sequence is introduced through microprojectile bombardments or nanoparticle delivery. In some embodiments of this aspect, the genome editing component is introduced with a vector. In some embodiments of this aspect, the vector includes a promoter operably linked to the genome editing component. In some embodiments of this aspect, the promoter is selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the at least one morphogene protein sequence is introduced before the genome editing component. In some embodiments of this aspect, the genome editing component is introduced at the same time as the at least one morphogene protein sequence. In some embodiments of this aspect, the introduction of the at least one morphogene protein sequence is transient. In some embodiments of this aspect, the genetically altered plant of step (d) does not include the at least one morphogene protein sequence.

Yet another aspect of the disclosure includes methods of increasing transformation efficiency of sugarcane cells, including (a) providing sugarcane cells or tissue; (b) introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 and at least one transgene nucleotide sequence into the sugarcane cells to produce transgenic sugarcane cells, wherein the transformation efficiency is increased as compared to a method of transforming sugarcane cells that does not use at least one morphogene nucleotide sequence; and (c) cultivating the transgenic sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. In some embodiments of this aspect, transformation efficiency is increased by at least 5% as compared to a method of transforming sugarcane cells that does not use at least one morphogene nucleotide sequence. In some embodiments of this aspect, transformation efficiency is increased by 50% to 100% as compared to a method of transforming sugarcane cells that does not use at least one morphogene nucleotide sequence. Some embodiments of this aspect further include screening the sugarcane cells between steps (b) and (c), s screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. In some embodiments of this aspect, step (b) is achieved through *Agrobacterium* transformation, microprojectile bombardments, nanoparticle delivery, viral delivery, or a combination thereof. In some embodiments of this aspect, a combination of morphogenes is used. In some embodiments, one morphogene nucleotide sequence, two morphogene nucleotide sequences, or three morphogene nucleotide sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one morphogene nucleotide sequence is introduced with a first vector and the at least one transgene nucleotide sequence is introduced with a second vector. In some embodiments of this aspect, the first vector includes a first promoter operably linked to the at least one morphogene nucleotide sequence, and the second vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene nucleotide sequence is introduced before the at least one transgene nucleotide sequence. In some embodiments of this aspect, the at least one morphogene nucleotide sequence is introduced at the same time as the at least one transgene nucleotide sequence. In some embodiments of this aspect, the at least one morphogene nucleotide sequence and the at least one transgene nucleotide sequence are co-introduced with a vector. In some embodiments of this aspect, the vector includes a first promoter operably linked to the at least one morphogene nucleotide sequence, and the vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the introduction of the at least one morphogene nucleotide sequence is transient. In some embodiments of this aspect, the genetically altered plant of step (d) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox. In some embodiments of this aspect, the method improves the number and quality of independent transgenic events per variety.

Still another aspect of the disclosure includes methods of increasing transformation efficiency of sugarcane cells, including (a) providing sugarcane cells or tissue; (b) introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 and at least one transgene nucleotide sequence into the sugarcane cells to produce transgenic sugarcane cells, wherein the transformation efficiency is increased as compared to a method of transforming sugarcane cells that does not use at least one morphogene protein sequence; and (c) cultivating the transgenic sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. In some embodiments of this aspect, transformation efficiency is increased by at least 5% as compared to a method of transforming sugarcane cells that does not use at least one morphogene protein sequence. In some embodiments of this aspect, transformation efficiency is increased by 50% to 100% as compared to a method of transforming sugarcane cells that does not use at least one morphogene protein sequence. Some embodiments of this aspect further include screening the sugarcane cells between steps (b) and (c), screening the plantlets after step (c), or screening the plants after step (d) to identify the transgene. Some embodiments of this aspect further include selecting the transgenic sugarcane cells between steps (b) and (c), or selecting the genetically altered plantlets after step (c), optionally by using selectable markers. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, a combination of morphogene proteins is used. In some embodiments, one morphogene protein sequence, two morphogene protein sequences, or three morphogene protein sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one transgene nucleotide sequence is introduced with a vector. In some embodiments of this aspect, the vector includes a promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene protein sequence is introduced through microprojectile bombardments or nanoparticle delivery. In some embodiments of this aspect, the at least one morphogene protein sequence is introduced before the at least one transgene nucleotide sequence. In some embodiments of this aspect, the at least one morphogene protein sequence is introduced at the same time as the at least one transgene nucleotide sequence. In some embodiments of this aspect, the introduction of the at least one morphogene protein sequence is transient. In some embodiments of this aspect, the genetically altered plant of step (e) does not include the at least one morphogene protein sequence. In some embodiments of this aspect, the method improves the number and quality of independent transgenic events per variety.

An additional aspect of the disclosure includes methods of increasing the genome editing rate of a genome of a sugarcane cell, including (a) providing a sugarcane cell; (b) introducing a genome editing component, wherein the genome editing component targets one or more gene sequences in the sugarcane genome, and introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 into the sugarcane cell to produce a genetically modified sugarcane cell including one or more edited gene sequences, wherein the genome editing rate is increased as compared to a method of genome editing that does not use at least one morphogene nucleotide sequence; (c) cultivating the genetically modified sugarcane cell for proliferation and/or regeneration. Some embodiments of this aspect further include (d) cultivating the genetically modified sugarcane cell into a genetically modified plantlet; and (e) growing the genetically modified plantlet into a genetically modified plant including one or more edited gene sequences. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. Some embodiments of this aspect further include screening the sugarcane cells between steps (b) and (c), screening the sugarcane cells during step (c), or screening the sugarcane cells after step (c), and optionally further include selecting the genetically modified sugarcane cells between steps (b) and (c), or selecting the genetically modified sugarcane cells after step (c), optionally by using nucleotide-based screening methods or by using selectable markers. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, a combination of morphogenes is used In some embodiments of this aspect a combination of morphogenes is used. In some embodiments, one morphogene nucleotide sequence, two morphogene nucleotide sequences, or three morphogene nucleotide sequences are introduced in step (b). In some embodiments of this aspect, the genome editing component is introduced with a first vector and the at least one morphogene nucleotide sequence is introduced with a second vector. In some embodiments of this aspect, the first vector includes a first promoter operably linked to the genome editing component, and wherein the second vector includes a second promoter operably linked to the at least one morphogene nucleotide sequence. In some embodiments of this aspect, the first and second promoters are selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the genome editing component is introduced before the at least one morphogene nucleotide sequence. In some embodiments of this aspect, the genome editing component is introduced at the same time as the at least one morphogene nucleotide sequence. In some embodiments of this aspect, the genome editing component is introduced after the at least one morphogene nucleotide sequence. In some embodiments of this aspect, the genome editing component and the at least one morphogene nucleotide sequence are co-introduced with a vector. In some embodiments of this aspect, the introduction of the at least one morphogene protein sequence is transient. In some embodiments of this aspect, the genetically altered plant of step (c) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox.

An additional aspect of the disclosure includes methods of increasing the genome editing rate of a genome of a sugarcane cell, including (a) providing a sugarcane cell or tissue; (b) introducing a genome editing component, wherein the genome editing component targets one or more gene sequences in the sugarcane genome, and introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 into the sugarcane cell to produce a genetically modified sugarcane cell including one or more edited gene sequences; and (c) cultivating the genetically modified sugarcane cells for proliferation and/or regeneration. Some embodiments of this aspect further include (d) cultivating the genetically modified sugarcane cell into a genetically altered plantlet; and (e) growing the genetically altered plantlet into a genetically altered plant including the one or more edited gene sequences. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect further include screening the sugarcane cells between steps (b) and (c), screening the sugarcane cells during step (c), or screening the sugarcane cells after step (c), and optionally further include selecting the genetically modified sugarcane cells between steps (b) and (c), or selecting the genetically modified sugarcane cells after step (c), optionally by using nucleotide-based screening methods. In some embodiments of this aspect, step (b) is achieved through

*Agrobacterium* transformation, microprojectile bombardments, nanoparticle delivery, viral delivery, any other protein delivery technology, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, a combination of morphogenes is used. In some embodiments, one morphogene protein sequence, two morphogene protein sequences, or three morphogene protein sequences are introduced in step (b). In some embodiments of this aspect, the at least one morphogene protein sequence is introduced through microprojectile bombardments or nanoparticle delivery. In some embodiments of this aspect, the genome editing component is introduced with a vector. In some embodiments of this aspect, the vector includes a promoter operably linked to the genome editing component. In some embodiments of this aspect, the promoter is selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the at least one morphogene protein sequence is introduced before the genome editing component. In some embodiments of this aspect, the genome editing component is introduced at the same time as the at least one morphogene protein sequence. In some embodiments of this aspect, the introduction of the at least one morphogene protein sequence is transient. In some embodiments of this aspect, the genetically altered plant of step (e) does not include the at least one morphogene protein sequence.

BRIEF DESCRIPTION OF THE DRAWINGS

FIG. 2A shows multiple options for the delivery of genome editing reagents to generate HR events. In the top row, the first option of a single construct containing genome editing reagents pSCBV-ScoLbCPF1-LWcrRNAarray-tAtHSP18, HR template, a fluorescent reporter pFMV-erGFP-tPin2A, a selectable marker pZmUbi-NPTII-T-Nos, and morphogenic genes is shown. In the second row from the top, the second option of a construct containing pSCBV-ScoLbCPF1-LWcrRNAarray-tAtHSP18, a fluorescent reporter pFMV-erGFP-tPin2A, a selectable marker pZmUbi-NPTII-T-Nos, and morphogenic genes with the HR template being delivered separately is shown. In the third row from the top, the third option of a construct containing a fluorescent reporter pFMV-erGFP-tPin2A, a selectable marker pZmUbi-NPTII-T-Nos, and morphogenic genes with the HR template being delivered separately and the genome editing reagents being delivered separately in the form of ribonucleoprotein (RNP) is shown. Each of the plasmids further contains a left border (LB) and right border (RB). In the bottom row, delivery methods are shown, with *Agrobacterium* transformation (Agro) for the first plasmid option and microprojectile bombardment (Bombardment) for all three options. Both delivery methods can be used with leaf disks or calli (plant material). FIG. 2B shows multiple options for the delivery of genome editing reagents to generate KO events. In the top row, the first option of a single construct containing genome editing reagents pSCBV-ScoLbCPF1-LWcrRNAarray-tAtHSP18, a fluorescent reporter pFMV-erGFP-tPin2A, a selectable marker pZmUbi-NPTII-T-Nos, and morphogenic genes is shown. In the middle row, the second option of a construct containing a fluorescent reporter pFMV-erGFP-tPin2A, a selectable marker pZmUbi-NPTII-T-Nos, and morphogenic genes with the genome editing reagents being delivered separately in the form of ribonucleoprotein (RNP) is shown. Each of the plasmids further contains a left border (LB) and right border (RB). In the bottom row, delivery methods are shown, with *Agrobacterium*transformation (Agro) for the first plasmid option and microprojectile bombardment (Bombardment) for both options. Both delivery methods can be used with leaf disks or calli (plant material).

FIG. 4A shows results from leaf disk transformation with the morphogenes *Brassica oleracea* LEC2 (BoLEC2, SEQ ID NO: 11), *Saccharum spontaneum* LEC2 (SsLEC2, SEQ ID NO: 10), *Brachypodium distachyon* EMK1/PLT2 (BdEMK1, SEQ ID NO: 12), *Panicum hallii* RKD4 (PhRKD4, SEQ ID NO: 14), and *Saccharum* spp. hybrid AGL15 (SsAGL15, AEQ ID NO: 1) were tested. FIG. 4B shows results from leaf disk transformation with the morphogenes *Brassica napus* AGL15 (BnAGL15, SEQ ID NO: 2), *Saccharum spontaneum* SERK1 (SsSERK1, SEQ ID NO: 15), *Oryza longistaminata* GRF5 (OlGRF5, SEQ ID NO: 8), *Saccharum spontaneum* GRF5 (SsGRF5, SEQ ID NO: 9), *Triticum urartu* BBM (TuBBM, SEQ ID NO: 4), and *Panicum hallii* WUS (PhWUS, SEQ ID NO: 20). In FIGS. 4A-4B, each experiment included a WUS control (positive control, data not shown) and a GFP control (negative control, without morphogene), as well as multiple morphogenes (indicated by legend below graph); the y-axis shows the percentage of disks with fluorescence (tdTomato or GFP) clusters on Day 21 after transformation; and the x-axis shows the control or the morphogene tested.

FIGS. 5A-5E show summary graphs of the results of callus transformation of a sugarcane variety considered highly recalcitrant variety for transformation as well as representative images of callus transformation of this variety. FIG. 5A shows a summary graph of the results of transformations of calli with the morphogenes *Panicum hallii* WUS (PhWUS, SEQ ID NO: 20), *Panicum hallii* RKD4 (PhRKD4, SEQ Id NO: 14), *Brassica oleracea* LEC2 (BoLEC2, SEQ ID NO: 11), and *Saccharum spontaneum* LEC2 (SsLEC2, SEQ ID NO: 10) were tested. FIG. 5B shows a summary graph of the results of transformations of calli with the morphogenes *Triticum urartu* BBM (TuBBM, SEQ ID NO: 4) and *Saccharum spontaneum* BBM (SsBBM, SEQ ID NO: 3) were tested. In FIGS. 5A-5B, each experiment included a WUS control (positive control, data not shown) and a GFP control (negative control, without morphogene), as well as multiple morphogenes (indicated by legend below graph); the y-axis expresses the percentage of disks with fluorescence (tdTomato or GFP) clusters on Day 30; and the x-axis shows the control or morphogene tested. Both summary graphs show results for a GFP control (negative control) as well as the candidate morphogenes. FIG. 5C shows fluorescence (RFP, top row) and brightfield (bottom row) images of the GFP negative control (No morphogene), *Zea mays* WUS (ZmWUS) positive control, *Panicum hallii* RKD4 (PhRKD4, SEQ ID NO: 14), and *Panicum hallii* WUS (PhWUS, SEQ ID NO: 20) transformations of individual calli. FIG. 5D shows fluorescence (RFP, top row) and brightfield (bottom row) images of the no morphogene (negative control), ZmWUS (positive control), and *Panicum hallii* RKD4 (PhRKD4, SEQ ID NO: 14) transformations of plates of calli on Day 40. FIG. 5E shows brightfield images of the ZmWUS (positive control), and *Panicum hallii* RKD4 (RKD4, SEQ ID NO: 14) transformations of plates of calli on Day 40.

DETAILED DESCRIPTION

Figure 1:
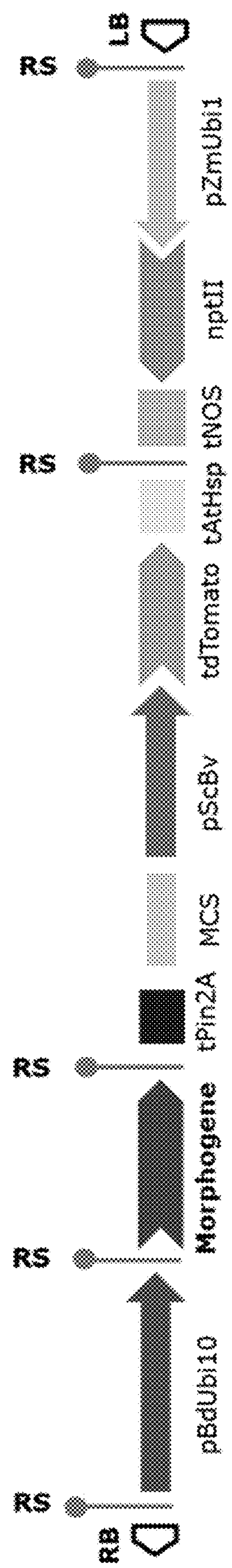
FIG. 1 shows a schematic of an expression cassette for co-introduction of a morphogene and a trait gene of interest on a single vector. The expression cassette contains the following: pBdUbi10::morphogene::tPin2A, where pBdUBi10 is the *Brachypodium distachyon* ubiquitin promoter, morphogene is a candidate morphogene, and tPin2A is the Pin2A terminator; pScBv::tdTomato::tAtHsp, where pScBv is the sugarcane bacilliform virus promoter, tdTomato is red fluorescent protein, and tAtHsp is the *Arabidopsis thaliana* heat shock protein (Hsp) terminator; and pZmUbi1::nptII::tNOS, where pZmUbi1 is the *Zea mays* ubiquitin promoter, nptII is the kanamycin resistance gene, and tNOS is the nopaline synthase terminator. The fluorescent protein tdTomato is an exemplary transgene that is used as a visual reporter for transgene integration, while the nptII gene is used as a selectable marker. In addition to these, the expression cassette includes a right border (RB), restriction sites (RS), multiple cloning site (MCS), and a left border (LB).

The following description sets forth exemplary methods, parameters, and the like. It should be recognized, however, that such description is not intended as a limitation on the scope of the present disclosure but is instead provided as a description of exemplary embodiments.

Methods of Producing Genetically Altered Plants

An aspect of the disclosure includes methods of producing a genetically altered sugarcane plant, including: (a) providing sugarcane cells or tissue; (b) introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 and at least one transgene nucleotide sequence to produce transgenic sugarcane cells; and (c) cultivating the transgenic sugarcane cells for proliferation and/or regeneration. In some embodiments of this aspect, the morphogene affects proliferation, regeneration, or both. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. Some embodiments of this aspect further include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. Some embodiments of this aspect further include screening the sugarcane cells between steps (b) and (c), screening the plantlets after step (d), or screening the plants after step (e) to identify the transgene. In some embodiments, screening may be done using PCR, ELISA, fluorescence detection, or other screening methods known in the art. Some embodiments of this aspect further include selecting the transgenic sugarcane cells between steps (b) and (c), or selecting the genetically altered plantlets after step (d), optionally by using selectable markers. These selectable markers may be nptII, BAR, EPSPS, and/or any other suitable selectable marker. In some embodiments of this aspect, step (b) is achieved through *Agrobacterium* transformation, microprojectile bombardments, nanoparticle delivery, or viral delivery. In some embodiments of this aspect, the at least one transgene nucleotide sequence encodes a protein selected from the group consisting of a fluorescent protein (e.g., GFP, CFP, dsRED, etc.), a herbicide resistance protein (e.g., CP4-EPSPS, BAR, ALS, etc.), an agronomic trait protein, and a disease/pest resistance protein (e.g., BT, Cry, VIP, etc.). In some embodiments, the agronomic trait includes a biomass trait, a sucrose trait, drought tolerance, a flowering trait, and/or an aluminum tolerance trait. In some embodiments of this aspect, a combination of morphogenes is used. In some embodiments, one morphogene nucleotide sequence, two morphogene nucleotide sequences, three morphogene nucleotide sequences, four morphogene nucleotide sequences, five morphogene nucleotide sequences, six morphogene nucleotide sequences, seven morphogene nucleotide sequences, eight morphogene nucleotide sequences, nine morphogene nucleotide sequences, ten morphogene nucleotide sequences, eleven morphogene nucleotide sequences, twelve morphogene nucleotide sequences, thirteen morphogene nucleotide sequences, fourteen morphogene nucleotide sequences, fifteen morphogene nucleotide sequences, sixteen morphogene nucleotide sequences, seventeen morphogene nucleotide sequences, eighteen morphogene nucleotide sequences, nineteen morphogene nucleotide sequences, or twenty morphogene nucleotide sequences are introduced in step (b). In some embodiments of this aspect, a combination of morphogenes is used. In some embodiments, one morphogene nucleotide sequence, two morphogene nucleotide sequences, or three morphogene nucleotide sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one morphogene nucleotide sequence is introduced with a first vector and the at least one transgene nucleotide sequence is introduced with a second vector. In some embodiments of this aspect, the first vector includes a first promoter operably linked to the at least one morphogene nucleotide sequence, and the second vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene nucleotide sequence is introduced before the at least one transgene nucleotide sequence. In some embodiments of this aspect, the at least one morphogene nucleotide sequence is introduced at the same time as the at least one transgene nucleotide sequence. In some embodiments of this aspect, the at least one morphogene nucleotide sequence is introduced after the at least one transgene nucleotide sequence. In some embodiments of this aspect, the at least one morphogene nucleotide sequence and the at least one transgene nucleotide sequence are co-introduced with a vector. In some embodiments of this aspect, the vector includes a first promoter operably linked to the at least one morphogene nucleotide sequence, and the vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments, the vector used for co-introduction includes the expression cassette shown in FIG. 1. In some embodiments of this aspect, the introduction of the at least one morphogene nucleotide sequence is transient. In some embodiments of this aspect, the genetically altered plant of step (e) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox. In some embodiments of this aspect, the method improves the number and quality of independent transgenic events per variety.

An additional aspect of the disclosure includes methods of producing a genetically altered sugarcane plant, including: (a) providing sugarcane cells or tissue; (b) introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 and at least one transgene nucleotide sequence to produce transgenic sugarcane cells; and (c) cultivating the transgenic sugarcane cells for proliferation and/or regeneration. In some embodiments of this aspect, the morphogene affects proliferation, regeneration, or both. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect further include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. Some embodiments of this aspect further include screening the sugarcane cells between steps (b) and (c), screening the plantlets after step (d), or screening the plants after step (e) to identify the transgene. Some embodiments of this aspect further include selecting the transgenic sugarcane cells between steps (b) and (c), or selecting the genetically altered plantlets after step (d), optionally by using selectable markers. These selectable markers may be nptII, BAR, EPSPS, and/or any other suitable selectable marker. In some embodiments, screening may be done using PCR, ELISA, fluorescence detection, sequencing, or other screening methods known in the art. In some embodiments of this aspect, step (b) is achieved through *Agrobacterium* transformation, microprojectile bombardments, nanoparticle delivery, or viral delivery. In some embodiments of this aspect, the at least one transgene nucleotide sequence encodes a protein selected from the group consisting of a fluorescent protein (e.g., GFP, CFP, dsRED, etc.), a herbicide resistance protein (e.g., CP4-EPSPS, BAR, ALS, etc.), an agronomic trait protein, and a disease/pest resistance protein (e.g., BT, Cry, VIP, etc.). In some embodiments, the agronomic trait includes a biomass trait, a sucrose trait, a flowering trait, drought tolerance, and/or an aluminum tolerance trait. In some embodiments, the transgene nucleotide sequence includes a BT nucleotide sequence, a Cry nucleotide sequence, or a VIP nucleotide sequence. In some embodiments of this aspect, a combination of morphogene proteins is used. In some embodiments, one morphogene protein sequence, two morphogene protein sequences, three morphogene protein sequences, four morphogene protein sequences, five morphogene protein sequences, six morphogene protein sequences, seven morphogene protein sequences, eight morphogene protein sequences, nine morphogene protein sequences, ten morphogene protein sequences, eleven morphogene protein sequences, twelve morphogene protein sequences, thirteen morphogene protein sequences, fourteen morphogene protein sequences, fifteen morphogene protein sequences, sixteen morphogene protein sequences, seventeen morphogene protein sequences, eighteen morphogene protein sequences, nineteen morphogene protein sequences, or twenty morphogene protein sequences are introduced in step (b). In some embodiments of this aspect, a combination of morphogene proteins is used. In some embodiments, one morphogene protein sequence, two morphogene protein sequences, or three morphogene protein sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide are introduced in step (b). In some embodiments of this aspect, the at least one transgene nucleotide sequence is introduced with a vector. In some embodiments of this aspect, the vector includes a promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene protein sequence is introduced through microprojectile bombardments or nanoparticle delivery. In some embodiments of this aspect, the at least one morphogene protein sequence is introduced before the at least one transgene nucleotide sequence. In some embodiments of this aspect, the at least one morphogene protein sequence is introduced at the same time as the at least one transgene nucleotide sequence. In some embodiments of this aspect, the at least one morphogene protein sequence is introduced after the at least one transgene nucleotide sequence. In some embodiments of this aspect, the introduction of the at least one morphogene protein sequence is transient. Most means of introducing protein sequences known in the art result in degradation of the protein over time (i.e., transient expression). In some embodiments of this aspect, the genetically altered plant of step (e) does not include the at least one morphogene protein sequence. In some embodiments of this aspect, the method improves the number and quality of independent transgenic events per variety.

The protocol of *Agrobacterium* transformation of a cell or tissue and subsequently regenerating it includes the following general stages: I: production or preparation of a cell or tissue (explant); II: transformation; III: co-cultivation (or co-culture) and rest; IV: selection; and V: regeneration and elongation. Stages II through V each require suitable culture media. Those skilled in the art are familiar with the composition of suitable culture media for the generation of transformable tissue (or transformable explant) (stage II: transformation), as well as the means of the co-cultivation stages (stage III: co-cultivation+rest), selection (stage IV: selection), and regeneration (stage V: regeneration+elongation). Preferably, the culture media used are based on compositions including ingredients such as MS salts (Murashige and Skoog, 1962), sucrose, and vitamins B5. Optionally, the following can also be added: amino acids selected from the group of proline and asparagine; casein hydrolysate; citric acid; mannitol; copper sulfate; glycine; gelling agent; auxins; antibiotics; acetosyringone; and selection agents. The use of hormones, e.g. auxins and/or cytokinins, are especially important in the steps of transformable tissue or transformable explant generation (stage I-II), co-cultivation (stage III) and selection (stage IV), as is the selection agents, e.g., ammonium glufosinate, in the selection medium (stage IV). Suitable explants for plant transformation includes, without limitation: callus, undifferentiated callus, immature and mature embryos, immature zygotic embryo, immature cotyledon, embryonic axis, suspension culture cells, protoplasts, leaf, leaf cells, leaf disks, root cells, phloem cells, pollen, seeds, suspension cultures, embryos, zygotic embryos, somatic embryos, embryogenic callus, meristem, somatic meristems, organogenic callus, protoplasts, leaf bases, leaves from mature plants, leaf tips, immature inflorescences, cotyledons, meristematic regions, cells from stems, cells from roots, cells from shoots, gametophytes, sporophytes, microspores, single cells and hypocotyl cells.

In some aspects, the present disclosure relates to a seed, plant part, or plant tissue from the genetically altered sugarcane plant of any of the above embodiments. In some embodiments, the plant part is selected from the group of leaf, stem, anther, pistil, root, fruit, flower, seed, cotyledon, hypocotyl, embryo, or meristematic cell. Plant parts include differentiated and undifferentiated tissues including, but not limited to, roots, stems, shoots, leaves, pollen, seeds.

In some aspects, the present disclosure relates to a pollen grain or an ovule of the genetically altered sugarcane plant of any of the above embodiments.

In some aspects, the present disclosure relates to a protoplast from the genetically altered sugarcane plant of any of the above embodiments.

In some aspects, the present disclosure relates to a tissue culture produced from protoplasts or cells from the genetically altered plant of any of the above embodiments. Plant cells can be differentiated or undifferentiated (e.g., callus, undifferentiated callus, immature and mature embryos, immature zygotic embryo, immature cotyledon, embryonic axis, suspension culture cells, protoplasts, leaf, leaf cells, root cells, phloem cells and pollen). Plant cells include, without limitation, cells from seeds, suspension cultures, explants, immature embryos, embryos, zygotic embryos, somatic embryos, embryogenic callus, meristem, somatic meristems, organogenic callus, protoplasts, leaf bases, leaves from mature plants, leaf tips, immature inflorescences, cotyledons, immature cotyledons, embryonic axes, meristematic regions, callus tissue, cells from leaves, cells from stems, cells from roots, cells from shoots, gametophytes, sporophytes, pollen and microspores. Plant cells further include various forms of cells in culture (e.g., single cells, protoplasts, embryos, and callus tissue), wherein the protoplasts or cells are produced from a plant part selected from the group of leaf, stem, anther, pistil, root, fruit, flower, seed, cotyledon, hypocotyl, embryo, or meristematic cell.

Sugarcane plants of the present disclosure include species and hybrids in the genus *Saccharum*, e.g., *Saccharum officinarum, Saccharum sinense, Saccharum barberi, Saccharum robustum, Saccharum spontaneum, Saccharum* spp., *Saccharum* spp. hybrid, etc. Methods of the present disclosure improve genotype independence of transformation methods.

In some aspects, the present disclosure relates to methods of producing genetically altered plants, wherein plant cells or tissue are used in place of sugarcane cells in any of the above methods. The plant cells or tissue may be derived from plants including, without limitations, corn (e.g., maize, *Zea mays*), barley (e.g., *Hordeum vulgare*), millet (e.g., finger millet, fonio millet, foxtail millet, pearl millet, barnyard millets, *Eleusine coracana, Panicum sumatrense, Panicum milaceum, Pennisetum glaucum, Digitaria* spp., *Echinocloa* spp.), oat (e.g., *Avena sativa*), rice (e.g., indica rice, japonica rice, aromatic rice, glutinous rice, *Oryza sativa, Oryza glaberrima*), rye (e.g., *Secale cereale, Secale cereanum*), sugarcane (e.g., *Saccharum* sp.), setaria (e.g., *Setaria italica, Setaria viridis*), *Brachypodium* sp., sorghum (e.g., *Sorghum bicolor*), teff (e.g., *Eragrostis tef*), triticale (e.g., X *Triticosecale* Wittmack, *Triticosecale schlanstedtense* Wittm., *Triticosecale neoblaringhemii* A. Camus, *Triticosecale neoblaringhemii* A. Camus), wheat (e.g., common wheat, spelt, durum, cinkorn, emmer, kamut, *Triticum aestivum, Triticum spelta, Triticum durum, Triticum urartu, Triticum monococcum, Triticum turanicum, Triticum*spp.), switchgrass (e.g., *Panicum virgatum*), Brassica sp., tobacco (e.g., *Nicotiana benthamiana, Nicotiana tabacum*), peanut (*Arachis hypogaea*), banana (*Musa* sp.), potato (*Solanum tuberosum*), strawberry (*Fragaria ananassa*), coffee (*Coffea arabica*), cotton (*Gossypium hirsutum*), tomato (*Solanum lycopersicum*) or any other polyploid and/or vegetatively propagated plant species.

Methods of Improving the Efficiency of Transformation

Transformation frequency (TF) or transformation efficiency (TE) in general, is measured at two stages in the transformation process: (1) Transient transformation frequency and (2) Stable transformation frequency. Transient transformation frequency represents the efficiency of gene delivery. It is calculated as the percentage of explants expressing a marker gene (e.g., fluorescent markers such as GFP, CFP, dsRED, etc., or GUS gene). This is measured in the beginning of the transformation process. Stable transformation frequency is the percentage of explants producing transgenic events. It is calculated at the end of the transformation process. There are many different ways to calculate TF. In many plant species, the explant is definite-sized and countable (e.g., cotyledons in soybean, hypocotyl segments in cotton). In this case, TF is calculated based on the number of explants used, i.e., the percentage of explants producing transgenic events. In most monocot plant species (e.g., rice, maize, sugarcane), embryogenic callus pieces are used as explants. In the case of callus, TF is calculated in two ways. The first is a calculation based on the number of callus pieces used (size is a variable), i.e., the percentage of explants producing transgenic events. The second is a calculation based on the weight of the callus tissue used (e.g., TF per gram callus tissue). In the sugarcane embodiments of the present disclosure, TF is calculated based on the number of callus pieces used for transformation.

Methods and compositions for improving the efficiency of sugarcane cell transformation are provided herein. Cell transformation can be achieved using *Agrobacterium* transformation, microprojectile bombardment, nanoparticle delivery, viral delivery, or other methods of plant cell transformation known to those skilled in the art. Cell transformation may use vectors, and may either be transient or stable. When the transformation is stable, the vector containing the morphogene expression cassette may also contain means for excising the morphogene such that it is no longer present or expressed in the resultant sugarcane plant or to control its expression, e.g., inducible promoters and/or tissue specific promoters. Excision can be achieved using Cre-Lox recombination or other inducible excision systems known in the art. The sugarcane cells to be transformed can be leaf disc cells, callus cells, protoplast cells, or any sugarcane cells or tissues receptive to the introduction and uptake of heterogenous DNA, RNA, or protein.

In one embodiment of the disclosure, a morphogene and a trait gene of interest are co-introduced via sugarcane cell transformation in an expression cassette on a single vector (e.g., the expression cassette of FIG. 1). In another embodiment of the disclosure, the morphogene and trait gene of interest are introduced in expression cassettes on separate vectors. In yet another embodiment of the disclosure, two or more morphogenes can be co-introduced along with the trait gene of interest. In one embodiment of the disclosure, the two or more morphogenes can be introduced on a single vector. In another embodiment of the disclosure, the two or more morphogenes can be introduced on separate vectors.

The co-introduced morphogene is encoded by a polynucleotide selected from the group of SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, or SEQ ID NO: 20. These polynucleotides encode the polypeptides of SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40. Each of these morphogenes belongs to a protein family that has been described as being involved in processes of plant morphogenesis or regeneration (see "Morphogenes" section, below). The morphogenes of the present disclosure were selected based upon both their sequence similarity to polynucleotides encoding known proteins of morphogene families and the presence of key protein domain motifs suggesting functionality. The selection process is described in more detail in Example 1, below.

Figure 2A:
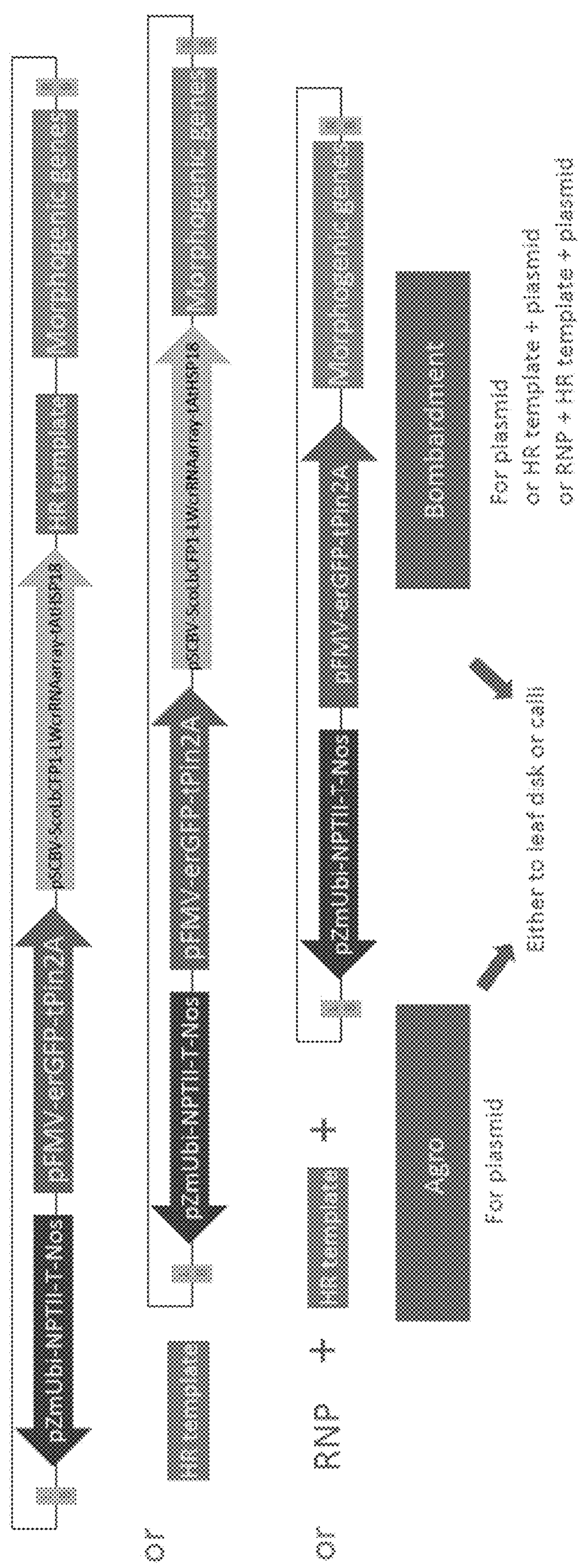
FIGS. 2A-2B show schematics for the delivery of genome editing reagents to generate homologous recombination (HR) events or knockout (KO) events.
Figure 2B:
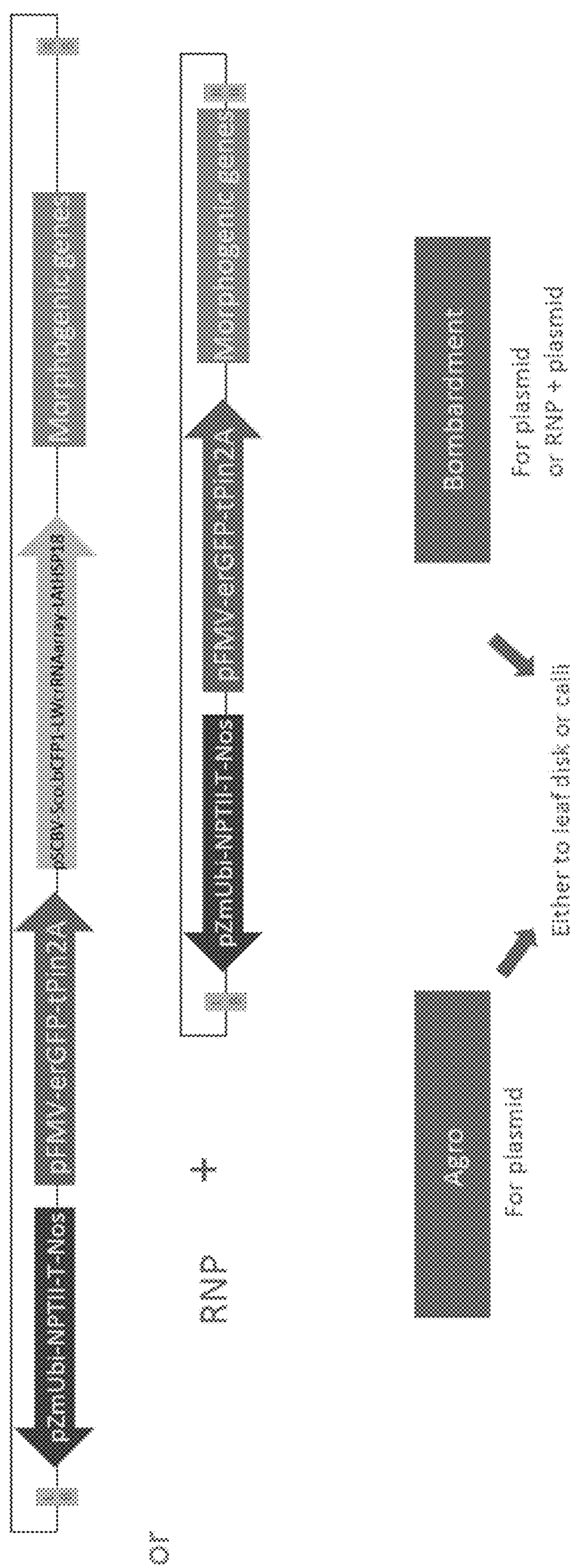
Figure 3:
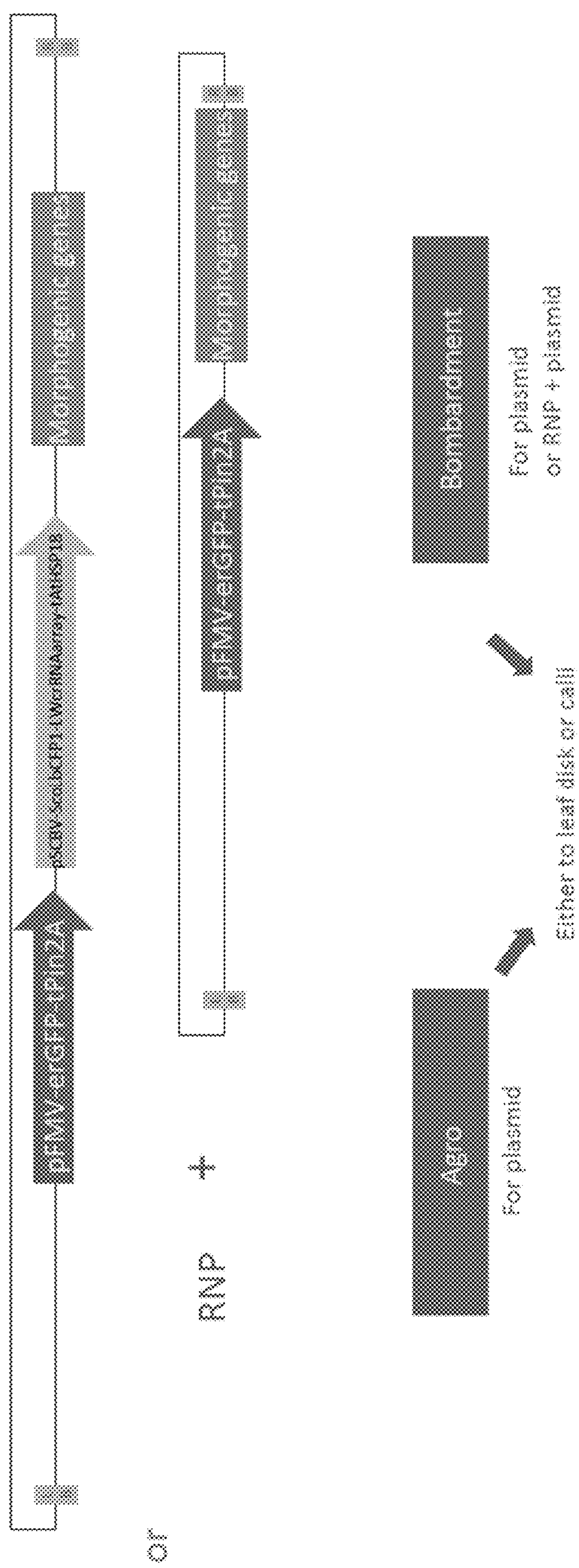
FIG. 3 shows schematics for the delivery of genome editing reagents to generate transgene-free knockout (KO) events. In the top row, the first option of a single construct containing genome editing reagents pSCBV-ScoLbCPF1-LWcrRNAarray-tAtHSP18, a fluorescent reporter pFMV-erGFP-tPin2A, and morphogenic genes is shown. In the middle row, the second option of a construct containing a fluorescent reporter a fluorescent reporter pFMV-erGFP-tPin2A and morphogenic genes, with the genome editing reagents being delivered separately in the form of ribonucleoprotein (RNP) is shown. Each of the plasmids further contains a left border (LB) and right border (RB). In the bottom row, delivery methods are shown, with *Agrobacterium* transformation (Agro) for the first plasmid option and microprojectile bombardment (Bombardment) for both options. Both delivery methods can be used with any explant types, including but not limited to leaf disks or calli (plant material).

A further aspect of the disclosure includes methods of modifying the genome of a sugarcane cell, including (a) providing a sugarcane cell or tissue; (b) introducing a genome editing component, wherein the genome editing component targets one or more gene sequences in the sugarcane genome, and introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 into the sugarcane cell to produce a genetically modified sugarcane cell including one or more edited gene sequences; and (c) cultivating the genetically modified sugarcane cell for proliferation and/or regeneration. In some embodiments of this aspect, the morphogene affects proliferation, regeneration, or both. Some embodiments of this aspect further include (d) cultivating genetically modified sugarcane cell into a genetically altered plantlet; and (e) growing the genetically altered plantlet into a genetically altered plant including the one or more edited gene sequences. Some embodiments of this aspect further include screening the sugarcane cell between steps (b) and (c), screening the sugarcane cell during step (c), or screening the sugarcane cell after step (c), and optionally further including selecting the genetically modified sugarcane cell between steps (b) and (c), or selecting the genetically modified sugarcane cell after step (c), optionally by using selectable markers. Some embodiments of this aspect further include screening the sugarcane cell between steps (b) and (c), screening the plantlet after step (d), or screening the plans after step (e) to identify the edited gene sequence. In some embodiments, screening may be done using PCR, ELISA, fluorescence detection, sequencing, or other screening methods known in the art. Some embodiments of this aspect further include selecting the genetically modified sugarcane cell between steps (b) and (c), or selecting the genetically modified plantlet after step (d), optionally by using selectable markers. These selectable markers may be nptII, BAR, EPSPS, and/or any other suitable selectable marker. In some embodiments of this aspect, step (b) is achieved through *Agrobacterium* transformation, microprojectile bombardments, nanoparticle delivery, or viral delivery. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, the gene sequences are agronomic trait gene sequences, herbicide resistance gene sequences (e.g., CP4-EPSPS, BAR, ALS, etc.), or disease/pest resistance gene sequences (e.g., BT, Cry, VIP, etc.). Agronomic traits include biomass, sucrose content, flowering time, drought tolerance, and aluminum tolerance. In some embodiments of this aspect, a combination of morphogenes is used. In some embodiments, one morphogene nucleotide sequence, two morphogene nucleotide sequences, three morphogene nucleotide sequences, four morphogene nucleotide sequences, five morphogene nucleotide sequences, six morphogene nucleotide sequences, seven morphogene nucleotide sequences, eight morphogene nucleotide sequences, nine morphogene nucleotide sequences, ten morphogene nucleotide sequences, eleven morphogene nucleotide sequences, twelve morphogene nucleotide sequences, thirteen morphogene nucleotide sequences, fourteen morphogene nucleotide sequences, fifteen morphogene nucleotide sequences, sixteen morphogene nucleotide sequences, seventeen morphogene nucleotide sequences, eighteen morphogene nucleotide sequences, nineteen morphogene nucleotide sequences, or twenty morphogene nucleotide sequences are introduced in step (b). In some embodiments of this aspect, a combination of morphogenes is used. In some embodiments, one morphogene nucleotide sequence, two morphogene nucleotide sequences, or three morphogene nucleotide sequences are introduced in step (b). FIGS. 2A-2B show options for generating homologous recombination (HR) or knockout (KO) events, and provide vector components that may be used in some embodiments of this aspect. FIG. 3 shows options for generating transgene-free knockout events, and provide vector components that may be used in some embodiments of this aspect. In some embodiments of this aspect, the genome editing component is introduced with a first vector and the at least one morphogene nucleotide sequence is introduced with a second vector. In some embodiments of this aspect, the first vector includes a first promoter operably linked to the genome editing component, and wherein the second vector includes a second promoter operably linked to the at least one morphogene nucleotide sequence. In some embodiments of this aspect, the first and second promoters are selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the genome editing component is introduced before the at least one morphogene nucleotide sequence. In some embodiments of this aspect, the genome editing component is introduced at the same time as the at least one morphogene nucleotide sequence. In some embodiments of this aspect, the genome editing component is introduced after as the at least one morphogene nucleotide sequence. In some embodiments of this aspect, the genome editing component and the at least one morphogene nucleotide sequence are co-introduced with a vector. In some embodiments of this aspect, the vector includes a first promoter operably linked to the at least one morphogene nucleotide sequence, and the vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the vector used for co-introduction includes the expression cassette of FIG. 1. In some embodiments of this aspect, the introduction of the at least one morphogene nucleotide sequence is transient. In some embodiments of this aspect, the genetically altered plant of step (e) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox.

An additional aspect of the disclosure includes methods of modifying the genome of a sugarcane cell, including (a) providing a sugarcane cell or tissue; (b) introducing a genome editing component, wherein the genome editing component targets one or more gene sequences in the sugarcane genome, and introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 into the sugarcane cell to produce a genetically modified sugarcane cell including one or more edited gene sequences; and (c) cultivating the genetically modified sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect further include screening the sugarcane cells between steps (b) and (c), screening the sugarcane cells during step (c), or screening the sugarcane cells after step (c), and optionally further include selecting the genetically modified sugarcane cells between steps (b) and (c), or selecting the genetically modified sugarcane cells after step (c), optionally by using nucleotide-based screening methods or by using selectable markers. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, a combination of morphogenes is used. In some embodiments, one morphogene protein sequence, two morphogene protein sequences, or three morphogene protein sequences are introduced in step (b). In some embodiments of this aspect, the at least one morphogene protein sequence is introduced through microprojectile bombardments or nanoparticle delivery. In some embodiments of this aspect, the genome editing component is introduced with a vector. In some embodiments of this aspect, the vector includes a promoter operably linked to the genome editing component. In some embodiments of this aspect, the promoter is selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the at least one morphogene protein sequence is introduced before the genome editing component. In some embodiments of this aspect, the genome editing component is introduced at the same time as the at least one morphogene protein sequence. In some embodiments of this aspect, the introduction of the at least one morphogene protein sequence is transient. In some embodiments of this aspect, the genetically altered plant of step (e) does not include the at least one morphogene protein sequence.

Yet another aspect of the disclosure includes methods of increasing transformation efficiency of sugarcane cells, including (a) providing sugarcane cells or tissue; (b) introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 and at least one transgene nucleotide sequence into the sugarcane cells to produce transgenic sugarcane cells, wherein the transformation efficiency is increased as compared to a method of transforming sugarcane cells that does not use at least one morphogene nucleotide sequence; and (c) cultivating the transgenic sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. Some embodiments of this aspect include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. In some embodiments of this aspect, transformation efficiency is increased by at least 5% as compared to a method of transforming sugarcane cells that does not use at least one morphogene nucleotide sequence. In some embodiments of this aspect, transformation is increased by 5%, 6%, 7%, 8%, 9%, 10%, 11%, 12%, 13%, 14%, 15%, 16%, 17%, 18%, 19%, 20%, 21%, 22%, 23%, or 24%. In some embodiments of this aspect, transformation efficiency is increased by 50% to 100% as compared to a method of transforming sugarcane cells that does not use at least one morphogene nucleotide sequence. The increase in efficiency provided by the present methods represents a significant improvement over present methods, as some recalcitrant sugarcane varieties have less than 1% of transformation efficiency without the use of morphogenes. Some embodiments of this aspect further include screening the sugarcane cells between steps (b) and (c), screening the plantlets after step (d), or screening the plants after step (e) to identify the transgene. In some embodiments, screening may be done using PCR, ELISA, fluorescence detection, sequencing, or other screening methods known in the art. Some embodiments of this aspect further include selecting the transgenic sugarcane cells between steps (b) and (c), or selecting the genetically altered plantlets after step (d), optionally by using selectable markers. These selectable markers may be nptII, BAR, EPSPS, and/or any other suitable selectable marker. In some embodiments of this aspect, step (b) is achieved through *Agrobacterium* transformation, microprojectile bombardments, nanoparticle delivery, viral delivery, or a combination thereof. In some embodiments of this aspect, the at least one transgene nucleotide sequence encodes a protein selected from the group consisting of a fluorescent protein (e.g., GFP, CFP, dsRED, etc.), a herbicide resistance protein (e.g., CP4-EPSPS, BAR, ALS, etc.), an agronomic trait protein, and a disease/pest resistance protein (e.g., BT, Cry, VIP, etc.). In some embodiments, the agronomic trait includes a biomass trait, a sucrose trait, a flowering trait, drought tolerance, and/or an aluminum tolerance trait. In some embodiments, the transgene nucleotide sequence includes a *Baccilus thuringiensis* toxin (BT) nucleotide sequence, a Cry nucleotide sequence, or a VIP nucleotide sequence. In some embodiments of this aspect, a combination of morphogenes is used. In some embodiments, one morphogene nucleotide sequence, two morphogene nucleotide sequences, three morphogene nucleotide sequences, four morphogene nucleotide sequences, five morphogene nucleotide sequences, six morphogene nucleotide sequences, seven morphogene nucleotide sequences, eight morphogene nucleotide sequences, nine morphogene nucleotide sequences, ten morphogene nucleotide sequences, eleven morphogene nucleotide sequences, twelve morphogene nucleotide sequences, thirteen morphogene nucleotide sequences, fourteen morphogene nucleotide sequences, fifteen morphogene nucleotide sequences, sixteen morphogene nucleotide sequences, seventeen morphogene nucleotide sequences, eighteen morphogene nucleotide sequences, nineteen morphogene nucleotide sequences, or twenty morphogene nucleotide sequences are introduced in step (b). In some embodiments of this aspect, a combination of morphogenes is used. In some embodiments, one morphogene nucleotide sequence, two morphogene nucleotide sequences, or three morphogene nucleotide sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one morphogene nucleotide sequence is introduced with a first vector and the at least one transgene nucleotide sequence is introduced with a second vector. In some embodiments of this aspect, the first vector includes a first promoter operably linked to the at least one morphogene nucleotide sequence, and the second vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene nucleotide sequence is introduced before the at least one transgene nucleotide sequence. In some embodiments of this aspect, the at least one morphogene nucleotide sequence is introduced at the same time as the at least one transgene nucleotide sequence. In some embodiments of this aspect, the at least one morphogene nucleotide sequence is introduced after the at least one transgene nucleotide sequence. In some embodiments of this aspect, the at least one morphogene nucleotide sequence and the at least one transgene nucleotide sequence are co-introduced with a vector. In some embodiments of this aspect, the vector includes a first promoter operably linked to the at least one morphogene nucleotide sequence, and the vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the introduction of the at least one morphogene nucleotide sequence is transient. In some embodiments of this aspect, the genetically altered plant of step (e) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox. In some embodiments of this aspect, the method improves the number and quality of independent transgenic events per variety.

Still another aspect of the disclosure includes methods of increasing transformation efficiency of sugarcane cells, including (a) providing sugarcane cells or tissue; (b) introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 and at least one transgene nucleotide sequence into the sugarcane cells to produce transgenic sugarcane cells, wherein the transformation efficiency is increased as compared to a method of transforming sugarcane cells that does not use at least one morphogene protein sequence; and (c) cultivating the transgenic sugarcane cells for proliferation and regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. In some embodiments of this aspect, transformation efficiency is increased by at least 5% as compared to a method of transforming sugarcane cells that does not use at least one morphogene protein sequence. In some embodiments of this aspect, transformation is increased by 5%, 6%, 7%, 8%, 9%, 10%, 11%, 12%, 13%, 14%, 15%, 16%, 17%, 18%, 19%, 20%, 21%, 22%, 23%, or 24%. In some embodiments of this aspect, transformation efficiency is increased by 50% to 100% as compared to a method of transforming sugarcane cells that does not use at least one morphogene protein sequence. The increase in efficiency provided by the present methods represents a significant improvement over present methods, as some recalcitrant sugarcane varieties have less than 1% of transformation efficiency without the use of morphogenes. Some embodiments of this aspect further include screening the sugarcane cells between steps (b) and (c), screening the plantlets after step (d), or screening the plants after step (e) to identify the transgene. In some embodiments, screening may be done using PCR, ELISA, fluorescence detection, or other screening methods known in the art. Some embodiments of this aspect further include selecting the transgenic sugarcane cells between steps (b) and (c), or selecting the genetically altered plantlets after step (d), optionally by using selectable markers. These selectable markers may be nptII, BAR, EPSPS, and/or any other suitable selectable marker. The use of morphogenes may enhance the antibiotic concentration used in the selection step after transformation, because cells containing morphogenes have a higher proliferation and maturation post-transformation, which supports higher antibiotic concentrations. The use of higher antibiotic concentrations avoids escapes and increases the probability of finding high quality transformation events. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, the at least one transgene nucleotide sequence encodes a protein selected from the group consisting of a fluorescent protein (e.g., GFP, CFP, dsRED, etc.), a herbicide resistance protein (e.g., CP4-EPSPS, BAR, ALS, etc.), an agronomic trait protein, and a disease/pest resistance protein (e.g., BT, Cry, VIP, etc.). In some embodiments of this aspect, a combination of morphogene proteins is used. In some embodiments, one morphogene protein sequence, two morphogene protein sequences, three morphogene protein sequences, four morphogene protein sequences, five morphogene protein sequences, six morphogene protein sequences, seven morphogene protein sequences, eight morphogene protein sequences, nine morphogene protein sequences, ten morphogene protein sequences, eleven morphogene protein sequences, twelve morphogene protein sequences, thirteen morphogene protein sequences, fourteen morphogene protein sequences, fifteen morphogene protein sequences, sixteen morphogene protein sequences, seventeen morphogene protein sequences, eighteen morphogene protein sequences, nineteen morphogene protein sequences, or twenty morphogene protein sequences are introduced in step (b). In some embodiments of this aspect, one morphogene protein sequence, two morphogene protein sequences, or three morphogene protein sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one transgene nucleotide sequence is introduced with a vector. In some embodiments of this aspect, the vector includes a promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene protein sequence is introduced through microprojectile bombardments or nanoparticle delivery. In some embodiments of this aspect, the at least one morphogene protein sequence is introduced before the at least one transgene nucleotide sequence. In some embodiments of this aspect, the at least one morphogene protein sequence is introduced at the same time as the at least one transgene nucleotide sequence. In some embodiments of this aspect, the at least one morphogene protein sequence is introduced after the at least one transgene nucleotide sequence. In some embodiments of this aspect, the introduction of the at least one morphogene protein sequence is transient. Most means of introducing protein sequences known in the art result in degradation of the protein over time (i.e., transient expression). In some embodiments of this aspect, the genetically altered plant of step (e) does not include the at least one morphogene protein sequence.

The protocol of *Agrobacterium* transformation of a cell or tissue and subsequently regenerating it includes the following general stages: I: production or preparation of a cell or tissue (explant); II: transformation; III: co-cultivation (or co-culture) and rest; IV: selection; and V: regeneration and elongation. Stages II through V each require suitable culture media. Those skilled in the art are familiar with the composition of suitable culture media for the generation of transformable tissue (or transformable explant) (stage II: transformation), as well as the means of the co-cultivation stages (stage III: co-cultivation+rest), selection (stage IV: selection), and regeneration (stage V: regeneration+elongation). Preferably, the culture media used are based on compositions including ingredients such as MS salts (Murashige and Skoog, 1962), sucrose, and vitamins B5. Optionally, the following can also be added: amino acids selected from the group of proline and asparagine; casein hydrolysate; citric acid; mannitol; copper sulfate; glycine; gelling agent; auxins; antibiotics; acetosyringone; and selection agents. The use of hormones, e.g. auxins and/or cytokinins, are especially important in the steps of transformable tissue or transformable explant generation (stage I-II), co-cultivation (stage III) and selection (stage IV), as is the selection agents, e.g., ammonium glufosinate, in the selection medium (stage IV). Suitable explants for plant transformation includes, without limitation: callus, undifferentiated callus, immature and mature embryos, immature zygotic embryo, immature cotyledon, embryonic axis, suspension culture cells, protoplasts, leaf, leaf cells, leaf disks, root cells, phloem cells, pollen, seeds, suspension cultures, embryos, zygotic embryos, somatic embryos, embryogenic callus, meristem, somatic meristems, organogenic callus, protoplasts, leaf bases, leaves from mature plants, leaf tips, immature inflorescences, cotyledons, meristematic regions, cells from stems, cells from roots, cells from shoots, gametophytes, sporophytes, microspores, single cells and hypocotyl cells.

Sugarcane plants of the present disclosure include species and hybrids in the genus *Saccharum*, e.g., *Saccharum officinarum, Saccharum sinense, Saccharum barberi, Saccharum robustum, Saccharum spontaneum, Saccharum* spp., *Saccharum* spp. hybrid, etc. Methods of the present disclosure improve genotype independence of transformation methods.

In some aspects, the present disclosure relates to methods of increasing transformation efficiency wherein plant cells are used in place of sugarcane cells in any of the above methods. The plant cells may be derived from plants including corn (e.g., maize, *Zea mays*), barley (e.g., *Hordeum vulgare*), millet (e.g., finger millet, fonio millet, foxtail millet, pearl millet, barnyard millets, *Eleusine coracana, Panicum sumatrense, Panicum milaceum, Pennisetum glaucum, Digitaria* spp., *Echinocloa* spp.), oat (e.g., *Avena sativa*), rice (e.g., indica rice, japonica rice, aromatic rice, glutinous rice, *Oryza sativa, Oryza glaberrima*), rye (e.g., *Secale cereale, Secale cereanum*), sugarcane (e.g., *Saccharum* sp.), setaria (e.g., *Setaria italica, Setaria viridis*), *Brachypodium* sp., sorghum (e.g., *Sorghum bicolor*), teff (e.g., *Eragrostis tef*), triticale (e.g., X *Triticosecale* Wittmack, *Triticosecale schlanstedtense* Wittm., *Triticosecale neoblaringhemii* A. Camus, *Triticosecale neoblaringhemii* A. Camus), wheat (e.g., common wheat, spelt, durum, einkorn, emmer, kamut, *Triticum aestivum, Triticum spelta, Triticum durum, Triticum urartu, Triticum monococcum, Triticum turanicum, Triticum* spp.), switchgrass (e.g., *Panicum virgatum*), *Brassica* sp., or tobacco (e.g., *Nicotiana benthamiana, Nicotiana tabacum*), peanut (*Arachis hypogaea*), banana (*Musa* sp.), potato (*Solanum tuberosum*), strawberry (*Fragaria ananassa*), coffee (*Coffea arabica*), cotton (*Gossypium hirsutum*), tomato (*Solanum lycopersicum*) or any other polyploid and/or vegetatively propagated plant species.

Genome Editing and Methods of Increasing the Genome Editing Rate or Genome Editing Efficiency Some aspects of the disclosure relate to editing or modifying the sugarcane genome. Suitable plant material (explants) for genome editing includes sugarcane cells (e.g., in cell cultures) or sugarcane tissues (e.g., in plants; plant parts). Suitable explants for plant genome editing include, without limitation: callus, undifferentiated callus, immature and mature embryos, immature zygotic embryo, immature cotyledon, embryonic axis, suspension culture cells, protoplasts, leaf, leaf cells, leaf disks, root cells, phloem cells, pollen, seeds, suspension cultures, embryos, zygotic embryos, somatic embryos, embryogenic callus, meristem, somatic meristems, organogenic callus, protoplasts, leaf bases, leaves from mature plants, leaf tips, immature inflorescences, cotyledons, meristematic regions, cells from stems, cells from roots, cells from shoots, gametophytes, sporophytes, microspores, single cells, and hypocotyl cells. Genome editing targets include genes, introns, non-coding sequences (e.g., miRNAs), and regulatory elements (e.g., promoters). Multiple genome editing types may be used including knock-out editing, knock-in editing, homologous recombination, site-directed integration, base editing, or prime editing. Similarly, multiple genome editing components may be used. In a preferred embodiment, the genome engineering component includes a CRISPR system, preferably a CRISPR/Cas9 or a CRISPR/Cpf1 system, and a targeting sequence. Genome engineering components may be delivered in multiple formats including via plasmids or using a ribonucleoprotein (RNP) complex.

Specific genome editing components may be preferred for specific genome editing types. In a preferred embodiment, the genome editing reagent for knock-out (KO) editing is a plasmid containing a Cas gene (Cas9 or Cpf1) and its crRNA. For knock-in editing mediated by homologous recombination (HR), a homologous template in the format of a plasmid may be delivered in addition to Cas and crRNA. In a further embodiment, a homologous template in the format of dsDNA or ssDNA may be delivered in addition to Cas and crRNA. For homologous recombination, the HR template may be delivered on the same plasmid (co-delivery) or a separate plasmid as that of the genome editing reagent.

Similarly, specific delivery methods may be preferred for specific genome editing approaches. In some embodiments, genome editing reagents and morphogenes may be delivered using the same plasmid (co-delivery). In some embodiments, morphogenes may be delivered on a separate plasmid from the plasmid on which the genome editing reagent is delivered. In embodiments where morphogenes and genome editing reagents are delivered in plasmid(s), either *Agrobacterium* transformation or particle bombardment may be used for delivery. In some embodiments that include RNP being used to deliver genome engineering components and/or an HR template being delivered in a separate plasmid, particle bombardment or nanoparticles may be used. In some embodiments, for crop species where protoplasts are used, RNP may be used for protoplast transfection. In some embodiments, templates may be delivered in the form of oligonucleotides (i.e., without the use of plasmids).

Genome editing rate and/or genome editing efficiency may be determined by the number of alleles containing the mutation of interest as determined by methods including restriction fragment length polymorphism (RFLP), next generation sequencing (NGS), PCR, Sanger sequencing, etc. as a percentage of total alleles analyzed after exposure to the genome editing reagent. For loss-of-function mutations, cell phenotyping methodologies such as Western blot or fluorescence analysis can also be used to determine if the synthesis of a protein or the function of a protein has been disrupted due to the editing of a target gene. Gene editing efficiency is generally determined by methods such as NGS, ddPCR, and PCR. Morphogenes can impact gene editing efficiency in different ways, by increasing transformation frequency, or extending cell proliferation phase, thereby increasing gene editing rates. In the case of HR, the native machinery is more active in dividing cells, and it is hypothesized that morphogenes increase HR efficiency because of their effect on cell divisions. Otherwise, the effect of morphogenes can be through breaking recalcitrance during the cell cycle (TC) and transcription (TXN).

An additional aspect of the disclosure includes methods of increasing the genome editing rate and/or genome editing efficiency of a genome of a sugarcane cell, including (a) providing a sugarcane cell; (b) introducing a genome editing component, wherein the genome editing component targets one or more gene sequences in the sugarcane genome, and introducing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20 into the sugarcane cell to produce a genetically modified sugarcane cell including one or more edited gene sequences, wherein the genome editing rate and/or genome editing efficiency is increased as compared to a method of genome editing that does not use at least one morphogene nucleotide sequence; and (c) cultivating the genetically modified sugarcane cells for proliferation and/or regeneration. Some embodiments of this aspect further include (d) cultivating the genetically modified sugarcane cell into a genetically modified plantlet; and (e) growing the genetically modified plantlet into a genetically modified plant including one or more edited gene sequences. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. Some embodiments of this aspect further include screening the sugarcane cells between steps (b) and (c), screening the plantlets after step (d), or screening the plants after step (e) to identify the edited genes. Some embodiments of this aspect further include selection of genetically modified sugarcane cells between steps (b) and (c), or selection of genetically modified plantlets after step (d), optionally by using nucleotide-based screening methods or by using selectable markers. In some embodiments of this aspect, step (b) is achieved through *Agrobacterium* transformation, microprojectile bombardments, nanoparticle delivery, viral delivery, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, the gene sequences are agronomic trait gene sequences. Agronomic traits include biomass, sucrose content, flowering time, drought tolerance, and aluminum tolerance. In some embodiments of this aspect, a combination of morphogenes is used. In some embodiments, one morphogene nucleotide sequence, two morphogene nucleotide sequences, or three morphogene nucleotide sequences are introduced in step (b). In some embodiments of this aspect, the genome editing component is introduced with a first vector and the at least one morphogene nucleotide sequence is introduced with a second vector. In some embodiments of this aspect, the first vector includes a first promoter operably linked to the genome editing component, and wherein the second vector includes a second promoter operably linked to the at least one morphogene nucleotide sequence. In some embodiments of this aspect, the first and second promoters are selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the genome editing component is introduced before the at least one morphogene nucleotide sequence. In some embodiments of this aspect, the genome editing component is introduced at the same time as the at least one morphogene nucleotide sequence. In some embodiments of this aspect, the genome editing component is introduced after the at least one morphogene nucleotide sequence. In some embodiments of this aspect, the genome editing component and the at least one morphogene nucleotide sequence are co-introduced with a vector. In some embodiments of this aspect, the vector includes a first promoter operably linked to the at least one morphogene nucleotide sequence, and the vector includes a second promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the introduction of the at least one morphogene nucleotide sequence is transient. In some embodiments of this aspect, the genetically altered plant of step (e) does not include the at least one morphogene nucleotide sequence. Some embodiments of this aspect include the introduction of the at least one morphogene being stable, and the at least one morphogene being excised from the sugarcane cell after delivery in step (b). Excision methods known in the art are used for excision, e.g., Cre-Lox.

An additional aspect of the disclosure includes methods of increasing the genome editing rate and/or genome editing efficiency, including (a) providing a sugarcane cell or tissue; (b) introducing a genome editing component, wherein the genome editing component targets one or more gene sequences in the sugarcane genome, and introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 into the sugarcane cell to produce a genetically modified sugarcane cell including one or more edited gene sequences; and (c) cultivating the genetically modified sugarcane cells for proliferation and/or regeneration. Some embodiments of this aspect further include (d) cultivating the genetically modified sugarcane cell into a genetically altered plantlet; and (e) growing the genetically altered plantlet into a genetically altered plant including the one or more edited gene sequences. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect further include screening the sugarcane cells between steps (b) and (c), screening the sugarcane cells during step (c), or screening the sugarcane cells after step (c), and optionally further include selecting the genetically modified sugarcane cells between steps (b) and (c), or selecting the genetically modified sugarcane cells after step (c), optionally by using nucleotide-based screening methods or by using selectable markers. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, the genome editing component is a CRISPR/Cas enzyme encoding sequence and a targeting sequence. In some embodiments of this aspect, the genome editing includes knock out editing, homologous recombination, site-directed integration, base editing, or prime editing. In some embodiments of this aspect, a combination of morphogenes is used. In some embodiments, one morphogene protein sequence, two morphogene protein sequences, or three morphogene protein sequences are introduced in step (b). In some embodiments of this aspect, the at least one morphogene protein sequence is introduced through microprojectile bombardments or nanoparticle delivery. In some embodiments of this aspect, the genome editing component is introduced with a vector. In some embodiments of this aspect, the vector includes a promoter operably linked to the genome editing component. In some embodiments of this aspect, the promoter is selected from the group of a constitutive promoter, an inducible promoter, or a tissue-specific or cell-type-specific promoter. In some embodiments of this aspect, the genome editing component is introduced with a ribonucleoprotein (RNP). In some embodiments of this aspect, the at least one morphogene protein sequence is introduced before the genome editing component. In some embodiments of this aspect, the genome editing component is introduced at the same time as the at least one morphogene protein sequence. In some embodiments of this aspect, the introduction of the at least one morphogene protein sequence is transient. In some embodiments of this aspect, the genetically altered plant of step (e) does not include the at least one morphogene protein sequence.

The protocol of *Agrobacterium* transformation of a cell or tissue and subsequently regenerating it includes the following general stages: I: production or preparation of a cell or tissue (explant); II: transformation; III: co-cultivation (or co-culture) and rest; IV: selection; and V: regeneration and elongation. Stages II through V each require suitable culture media. Those skilled in the art are familiar with the composition of suitable culture media for the generation of transformable tissue (or transformable explant) (stage II: transformation), as well as the means of the co-cultivation stages (stage III: co-cultivation+rest), selection (stage IV: selection), and regeneration (stage V: regeneration+elongation). Preferably, the culture media used are based on compositions including ingredients such as MS salts (Murashige and Skoog, 1962), sucrose, and vitamins B5. Optionally, the following can also be added: amino acids selected from the group of proline and asparagine; casein hydrolysate; citric acid; mannitol; copper sulfate; glycine; gelling agent; auxins; antibiotics; acetosyringone; and selection agents. The use of hormones, e.g. auxins and/or cytokinins, are especially important in the steps of transformable tissue or transformable explant generation (stage I-II), co-cultivation (stage III) and selection (stage IV), as is the selection agent, e.g., ammonium glufosinate, in the selection medium (stage IV). Suitable explants for plant transformation includes, without limitation: callus, undifferentiated callus, immature and mature embryos, immature zygotic embryo, immature cotyledon, embryonic axis, suspension culture cells, protoplasts, leaf, leaf cells, leaf disks, root cells, phloem cells, pollen, seeds, suspension cultures, embryos, zygotic embryos, somatic embryos, embryogenic callus, meristem, somatic meristems, organogenic callus, protoplasts, leaf bases, leaves from mature plants, leaf tips, immature inflorescences, cotyledons, meristematic regions, cells from stems, cells from roots, cells from shoots, gametophytes, sporophytes, microspores, single cells and hypocotyl cells.

Sugarcane plants of the present disclosure include species and hybrids in the genus *Saccharum*, e.g., *Saccharum officinarum, Saccharum sinense, Saccharum barberi, Saccharum robustum, Saccharum spontaneum, Saccharum* spp., *Saccharum* spp. hybrid, etc. Methods of the present disclosure improve genotype independence of transformation methods.

In some aspects, the present disclosure relates to methods of increasing the genome editing rate or genome editing efficiency wherein plant cells are used in place of sugarcane cells in any of the above methods. The plant cells may be derived from plants including corn (e.g., maize, *Zea mays*), barley (e.g., *Hordeum vulgare*), millet (e.g., finger millet, fonio millet, foxtail millet, pearl millet, barnyard millets, *Eleusine coracana, Panicum sumatrense, Panicum miliaceum, Pennisetum glaucum, Digitaria* spp., *Echinocloa* spp.), oat (e.g., *Avena sativa*), rice (e.g., indica rice, japonica rice, aromatic rice, glutinous rice, *Oryza sativa, Oryza glaberrima*), rye (e.g., *Secale cereale, Secale cereanum*), sugarcane (e.g., *Saccharum* sp.), setaria (e.g., *Setaria italica, Setaria viridis*), *Brachypodium* sp., sorghum (e.g., *Sorghum bicolor*), teff (e.g., *Eragrostis tef*), triticale (e.g., X *Triticosecale* Wittmack, *Triticosecale schlanstedtense* Wittm., *Triticosecale neoblaringhemii* A. Camus, *Triticosecale neoblaringhemii* A. Camus), wheat (e.g., common wheat, spelt, durum, einkorn, emmer, kamut, *Triticum aestivum, Triticum spelta, Triticum durum, Triticum urartu, Triticum monococcum, Triticum turanicum, Triticum* spp.), switchgrass (e.g., *Panicum virgatum*), *Brassica* sp., tobacco (e.g., *Nicotiana benthamiana, Nicotiana tabacum*), peanut (*Arachis hypogaea*), banana (*Musa* sp.), potato (*Solanum tuberosum*), strawberry (*Fragaria ananassa*), coffee (*Coffea arabica*), cotton (*Gossypium hirsutum*), tomato (*Solanum lycopersicum*) or any other polyploid and/or vegetatively propagated plant species.

Morphogenes

Morphogenes are genes that have been functionally demonstrated to improve somatic embryogenesis and/or regeneration. The methods of this disclosure utilize homologs and orthologs of these morphogene families from various grass species to improve the process of plant cell transformation.

The plant cells may be derived from plants including corn (maize), barley, millet, oat, rice, rye, sugarcane (e.g., *Saccharum* sp.), *Setaria* sp., *Brachypodium* sp., *Sorghum* sp., teff, switchgrass, triticale, wheat, *Brassica* sp., tobacco, peanut (*Arachis hypogaea*), banana (*Musa* sp.), potato (*Solanum tuberosum*), strawberry (*Fragaria ananassa*), coffee (*Coffea arabica*), cotton (*Gossypium hirsutum*), tomato (*Solanum lycopersicum*) or any other polyploid and/or vegetatively propagated plant species. The plant cells may also be derived from other monocot and dicot plant species. The methods of this disclosure may be particularly suited for transformation and genetic modification of recalcitrant species.

Morphogenes can also be used to increase transformation and regeneration efficiency of genome editing using a transgenic approach. Any combination of morphogenes may be used in the methods of the present disclosure. Improved efficiency is important for proof of concept studies, such as validating functions of candidate trait genes. Proof of concept studies may use model systems such as maize embryos, which allow highly quantitative assessment of reporter expression, protoplasts or plant tissues such as leaf disks, which allow quick preliminary evaluation.

Increased transformation and regeneration efficiency is especially important for the types of genome editing that have low editing efficiency, such as knock in editing mediated by homologous recombination. Specifically, morphogenes can be co-delivered with genome editing reagents and a selectable marker to sugarcane leaf disks or sugarcane callus to increase the transformation and regeneration efficiency of genome editing, and then selection can be used to identify the edited plants. In a preferred embodiment, the genome editing reagent for knock-out (KO) editing is a plasmid containing a Cas gene (Cas9 or Cpf1) and its crRNA. In another embodiment, the genome editing reagents are delivered using a ribonucleoprotein (RNP) complex. For knock-in editing mediated by homologous recombination (HR), a homologous template in the format of a plasmid is delivered in addition to Cas and crRNA. In a further embodiment, a homologous template in the format of dsDNA or ssDNA is delivered in addition to Cas and crRNA. If genome editing reagents are delivered in a plasmid format, morphogenes may be included in the same plasmid. In an additional embodiment, morphogenes are delivered on a separate plasmid from that of the genome editing reagent. The HR template may be delivered in the same plasmid or a separate plasmid as that of the genome editing reagent too. Morphogenes with genome editing reagents in plasmid(s) may be delivered by *Agrobacterium* transformation or particle bombardment. When RNP is used and/or when an HR template is used in a separate plasmid, particle bombardment may be used for delivery. Options for genome editing approaches are shown in FIGS. 2A-2B.

Morphogenes may also be used to increase transformation and regeneration efficiency of genome-edited events in a transgene-free way. This procedure is similar to what is described above, but without a selectable marker for the selection step. Instead, genome-edited events are detected directly, e.g., by using a PCR-based approach. This transgene-free approach is critical for event production with commercial traits and for the case of deregulation. Further details of this approach are described in Example 6. Options for transgene-free genome editing approaches are shown in FIG. 3.

The aspects of transformation improved by morphogenes include early cell proliferation, faster cell proliferation, faster maturation post-transformation, and faster regeneration. Overall, morphogenes shorten the transformation process and result in higher transformation rates. In addition, morphogenes allow alternative plant materials to be used, for example direct transformation of leaf tissue instead of, e.g., callus. While beneficial during the transformation process, stable introgression of a morphogene may negatively impact plant development, so morphogenes are preferably excised after introduction or delivered transiently.

The following genes from *Arabidopsis thaliana* have been characterized as morphogenes. SHOOT-MERISTEMLESS (STM; *A. thaliana* gene At1g62360) is a KNOX1-KNOX2-ELK-homeobox transcription factor that acts in the same pathway as WUS to maintain indeterminate cell fate at meristems. When overexpressed in *Z. mays*, STM has been demonstrated to induce a switch from determinate to indeterminate cell fates (Sinha et al., 1993, Genes Fev. 7:787-795). WUSCHEL (WUS; *A. thaliana* gene At2g17950) is a homeobox domain transcription factor that has been shown to promote a transition from vegetative cell to embryonic cell in *A. thaliana*, and that is required for the establishment of the shoot meristem during embryogenesis (Zuo et al., et al., 2002, Plant Journal 30(3):349-359; Su et al., 2009, Plant Journal 59(3):448-460). Overexpression of WUS promotes/maintains embryonic potential during somatic embryogenesis. GROWTH-REGULATING FACTOR 5 (GRF5*; A. thaliana* gene At3g13960) has a QLQ-WRC domain, and has been shown to regulate cell proliferation in leaf primordia cells of *A. thaliana* (Horiguchi et al., 2005, Plant and Cell Phys 61(6):1181-1190). When GRF5 is overexpressed, organ size is increased. WOUND INDUCED DEDIFFERENTIATION1 (WIND1; also known as RAP2.4*; A. thaliana* gene At1g78080) is an AP2 domain transcription factor that has been shown to promote both cell dedifferentiation and cell proliferation at plant wound sites in *A. thaliana*. When overexpressed, WIND1 induces somatic embryogenesis in *A. thaliana* (Iwase et al., 2011, Plant Signaling and Behavior 6(12):1943-1945). ENHANCER OF SHOOT REGENERATION1 (ESR1; *A. thaliana* gene At1g12980) is an AP2 domain protein that is activated during shoot regeneration in *A. thaliana*, and when overexpressed, induces callus formation at wound sites (Iwase et al., 2017, Plant Cell 29:54-69). WIND1 binds to and activates the ESR1 promoter.

BABY BOOM (BBM; *A. thaliana* gene At5g17430) is an AP2/ERF transcription factor that has been demonstrated to activate downstream genes (LEC1, ABI3, FUS3, and LEC2) to induce somatic embryogenesis. BBM overexpression has been shown to induce somatic embryogenesis and hormone-free regeneration in *A. thaliana* and *Brassica napus* (Boutilier et al., 2002, Plant Cell 14(8):1737-1749; Horstman et al., 2017, Plant Physiology 175:848-857), PLETHORA2 (PLT2; *A. thaliana* gene At1g51190) is an AP2 domain transcription factor that has been implicated in embryo development, and that induces somatic embryogenesis in a dose- and explant-dependent manner (Ouakfaoui et al., 2010, Plant Molecular Biology 74(4-5):313-326; Szczygieł-Sommer and Gaj, 2019, Int J Mol Sci 20(20):5221).), EMBRYOMAKER/AINTEGUMENTA-like 5/PLETHORA5 (EMK/AIL5/PLT5; *A. thaliana* gene At5g57390) is closely related to PLT2, and is also an AP2 domain protein that induces somatic embryogenesis in a dose- and explant-dependent manner (Tsuwamoto et al., 2010 Plant Molecular Biology 73(4-5):481-492). LEAFY COTYLEDON (LEC2; *A. thaliana* gene At1g28300) is a B3 domain transcription factor that induces embryo development in *A. thaliana*. LEC1 and LEC2 orthologous genes were shown to be key regulators of somatic embryogenesis in *Manihot esculenta* (Brand et al., 2019, Front Plant Sci, doi.org/10.3389/fpls.2019.00673) and a related B3 transcription factor gene was shown to promote somatic embryogenesis in citrus (Liu, 2018, Plant Sci 277:121-131). AGAMOUS-LIKE 15 (AGL15; *A. thaliana* gene At5g13790) is a MADS-box transcription factor that has been shown to maintain the embryogenic potential of plant cells. When overexpressed, AGL15 induces somatic embryogenesis in *A. thaliana* and *Glycine max* (Harding et al., 2003, Plant Physiology 133:803-816; Thakare et al., 2008, Plant Physiology 146:1663-1672). RWP-RK DOMAIN-CONTAINING 4 (RKD4; *A. thaliana* gene At5g53040) is a RWP-RK transcription factor involved in early embryogenesis that induces somatic embryogenesis in *A. thaliana* (Waki et al., 2014, 21(15):1277-1281). SOMATIC EMBRYOGENESIS RECEPTOR KINASE 1 (SERK1; *A. thaliana* gene At1g71830) is a transmembrane protein with LRR domains that enhances embryogenic competence in culture. Specifically, overexpression of SERK1 has been demonstrated to increase the efficiency of somatic embryogenesis in *A. thaliana* cell culture. (Hecht et al., 2001, Plant Physiol., 127:803-816).

"Altruistic" Delivery Methods

Certain aspects of the present disclosure relate to methods of morphogene delivery described as "altruistic" delivery methods. In some embodiments, altruistic delivery includes separate production of morphogene proteins and exogenous application of the morphogene proteins or any other compound derived as the result of the overexpression morphogene to the transformation process (e.g., addition of morphogene proteins to tissue culture or transformation media). In some embodiments, altruistic delivery includes co-culture of the target cells/tissues (cells/tissues for transformation or genome editing) with transgenic "feeder" cells or tissue culture, wherein the feeder culture produces morphogene proteins that are released into the transformation media. Cells undergoing transformation in which altruistic delivery methods are used do not need to simultaneously express both the morphogenes and the transgene of interest. Similarly, there is no need to remove morphogene expression after the transformation process, e.g., via transient expression or subsequent excision of morphogenes. These methods allow full utilization of the benefits of morphogene use (e.g., early cell proliferation, faster cell proliferation, faster maturation post-transformation, faster regeneration, shorter transformation process, higher transformation rates), while avoiding the potential detriments of morphogenes (e.g., possible negative impact on plant development).

In some embodiments, altruistic delivery methods use secreted proteins produced from downstream signaling pathways initiated by morphogenes. In some embodiments, altruistic delivery methods use metabolites produced as a result of the morphogenes. In some embodiments, altruistic delivery methods used supernatant from transgenic "feeder" cells to "feed" the tissue culture with the target cells/tissue (cells/tissues for transformation or genome editing). Feeder cells can be any plant cell, not necessarily from the same species of the target cell or tissue.

An aspect of the disclosure includes methods of increasing transformation efficiency of sugarcane cells, including (a) providing sugarcane cells or tissue; (b) introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40, wherein introducing the at least one morphogene protein sequence is through exogenous application, and introducing at least one transgene nucleotide sequence into the sugarcane cells to produce transgenic sugarcane cells, wherein the transformation efficiency is increased as compared to a method of transforming sugarcane cells that does not use at least one exogenously applied morphogene protein sequence; and step (c) cultivating the transgenic sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene sequence is selected from the group of SEQ ID NO: 1, SEQ ID NO: 10, SEQ ID NO: 11, SEQ ID NO: 12, SEQ ID NO: 14, or SEQ ID NO: 20. Some embodiments of this aspect include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. In some embodiments of this aspect, transformation efficiency is increased by at least 5% as compared to a method of transforming sugarcane cells that does not use at least one exogenously applied morphogene protein sequence. In some embodiments of this aspect, transformation is increased by 5%, 6%, 7%, 8%, 9%, 10%, 11%, 12%, 13%, 14%, 15%, 16%, 17%, 18%, 19%, 20%, 21%, 22%, 23%, or 24%. In some embodiments of this aspect, transformation efficiency is increased by 50% to 100% as compared to a method of transforming sugarcane cells that does not use at least one exogenously applied morphogene protein sequence. The increase in efficiency provided by the present methods represents a significant improvement over present methods, as some recalcitrant sugarcane varieties have less than 1% of transformation efficiency without the use of morphogenes. Some embodiments of this aspect further include screening the sugarcane cells between steps (b) and (c), screening the plantlets after step (d), or screening the plants after step (e) to identify the transgene. In some embodiments, screening may be done using PCR, ELISA, fluorescence detection, sequencing, or other screening methods known in the art. Some embodiments of this aspect further include selecting the transgenic sugarcane cells between steps (b) and (c), or selecting the genetically altered plantlets after step (d), optionally by using selectable markers. These selectable markers may be nptII, BAR, EPSPS, and/or any other suitable selectable marker. In some embodiments of this aspect, step (b) is achieved through *Agrobacterium* transformation, microprojectile bombardments, nanoparticle delivery, viral delivery, any other protein delivery technology, or a combination thereof. In some embodiments of this aspect, the at least one transgene nucleotide sequence encodes a protein selected from the group consisting of a fluorescent protein (e.g., GFP, CFP, dsRED, etc.), a herbicide resistance protein (e.g., CP4-EPSPS, BAR, ALS, etc.), an agronomic trait protein, and a disease/pest resistance protein (e.g., BT, Cry, VIP, etc.). In some embodiments of this aspect, a combination of morphogene proteins is used. In some embodiments, one morphogene protein sequence, two morphogene protein sequences, three morphogene protein sequences, four morphogene protein sequences, five morphogene protein sequences, six morphogene protein sequences, seven morphogene protein sequences, eight morphogene protein sequences, nine morphogene protein sequences, ten morphogene protein sequences, eleven morphogene protein sequences, twelve morphogene protein sequences, thirteen morphogene protein sequences, fourteen morphogene protein sequences, fifteen morphogene protein sequences, sixteen morphogene protein sequences, seventeen morphogene protein sequences, eighteen morphogene protein sequences, nineteen morphogene protein sequences, or twenty morphogene protein sequences are introduced in step (b). In some embodiments of this aspect, one morphogene protein sequence, two morphogene protein sequences, or three morphogene protein sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one transgene nucleotide sequence is introduced with a vector. In some embodiments of this aspect, the vector includes a promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the at least one morphogene protein sequence is introduced through addition to the cell cultivation media. In some embodiments of this aspect, the at least one morphogene protein sequence is introduced before the at least one transgene nucleotide sequence. In some embodiments of this aspect, the at least one morphogene protein sequence is introduced at the same time as the at least one transgene nucleotide sequence. In some embodiments of this aspect, the at least one morphogene protein sequence is introduced after the at least one transgene nucleotide sequence.

An aspect of the disclosure includes methods of increasing transformation efficiency of sugarcane cells, including (a) providing sugarcane cells or tissue; (b) introducing at least one morphogene protein sequence including SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40, wherein introducing the at least one morphogene protein sequence is through co-culture with transgenic feeder cells, and introducing at least one transgene nucleotide sequence into the sugarcane cells to produce transgenic sugarcane cells, wherein the transformation efficiency is increased as compared to a method of transforming sugarcane cells that does not use at least one morphogene protein sequence produced by transgenic feeder cells; and (c) cultivating the transgenic sugarcane cells for proliferation and/or regeneration. Some embodiments of this aspect further include (d) cultivating the transgenic sugarcane cells into genetically altered plantlets; and (e) growing the genetically altered plantlets into genetically altered plants including the at least one transgene nucleotide sequence. In some embodiments of this aspect, the at least one morphogene protein sequence is selected from the group of SEQ ID NO: 21, SEQ ID NO: 30, SEQ ID NO: 31, SEQ ID NO: 32, SEQ ID NO: 34, or SEQ ID NO: 40. Some embodiments of this aspect include screening the sugarcane cells between steps (b) and (c), screening the sugarcane cells during step (c), or screening the sugarcane cells after step (c), and optionally further include selecting the transgenic sugarcane cells between steps (b) and (c), or selecting the transgenic sugarcane cells after step (c), optionally by using selectable markers. In some embodiments of this aspect, transformation efficiency is increased by at least 5% as compared to a method of transforming sugarcane cells that does not use at least one morphogene protein sequence produced by transgenic feeder cells. In some embodiments of this aspect, transformation is increased by 5%, 6%, 7%, 8%, 9%, 10%, 11%, 12%, 13%, 14%, 15%, 16%, 17%, 18%, 19%, 20%, 21%, 22%, 23%, or 24%. In some embodiments of this aspect, transformation efficiency is increased by 50% to 100% as compared to a method of transforming sugarcane cells that does not use at least one morphogene protein sequence produced by transgenic feeder cells. The increase in efficiency provided by the present methods represents a significant improvement over present methods, as some recalcitrant sugarcane varieties have less than 1% of transformation efficiency without the use of morphogenes. Some embodiments of this aspect further include screening the sugarcane cells between steps (b) and (c), screening the plantlets after step (d), or screening the plants after step (c) to identify the transgene. In some embodiments, screening may be done using PCR, ELISA, fluorescence detection, sequencing, or other screening methods known in the art. Some embodiments of this aspect further include selecting the transgenic sugarcane cells between steps (b) and (c), or selecting the genetically altered plantlets after step (d), optionally by using selectable markers. These selectable markers may be nptII, BAR, EPSPS, and/or any other suitable selectable marker. The use of morphogenes may enhance the antibiotic concentration used in the selection step after transformation, because cells containing morphogenes have a higher proliferation and maturation post-transformation, which supports higher antibiotic concentrations. The use of higher antibiotic concentrations avoids escapes and increases the probability of finding high quality transformation events. In some embodiments of this aspect, step (b) is achieved through *Agrobacterium* transformation, microprojectile bombardments, nanoparticle delivery, viral delivery, or a combination thereof. In some embodiments of this aspect, the at least one transgene nucleotide sequence encodes a protein selected from the group consisting of a fluorescent protein (e.g., GFP, CFP, dsRED, etc.), a herbicide resistance protein (e.g., CP4-EPSPS, BAR, ALS, etc.), an agronomic trait protein, and a disease/pest resistance protein (e.g., BT, Cry, VIP, etc.). In some embodiments of this aspect, a combination of morphogene proteins is used. In some embodiments, one morphogene protein sequence, two morphogene protein sequences, three morphogene protein sequences, four morphogene protein sequences, five morphogene protein sequences, six morphogene protein sequences, seven morphogene protein sequences, eight morphogene protein sequences, nine morphogene protein sequences, ten morphogene protein sequences, eleven morphogene protein sequences, twelve morphogene protein sequences, thirteen morphogene protein sequences, fourteen morphogene protein sequences, fifteen morphogene protein sequences, sixteen morphogene protein sequences, seventeen morphogene protein sequences, eighteen morphogene protein sequences, nineteen morphogene protein sequences, or twenty morphogene protein sequences are introduced in step (b). In some embodiments of this aspect, one morphogene protein sequence, two morphogene protein sequences, or three morphogene protein sequences are introduced in step (b). In some embodiments of this aspect, one transgene nucleotide sequence, two transgene nucleotide sequences, three transgene nucleotide sequences, four transgene nucleotide sequences, five transgene nucleotide sequences, six transgene nucleotide sequences, seven transgene nucleotide sequences, eight transgene nucleotide sequences, nine transgene nucleotide sequences, or ten transgene nucleotide sequences are introduced in step (b). In some embodiments of this aspect, the at least one transgene nucleotide sequence is introduced with a vector. In some embodiments of this aspect, the vector includes a promoter operably linked to the at least one transgene nucleotide sequence. In some embodiments of this aspect, the first and second promoters are selected from the group of a constitutive promoter, an inducible promoter, or a tissue-specific or cell-type-specific promoter. In some embodiments of this aspect, the sugarcane cells to be transformed are co-cultured with the transgenic feeder cells. In some embodiments of this aspect, the at least one morphogene protein sequence is introduced through transgenic feeder cells expressing at least one morphogene nucleotide sequence including SEQ ID NO: 1, SEQ ID NO: 2, SEQ ID NO: 3, SEQ ID NO: 4, SEQ ID NO: 5, SEQ ID NO: 6, SEQ ID NO: 7, SEQ ID NO: 8, SEQ ID NO: 9, SEQ ID NO: 10, SEQ ID NO: 11, SEQ ID NO: 12, SEQ ID NO: 13, SEQ ID NO: 14, SEQ ID NO: 15, SEQ ID NO: 16, SEQ ID NO: 17, SEQ ID NO: 18, SEQ ID NO: 19, and/or SEQ ID NO: 20. In some embodiments of this aspect, the transgenic feeder cells release the morphogene protein sequences of SEQ ID NO: 21, SEQ ID NO: 22, SEQ ID NO: 23, SEQ ID NO: 24, SEQ ID NO: 25, SEQ ID NO: 26, SEQ ID NO: 27, SEQ ID NO: 28, SEQ ID NO: 29, SEQ ID NO: 30, SEQ ID NO: 31, SEQ ID NO: 32, SEQ ID NO: 33, SEQ ID NO: 34, SEQ ID NO: 35, SEQ ID NO: 36, SEQ ID NO: 37, SEQ ID NO: 38, SEQ ID NO: 39, and/or SEQ ID NO: 40 into the transformation media. In some embodiments of this aspect, the at least one morphogene protein sequence is introduced before the at least one transgene nucleotide sequence. In some embodiments of this aspect, the at least one morphogene protein sequence is introduced at the same time as the at least one transgene nucleotide sequence. In some embodiments of this aspect, the at least one morphogene protein sequence is introduced after the at least one transgene nucleotide sequence. In some embodiments of this aspect, the method generates between ten and twenty independent transformation events per variety.

Molecular Biological and Biotechnological Methods

One embodiment of the present disclosure provides a genetically altered sugarcane plant including one or more transgenes (i.e., one or more heterologous genes) or one or more edited gene sequences in the sugarcane genome (i.e., one or more edited endogenous genes). Certain aspects of the present disclosure relate to methods for producing these genetically altered sugarcane plants. In some embodiments, these methods use morphogenes to increase transformation and regeneration efficiency.

Any methodology known in the art to delete, insert or otherwise modify the cellular DNA (e.g., genomic DNA and organelle DNA) can be used in practicing the inventions disclosed herein. For example, a disarmed Ti plasmid, containing a genetic construct for deletion or insertion of a target gene, in *Agrobacterium tumefaciens* can be used to transform a plant cell, and thereafter, a transformed plant can be regenerated from the transformed plant cell using procedures described in the art, for example, in EP 0116718, EP 0270822, PCT publication WO 84/02913 and published European Patent application ("EP") 0242246. Ti-plasmid vectors each contain the gene between the border sequences, or at least located to the left of the right border sequence, of the T-DNA of the Ti-plasmid. Other types of vectors can also be used to transform the plant cell.

Recombinant DNA technology has enabled the isolation of genes and their stable insertion into a host genome. This technique, also called genetic transformation, can be defined as the controlled introduction of nucleic acids ("DNA" or DNA) into a recipient genome, excluding introduction by fertilization. It is a controlled process where a defined DNA fragment is introduced into the host (or recipient) genome and must be integrated into it. The stable insertion of these molecules into a host genome gives rise to an individual with a genome that is equal or substantially equal to the recipient (host) of the recombinant molecule, but with a new and particular feature. "Substantially equal" means a genome with more than 80%, preferably 85%, 90%, 95%, 98%, 99% or 100% of identity in relation to the recipient.

There are several plant genetic transformation techniques grouped into two main categories: indirect and direct gene transfer. Indirect transfer is when exogenous DNA is inserted into the genome by the action of a biological vector, while direct transfer is based on physical-biochemical processes. Different tissues and/or cells could be used according to the genetic transformation technique and according to the species or genotypes to be transformed. Generally, these tissues or cells include, without limitation, embryogenic callus, callus, protoplasts, embryos, somatic embryos, meristematic tissues, an any other part, tissue or cell of plant with regenerative capacity.

Indirect transformation is based on the bacterium-mediated system of the genus *Agrobacterium* and has been the most widely used method for obtaining transgenic plants. Advantages to this method include the ability to transfer relatively long DNA segments without rearrangement while maintaining low copy number integration of the transgenes, thus ensuring greater genotypic stability for the generated events. Several *Agrobacterium* species and strains, plasmids and protocols have been developed and adapted for genetic transformation of several plant species. The advantages of these methods include higher probabilities to single copy events, stable integration, and genetic heritage of the introduced genetic traits, as well as, consistent genic expression through generations and lower rates of gene silencing.

*Agrobacterium tumefaciens* and *A. rhizogenes* are gram negative soil phytopathogenic bacteria belonging to the Rhizobiaceae family that cause diseases in dicotyledons, known as crown and hairy root galls, respectively. In this plant-pathogen interaction there is a process of natural gene transfer between the *Agrobacterium* and the plant cell wherein fragments of bacterial DNA are transferred into the plant cell (T-DNA), integrating with the nuclear genome. In its natural form, the bacterium transfers T-DNA ("transferred DNA"), which is part of the bacterial plasmid called Ti ("tumor-inducing") and integrates into the genome of infected plant cells. The T-DNA fragment that is transferred to the plant cell includes genes involved in the constitutive biosynthesis of phytohormones (auxins and cytokinins), which alter the normal developmental program of infected tissue and cause tumor formation. In addition, it also contains oncogenes for the synthesis of sugars and amino acids called opines, which serve as carbon and nitrogen sources for bacteria (Oger et al. 1997). Repeated ends of 25 base pairs (bp) at the right and left edges delimit the T-DNA and are essential for its transfer. Phenolic compounds released by injured plant tissues activate specific regions (vir regions), initiating the process of transfer of T-DNA to the plant cell. *Agrobacterium* also has chromosomal (chv) genes that promote binding between bacterial and host cells, allowing the formation of the pore passage of the T-DNA-containing complex (Sheng & Citovsky. 1996).

Since the segment to be transferred is defined by its edges, any sequence flanked by the edges can be transferred to a plant by means of agrobacteria, making it possible to manipulate these sequences in order to transfer coding sequences of interest. The replacement or deletion of the coding regions of wild-type T-DNA (oncogenes) allows for the generation of non-oncogenic (disarmed) *Agrobacterium* strains, which can carry the sequences of interest. The modified T-DNA is able to transfer the sequences of interest to plants because the virulence genes (vir region) remain intact.

Additionally, the *Agrobacterium* indirect transformation system allows for the transfer of artificial plasmid constructs to plants as long as the constructs contain such T-DNA edges, which enables the flexibility to use molecular tools and materials developed for other bacterial strains. These artificial plasmid constructs have promoters from different origins, as for example, plant promoters, viral promoters, bacterial and or chimeric promoters, besides genes that confer antibiotic resistance, herbicide resistance or tolerance or enzymatic activity (phosphomannose isomerase (PMI)/mannose (Man)) so these markers can be used for the selection of transformed cells or plants. These constructions also can contain auxiliary genes which interfere with relevant morphogenesis signaling pathways, enhancing the efficiency of the genetic transformation process and regeneration of vegetal tissues (See "Morphogenes" section above).

In one aspect of the present disclosure, foreign or exogenous DNA to be introduced into the plant is cloned into a binary plasmid between the left and right edge consensus sequences (T-DNA). The binary plasmid is transferred to an *Agrobacterium* cell, which is subsequently used to infect plant tissue. The T-DNA region of the vector including the exogenous DNA is inserted into the plant genome. The marker gene expression cassette and the characteristic gene expression cassette may be present in the same region of T-DNA, in different regions of T-DNA on the same plasmid, or in different regions of T-DNA on different plasmids. In one embodiment of the present invention, the cassettes are present in the same region as the T-DNA. One of skill in the art is familiar with the methods of indirect transformation by *Agrobacterium.*

Alternatively, direct DNA transfer can be used to directly introduce DNA into a plant cell. One method of direct DNA transfer is to bombard plant cells with a vector including DNA for insertion using a particle gun (particle-mediated biolistic transformation). Other methods for transformation of plant cells include protoplast transformation (optionally in the presence of polyethylene glycols (PEGs)); ultrasound treatment of plant tissues, cells, or protoplasts in a medium including the polynucleotide or the vector; microinjection of the polynucleotide or vector into plant material; microinjection, vacuum infiltration, sonication, use of silicon carbide, chemical transformation with PEG, electroporation of plant cells and the like. Disadvantages of direct transformation include challenges related to regeneration of plant tissue and the low transgene expression.

In addition, genetic transformation can be performed by site direct insertion through homologous recombination mediated by nucleases (genome editing). In recent years, genome editing technology based on use of engineered or chimeric nucleases has enabling the generation of genetically modified organisms in a more precise and specific way. The introduction of exogenous or foreign genes occur by homologous recombination through introduction of a Homologous recombination template (HR) having the exogenous DNA linked to a DNA fragment homologous to the genome of the receptor organism. The tools available include the chimeric enzymatic system CRISPR (clustered, regularly interspaced, short palindromic repeats) —Cas, the Zinc finger nucleases (ZFN) and TAL effector nucleases (TALENs). Crispr-Cas systems are enzymatic systems including two main components: a endonuclease (Cas) and a guide-RNA (single-guide RNA—sgRNA; a guide to the specific cleavage site of Cas endonuclease). The guide RNA may also include two components: a Crispr RNA (crRNA)—a sequence of 17-20 mer complementary to specific DNA genomic sequences and, optionally, a tracr RNA. The specific cleavage performed by endonuclease and guide by the sgRNA is repair by homologous recombination, specifically inserting the exogenous DNA flanked by the homologous sequences to the cleavage site. The introduction of this enzymatic system to the cell could occur by several methods, including using plasmids, through direct or indirect transformation, or using carriers like proteins and other chemical agents. The expression of the system components may occur in a transient or stable manner, using the cellular machinery of the receptor organism or being used in a exogenous way, in vitro, delivering to the target cell or tissue all the components ready to use (endonucleases+sgRNA, in vitro transcribed and combined before cell delivery). The description presented herein is not exhaustive and should not limit the use of different variations, systems and methods of genome editing on scope of the present invention, known in the state of the art and even the ones not yet discovered.

Following transformation, transgenic plants are selected from the transformed plant tissue and the progeny that have exogenous DNA can be selected using an appropriate marker such as kanamycin or ammonium glufosinate resistance. One skilled in the art is familiar with the composition of suitable selection media. Alternatively, other selection methods could be applied, without the insertion of any gene marker in the host genome (receptor organism) as described before.

Introduced genetic elements, whether in an expression vector or expression cassette, which result in the expression of an introduced gene will typically utilize a plant-expressible promoter. A "plant-expressible promoter" as used herein refers to a promoter that ensures expression of the genetic alteration(s) of the invention in a plant cell. Promoters suitable for plant expression may be isolated from plants or from other organisms. Several promoters have been isolated or developed including constitutive promoters, inducible promoters, and promoters that are responsive to tissue-specific abiotic stresses, among others. Many of these promoters have intronic sequences described as relevant for proper gene expression. In a preferred aspect of the invention, promoters are constitutive promoters and may be selected from the non-limiting group consisting of CaMV 35S, CoYMV (Commelina yellow mottle virus), FMV 35S, ubiquitin (Ubi), Actin Rice Promoter (Act-1), Act-2, nopaline synthase promoter (NOS), octopine synthase promoter (OCS), corn alcohol dehydrogenase promoter (Adh-1), PvUbil, among others. In one embodiment of the invention, the promoter is the *Brachypodium distachyon* ubiquitin gene promoter (BdUbi10). In one embodiment of the invention, the promoter is the *Zea mays* ubiquitin gene promoter (ZmUbi1). Examples of promoters directing constitutive expression in plants are known in the art and include: the strong constitutive 35S promoters (the "35S promoters") of the cauliflower mosaic virus (CaMV), e.g., of isolates CM 1841 (Gardner et al, Nucleic Acids Res, (1981) 9, 2871-2887), CabbB S (Franck et al, Cell (1980) 21, 285-294) and CabbB JI (Hull and Howell, Virology, (1987) 86, 482-493); promoters from the ubiquitin family (e.g., the maize ubiquitin promoter of Christensen et al., Plant Mol Biol, (1992) 18, 675-689), the gos2 promoter (de Pater et al, The Plant J (1992) 2, 834-844), the emu promoter (Last et al, Theor Appl Genet, (1990) 81, 581-588), actin promoters such as the promoter described by An et al. (The Plant J, (1996) 10, 107), the rice actin promoter described by Zhang et al. (The Plant Cell, (1991) 3, 1155-1165); promoters of the Cassava vein mosaic virus (WO 97/48819, Verdaguer et al. (Plant Mol Biol, (1998) 37, 1055-1067), the pPLEX series of promoters from Subterranean Clover Stunt Virus (WO 96/06932, particularly the S4 or S7 promoter), an alcohol dehydrogenase promoter, e.g., pAdhlS (GenBank accession numbers X04049, X00581), and the TRT promoter and the TR2' promoter (the "TRT promoter" and "TR2' promoter", respectively) which drive the expression of the G and 2' genes, respectively, of the T DNA (Velten et al, EMBO J, (1984) 3, 2723 2730). Alternatively, a plant-expressible promoter can be a tissue-specific promoter, i.e., a promoter directing a higher level of expression in some cells or tissues of the plant. These plant promoters can be combined with enhancer elements, they can be combined with minimal promoter elements, or can include repeated elements to ensure the expression profile desired.

In some embodiments, genetic elements to increase expression in plant cells can be utilized. For example, an intron at the 5' end or 3' end of an introduced gene, or in the coding sequence of the introduced gene, e.g., the hsp70 intron can be used. Other such genetic elements can include, but are not limited to, promoter enhancer elements, duplicated or triplicated promoter regions, 5' leader sequences different from another transgene or different from an endogenous (plant host) gene leader sequence, 3' trailer sequences different from another transgene used in the same plant or different from an endogenous (plant host) trailer sequence. Additional elements incorporated into the expression cassette for the purpose of enhancing gene expression levels, for example, transcriptional or translation enhancers such as CaMV 35S enhancers, FMV 35S, Nos, supP, among others.

Terminator sequences are also contemplated on the expression cassette. Examples of suitable and functional plant polyadenylation signals include those from the *Agrobacterium tumefaciens* nopaline synthase gene (nos), pea proteinase inhibitor II gene rbcS (ribulose-1,5-bisphosphate carboxylase small subunit), tobacco Lhcb1 (tobacco chlorophyll a/b-binding proteins), heat shock protein (Hsp), CaMV 35S, octopine synthases, and alpha-tubulin genes among others.

An introduced gene of the present invention can be inserted in host cell DNA so that the inserted gene part is upstream (i.e., 5') of suitable 3' end transcription regulation signals (e.g., transcript formation and polyadenylation signals). This is preferably accomplished by inserting the gene in the plant cell genome. Preferred polyadenylation and transcript formation signals include those of the nopaline synthase gene (Depicker et al, J. Molec Appl Gen, (1982) 1, 561-573), the octopine synthase gene (Gielen et al, EMBO J, (1984) 3:835 845), the SCSV or the Malic enzyme terminators (Schunmann et al, Plant Funct Biol, (2003) 30:453-460), and the T DNA gene 7 (Velten and Schell, Nucleic Acids Res, (1985) 13, 6981 6998), which act as 3' untranslated DNA sequences in transformed plant cells. In some embodiments, one or more of the introduced genes are stably integrated into the nuclear genome. Stable integration is present when the nucleic acid sequence remains integrated into the nuclear genome and continues to be expressed (e.g., detectable mRNA transcript or protein is produced) throughout subsequent plant generations. Stable integration into and/or editing of the nuclear genome can be accomplished by any known method in the art (e.g., microparticle bombardment, *Agrobacterium*-mediated transformation, CRISPR/Cas9, electroporation of protoplasts, micro injection, etc.).

The term recombinant or modified nucleic acids refers to polynucleotides which are made by the combination of two otherwise separated segments of sequence accomplished by the artificial manipulation of isolated segments of polynucleotides by genetic engineering techniques or by chemical synthesis. In so doing one may join together polynucleotide segments of desired functions to generate a desired combination of functions.

As used herein, the terms "overexpression" and "upregulation" refer to increased expression (e.g., of mRNA, polypeptides, etc.) relative to expression in a wild type organism (e.g., plant) as a result of genetic modification. In some embodiments, the increase in expression is a slight increase of about 10% more than expression in wild type. In some embodiments, the increase in expression is an increase of 50% or more (e.g., 60%, 70%, 80%, 100%, etc.) relative to expression in wild type. In some embodiments, an endogenous gene is overexpressed. In some embodiments, an exogenous or heterologous gene is overexpressed by virtue of being expressed. Overexpression of a gene in plants can be achieved through any known method in the art, including but not limited to, the use of constitutive promoters, inducible promoters, high expression promoters, enhancers, transcriptional and/or translational regulatory sequences, codon optimization, modified transcription factors, and/or mutant or modified genes that control expression of the gene to be overexpressed.

Where a recombinant nucleic acid is intended for expression, cloning, or replication of a particular sequence, DNA constructs prepared for introduction into a host cell will typically include a replication system (e.g. vector) recognized by the host, including the intended DNA fragment encoding a desired polypeptide, and can also include transcription and translational initiation regulatory sequences operably linked to the polypeptide-encoding segment. Additionally, such constructs can include cellular localization signals (e.g., plasma membrane localization signals). In preferred embodiments, such DNA constructs are introduced into a host cell's genomic DNA, chloroplast DNA or mitochondrial DNA.

In some embodiments, a non-integrated expression system can be used to induce expression of one or more introduced genes. Expression systems (expression vectors) can include, for example, an origin of replication or autonomously replicating sequence (ARS) and expression control sequences, a promoter, an enhancer and necessary processing information sites, such as ribosome-binding sites, RNA splice sites, polyadenylation sites, transcriptional terminator sequences, and mRNA stabilizing sequences. Signal peptides can also be included where appropriate from secreted polypeptides of the same or related species, which allow the protein to cross and/or lodge in cell membranes, cell wall, or be secreted from the cell. A non-integrated expression system allows transient expression, e.g., of morphogenes, so that heterologous sequences are only expressed during a limited time period. In some embodiments of the present disclosure, morphogenes are transiently expressed at one or more stages of the transformation process, and then the plant produced using the transformation process does not include the morphogene.

Selectable markers useful in practicing the methodologies of the invention disclosed herein can be positive selectable markers. Typically, positive selection refers to the case in which a genetically altered cell can survive in the presence of a toxic substance only if the recombinant polynucleotide of interest is present within the cell. Negative selectable markers and screenable markers are also well known in the art and are contemplated by the present invention. One of skill in the art will recognize that any relevant markers available can be utilized in practicing the inventions disclosed herein. Exemplary selectable markers include nptII, BAR, EPSPS, GUS, or fluorescent markers (e.g., GFP, CFP, etc.).

Screening and molecular analysis of recombinant strains of the present invention can be performed utilizing nucleic acid hybridization techniques. Hybridization procedures are useful for identifying polynucleotides, such as those modified using the techniques described herein, with sufficient homology to the subject regulatory sequences to be useful as taught herein. The particular hybridization techniques are not essential to the subject invention. As improvements are made in hybridization techniques, they can be readily applied by one of skill in the art. Hybridization probes can be labeled with any appropriate label known to those of skill in the art. Hybridization conditions and washing conditions, for example temperature and salt concentration, can be altered to change the stringency of the detection threshold. Sec, e.g., Sambrook et al. (1989) vide infra or Ausubel et al. (1995) Current Protocols in Molecular Biology, John Wiley & Sons, NY, N.Y., for further guidance on hybridization conditions.

Similarly, screening can be performed using polypeptide-based techniques including enzyme-linked immunosorbent assays (ELISAs), fluorescence detection (if a fluorescent marker was used), or Western blots. One of skill in the art will recognize that any polypeptide-based techniques available can be utilized in screening the inventions disclosed herein.

Additionally, screening and molecular analysis of genetically altered strains, as well as creation of desired isolated nucleic acids can be performed using Polymerase Chain Reaction (PCR). PCR is a repetitive, enzymatic, primed synthesis of a nucleic acid sequence. This procedure is well known and commonly used by those skilled in this art (see Mullis, U.S. Pat. Nos. 4,683,195, 4,683,202, and 4,800,159; Saiki et al. (1985) Science 230:1350-1354). PCR is based on the enzymatic amplification of a DNA fragment of interest that is flanked by two oligonucleotide primers that hybridize to opposite strands of the target sequence. The primers are oriented with the 3' ends pointing towards each other. Repeated cycles of heat denaturation of the template, annealing of the primers to their complementary sequences, and extension of the annealed primers with a DNA polymerase result in the amplification of the segment defined by the 5' ends of the PCR primers. Because the extension product of each primer can serve as a template for the other primer, each cycle essentially doubles the amount of DNA template produced in the previous cycle. This results in the exponential accumulation of the specific target fragment, up to several million-fold in a few hours. By using a thermostable DNA polymerase such as the Taq polymerase, which is isolated from the thermophilic bacterium *Thermus aquaticus*, the amplification process can be completely automated. Other enzymes which can be used are known to those skilled in the art.

Nucleic acids and proteins of the present disclosure can also encompass homologues of the specifically disclosed sequences. Homology or genetic identity can be 50%-100%. In some instances, such homology or genetic identity is greater than 80%, greater than 85%, greater than 90%, or greater than 95%. The degree of homology or identity needed for any intended use of the sequence(s) is readily identified by one of skill in the art. As used herein percent sequence identity of two nucleic acids is determined using an algorithm known in the art, such as that disclosed by Karlin and Altschul (1990) Proc. Natl. Acad. Sci. USA 87:2264-2268, modified as in Karlin and Altschul (1993) Proc. Natl. Acad. Sci. USA 90:5873-5877. Such an algorithm is incorporated into the NBLAST and XBLAST programs of Altschul et al. (1990) J. Mol. Biol. 215:402-410. BLAST nucleotide searches are performed with the NBLAST program, score=100, wordlength=12, to obtain nucleotide sequences with the desired percent sequence identity. To obtain gapped alignments for comparison purposes, Gapped BLAST is used as described in Altschul et al. (1997) Nucl. Acids. Res. 25:3389-3402. When utilizing BLAST and Gapped BLAST programs, the default parameters of the respective programs (NBLAST and XBLAST) are used. Sec www.ncbi.nih.gov.

Preferred host cells are plant cells. Plant cells from monocot species, including sugarcane (e.g., *Saccharum* spp.), corn (e.g., *Zea mays*), setaria (e.g., *Setaria italica, Setaria viridis*), or from dicot species such as *Brassica* spp., cotton (*Gossypium hirsutum*), potato (*Solanum tuberosum*), or tobacco (e.g., *Nicotiana benthamiana, Nicotiana tabacum*) may be used. Cells may be derived from tissue types including embryo, callus, leaf disk, and other explants. Plant cells can be differentiated or undifferentiated (e.g. callus, undifferentiated callus, immature and mature embryos, immature zygotic embryo, immature cotyledon, embryonic axis, suspension culture cells, protoplasts, leaf, leaf cells, root cells, phloem cells and pollen). Plant cells include, without limitation, cells from seeds, suspension cultures, explants, immature embryos, embryos, zygotic embryos, somatic embryos, embryogenic callus, meristem, somatic meristems, organogenic callus, protoplasts, leaf bases, leaves from mature plants, leaf tips, immature inflorescences, cotyledons, immature cotyledons, embryonic axes, meristematic regions, callus tissue, cells from leaves, cells from stems, cells from roots, cells from shoots, gametophytes, sporophytes, pollen and microspores. Plant cells further include various forms of cells in culture (e.g., single cells, protoplasts, embryos, and callus tissue), wherein the protoplasts or cells are produced from a plant part selected from the group of leaf, stem, anther, pistil, root, fruit, flower, seed, cotyledon, hypocotyl, embryo, or meristematic cell. Recombinant host cells, in the present context, are those which have been genetically modified to contain an isolated nucleic molecule, contain one or more deleted or otherwise non-functional genes normally present and functional in the host cell, or contain one or more genes to produce at least one recombinant protein. The nucleic acid(s) encoding the transgenes and morphogenes of the present invention can be introduced by any means known to the art which is appropriate for the particular type of cell, including without limitation, transformation, lipofection, electroporation or any other methodology known by those skilled in the art.

Having generally described this invention, the same will be better understood by reference to certain specific examples, which are included herein to further illustrate the invention and are not intended to limit the scope of the invention as defined by the claims.

EXAMPLES

The present disclosure is described in further detail in the following examples which are not in any way intended to limit the scope of the disclosure as claimed. The attached figures are meant to be considered as integral parts of the specification and description of the disclosure. The following examples are offered to illustrate, but not to limit the claimed disclosure.

Example 1: Identification of Candidate Morphogenes in Grass Species

The following example describes the process used to identify candidate morphogenes. Although morphogenes have been identified in dicots, such as *Arabidopsis thaliana*, these dicot genes may not work in monocot plants, such as grasses. Further, because of the evolutionary history and complex genome of grass species (e.g., sugarcane), identification of candidate morphogenes in grass species is more complex. Sequence similarity provides a starting point, but additional analysis is needed.

Materials and Methods

*Arabidopsis thaliana* Morphogenes

Twelve genes from *Arabidopsis thaliana* were used as starting points for bioinformatic analysis. Each of these genes was considered to be a morphogene, i.e., a gene that has been functionally demonstrated to improve somatic embryogenesis and/or regeneration. The *A. thaliana* morphogenes were separated into three overlapping groups based on their effect.

The first group was those genes/proteins that allowed differentiated tissue (e.g., leaf tissue) to regain pluripotency and proliferation potential. These were SHOOT-MERISTEMLESS (STM), WUSCHEL (WUS), GROWTH-REGULATING FACTOR 5 (GRF5), WOUND INDUCED DEDIFFERENTIATION1 (WIND1), and ENHANCER OF SHOOT REGENERATION1 (ESR1).

The second group was those genes/proteins that promoted somatic embryo formation from callus. These were BABY BOOM (BBM), PLETHORA2 (PLT2), EMBRYOMAKER/AINTEGUMENTA-like 5/PLETHORA5 (EMK/AIL5/PLT5), LEAFY COTYLEDON (LEC2), AGAMOUS-LIKE 15 (AGL15), RWP-RK DOMAIN-CONTAINING 4 (RKD4), and SOMATIC EMBRYOGENESIS RECEPTOR KINASE 1 (SERK1).

The third group was those genes/proteins that promoted regeneration/organogenesis in embryos. These were BBM, ESR1, and GRF5.

Bioinformatic Methods

Three sequence database and analytics programs were used to identify candidate morphogenes in grass species using the *A. thaliana* morphogene proteins described above as a starting point. Gramene (gramene.org) was used to identify predicted orthologs of *A. thaliana* morphogene proteins. If predicted grass orthologs were present, then all orthologs and homologs were aligned and domain structure was identified. If no predicted grass orthologs were present, then the closest grass homolog branch was retrieved before aligning all orthologs and homologs and identifying domain structure. The domain structure was identified using InterPro Scan and relevant literature. From this alignment, two to three grass orthologs were selected with high similarity to the *A. thaliana* protein and one to two high confidence orthologs from dicots were selected with a high similarity to the *A. thaliana* protein. The selection process focused on proteins with high coverage (no partial matches), high similarity, and those having all the required domains known from the literature. The goal of this stage was to identify monocot orthologs from grass species and dicot orthologs from species closely related to *A. thaliana.*

Phytozome (phytozome.jgi.doc.gov/pz/portal.html) was used to retrieve homologs of *A. thaliana* proteins in grass species and in *A. thaliana*. All of the homologs were aligned, and the domain structures of the proteins were identified using InterPro Scan. Next, Maximum Likelihood phylogenetic trees were built using FastTree on the basis of these alignments. Then, the trees were analyzed to identify homologs in grass species and in sugarcane that were closest to ortholog branches. On the basis of this analysis, candidate morphogenes in grass species and sugarcane were selected. The selection process focused on proteins with high coverage (no partial matches), high similarity, those having all the required domains known from the literature, and those with a phylogenetic position on the tree that was closest to the orthologs. The goal of this stage was to identify additional grass homologs if there were no grass orthologs predicted by Gramene, and to generate lists of unbiased homologs to build phylogenetic trees.

NCBI tblastn (blast.ncbi.nlm.nih.gov/Blast.cgi?PROGRAM=tblastn&PAGE_TYPE=BlastSearch&LINK_LO C=blasthome) was used with *A. thaliana* proteins as bait against Transcriptome Shotgun Assembly (TSA) of the *Saccharum* genus. This provided a range of coverage and identity and was used to select the best candidates, which were usually partial. Then, the full transcript sequence was retrieved by additional blast search to a whole genome assembly (WGA) or published PacBio RNA-Seq data sets (e.g. Nascimento et al., 2016). The more full length protein predictions obtained from this second step were then aligned with previously identified orthologs and homologs, and the domain structures of the proteins were identified using InterPro Scan. Next, Maximum Likelihood phylogenetic trees were built using FastTree on the basis of these alignments. From this, one to two predicted sugarcane homologs were then selected. The selection process focused on proteins with high coverage (no partial matches), high similarity, those having all the required domains known from the literature, and those with a phylogenetic position on the tree that was closest to the orthologs. The goal of this stage was to identify sugarcane homologs.

All three of these bioinformatic approaches were applied to each candidate morphogene that was ultimately selected.

Results

The analysis identified multiple candidate morphogenes in grass species and sugarcane. The results were compared with sequences from publications, and in some cases, previously identified orthologs were found to be incorrect. For example, the analysis revealed that the published ortholog of *A. thaliana* BBM in *Zea mays* (Lowe et al., 2016, Plant Cell 28(9):1998-2015) was located in a separate clade on the phylogenetic tree ("clade 2"), which contained the *A. thaliana* AIL6 protein. In contrast, the *Z. mays* BBM ortholog identified in the analysis was located in "clade 1", which contained the true BBM grass ortholog genes. Multiple grass genes in clade 1 were identified that encoded proteins that contained the same seven protein motifs as *A. thaliana* BBM. Two of these were selected for further analysis, including one in the wheat genus and one in the sugarcane genus. In addition, one gene from clade 2 was selected for further analysis. This gene was the *Panicum hallii* (switchgrass) gene phylogenetically closest to the published *Z. mays* BBM gene and the *Oryza sativa* BBM gene (Lowe et al., 2016, Plant Cell 28:1998-2015). Analysis of the domains in the protein encoded by this gene showed that it contained two domains shared by other grass proteins in this clade that were not present in *A. thaliana* BBM.

Further, variation was identified between dicot and monocot morphogene protein domains. These meant that a standard approach of identifying homologs/orthologs by sequence and/or motif similarity would not have successfully been able to identify these proteins. For example, the sugarcane homolog of AGL15 did not contain two protein domains present in the AGL15 proteins of *A. thaliana* and its close relative *B. napus*. Both the sugarcane and the *B. napus* AGL15 proteins were selected for further testing. Another known *A. thaliana* morphogene, RKD4, belongs to the RKD (A) subfamily of RKD-RW domain proteins, which is characterized by an additional undescribed C-terminal domain and a missing PB1 domain (Chardin et al., 2014 Journal of Experimental Botany 65(19):5577-5587). In the analysis, identified grass homologs of RKD4 were found to have this characteristic C-terminal domain ("motif 12"). In addition, grass homologs of RKD4 were found to have extra domains not present in dicot RKD4 sequences.

On the basis of the analyses described above, the twenty candidate morphogenes listed in Table 1 were selected for further evaluation.

TABLE 1

Candidate morphogene polynucleotides and polypeptides

| Species | Morphogene family | Polynucleotide sequence | Polypeptide sequence |
|---|---|---|---|
| *Saccharum spp. hybrid* | AGL15 | SEQ ID NO: 1 | SEQ ID NO: 21 |
| *Brassica napus* | AGL15 | SEQ ID NO: 2 | SEQ ID NO: 22 |
| *Saccharum spontaneum* | BBM | SEQ ID NO: 3 | SEQ ID NO: 23 |
| *Triticum urartu* | BBM | SEQ ID NO: 4 | SEQ ID NO: 24 |
| *Panicum hallii* | BBM | SEQ ID NO: 5 | SEQ ID NO: 25 |
| *Saccharum spontaneum* | ESR1 | SEQ ID NO: 6 | SEQ ID NO: 26 |
| *Setaria italica* | ESR1 | SEQ ID NO: 7 | SEQ ID NO: 27 |
| *Oryza longistaminata* | GRF5 | SEQ ID NO: 8 | SEQ ID NO: 28 |
| *Saccharum spontaneum* | GRF5 | SEQ ID NO: 9 | SEQ ID NO: 29 |
| *Saccharum spontaneum* | LEC2 | SEQ ID NO: 10 | SEQ ID NO: 30 |
| *Brassica oleracea* | LEC2 | SEQ ID NO: 11 | SEQ ID NO: 31 |
| *Brachypodium distachyon* | PLT2[1] | SEQ ID NO: 12 | SEQ ID NO: 32 |
| *Leersia perrieri* | PLT2 | SEQ ID NO: 13 | SEQ ID NO: 33 |
| *Panicum hallii* | RKD4 | SEQ ID NO: 14 | SEQ ID NO: 34 |
| *Saccharum spontaneum* | SERK1 | SEQ ID NO: 15 | SEQ ID NO: 35 |
| *Setaria italica* | SERK1 | SEQ ID NO: 16 | SEQ ID NO: 36 |
| *Saccharum spontaneum* | STM | SEQ ID NO: 17 | SEQ ID NO: 37 |

TABLE 1-continued

Candidate morphogene polynucleotides and polypeptides

| Species | Morphogene family | Poly-nucleotide sequence | Polypeptide sequence |
|---|---|---|---|
| *Saccharum spontaneum* | WIND1 | SEQ ID NO: 18 | SEQ ID NO: 38 |
| *Brassica napus* | WIND1 | SEQ ID NO: 19 | SEQ ID NO: 39 |
| *Panicum hallii* | WUS | SEQ ID NO: 20 | SEQ ID NO: 40 |

[1]Also known as EMK1.

Example 2: Testing of Candidate Morphogenes and Assessment of the Ability of Candidate Morphogenes to Increase Transformation and Regeneration Efficiency The following example describes testing of candidate morphogenes to identify their effectiveness. In addition, the example describes testing of candidate morphogenes using a visual reporter construct in order to assess transformation and regeneration efficiency in sugarcane cells.

Materials and Methods

Plasmids and Candidate Morphogenes

Individual morphogenes were tested using the same expression system with the same promoter, terminator, reporter, and selectable marker. Plasmids with the expression cassettes pBdUbi10::morphogene::tPin2A, pScBv::tdTomato: tAtHsp, and pZmUbi1::nptII::tNOS were used (FIG. 1). These plasmids used the visual reporter tdTomato as a model transgene of interest. FIGS. 4A-4B and 5A-5B provide the candidate morphogenes that were tested (see also Table 1, above). These morphogenes were driven by a ubiquitin promoter, pBdUBi10 (Coussens, G., et al. (2012). *Brachypodium distachyon* promoters as efficient building blocks for transgenic research in maize. Journal of experimental botany, 63(11), 4263-4273), as shown in FIG. 1.

In addition to the plasmids testing morphogenes, two control plasmids were tested. One control plasmid contained GFP in place of the candidate morphogene sequence, and was used as a negative control. The other control plasmid contained WUSCHEL (U.S. Pat. Pub. No. 2017/0121722) in place of the candidate morphogene sequences, and was used as a positive control.

The expression cassette (FIG. 1) included restriction sites intentionally designed to allow exchange of expression cassette components. For one, different promoters can be inserted for testing to optimize expression of the morphogenes. For another, different morphogenes (or multiple morphogenes) can be tested within the same plasmid design. Finally, the selection marker can be removed if necessary. These plasmid modifications may be employed during testing.

Testing Systems

The first testing system used the low-transformable sugarcane tissue of leaf disks from a moderately recalcitrant sugarcane variety. The second testing system used callus cells from a highly recalcitrant sugarcane variety.

The quantification of each testing system was done in two ways. The first of these was the reporter fluorescence, and the second of these was the timing and amount of embryogenic callus.

*Agrobacterium* Transformation Protocol for Leaf Disk Transformation (Moderately Recalcitrant Variety)

On Day 1, sugarcane tillers of the moderately recalcitrant sugarcane variety were induced on media. On Day 2, transformation was done. Induced sugarcane leaf disk cells were transformed with *Agrobacterium* strain AGL1 containing the plasmids described above. The use of leaf disk cells for transformation was for preliminary evaluation.

For each construct, about 50 leaf disks were used. The leaf disks were sonicated in infection medium for 5 minutes. Then, they were vacuum-infiltrated with the *Agrobacterium* suspension ($OD_{600}$=0.5)+200 μM acetosyringone for 10 minutes. The mixture was shaken at 65 rpm, 28° C. for 10 minutes. Subsequently, the leaf disks were dried on filter paper in a hood for about 20 minutes. After drying, the leaf disks were transferred to co-culturing media.

After 3 days of co-cultivation, the leaf disks were transferred to resting media on Day 5. On Day 11, the leaf disks were transferred to selection media containing geneticin.

Proliferation of callus clusters expressing tdTomato was quantified at the start of selection (Day 11) and every 7 days thereafter (Day 18, Day 25, and Day 32) for a total of 4 weeks. The expression of TdTomato was indicative of how many cells were successfully co-transformed with the morphogene and the fluorescence gene (e.g., TdTomato), and was used as a proxy for transformation efficiency.

*Agrobacterium* Transformation of Callus Tissue (Highly Recalcitrant Sugarcane Variety)

In a further experiment, callus cells of the highly recalcitrant sugarcane variety were transformed with *Agrobacterium* strain AGL1 containing the plasmids described above. The use of callus cells is for stable transformation and for producing regenerated plants.

Microprojectile Bombardment Transformation

In another experiment using the plasmids described above, pre-callus sugarcane leaf disk cells are transferred to osmotic media for 4 hours prior to microprojectile bombardment. The use of leaf disk cells for transformation is for preliminary evaluation. Bombardment is carried out with a Biolistic-PDS100 system (Biorad) as follows: 100 μg of 0.6 μm gold particles were coated with 100 ng vector using TransIT. After incubating on ice and pelleting by centrifugation, supernatant is removed and the gold particles are resuspended in 70% ethanol. Once the suspension is allowed to dry onto macrocarriers, it is propelled into sugarcane leaf disks using 1000 psi of pressure in −27 in Hg vacuum from a distance of 6 cm.

Bombarded leaf disks are left on osmotic medium overnight at 27° C. and then transferred to resting media for 7 days. Next, disks are transferred to selection media containing geneticin. The rest of the experiment is conducted as detailed for *Agrobacterium* transformation above.

In an additional experiment using the plasmids described above, sugarcane callus cells are exposed to microprojectile bombardment using a standard particle bombardment protocol for sugarcane. The use of callus cells is for stable transformation and for producing regenerated plants.

Results

Figure 4A:
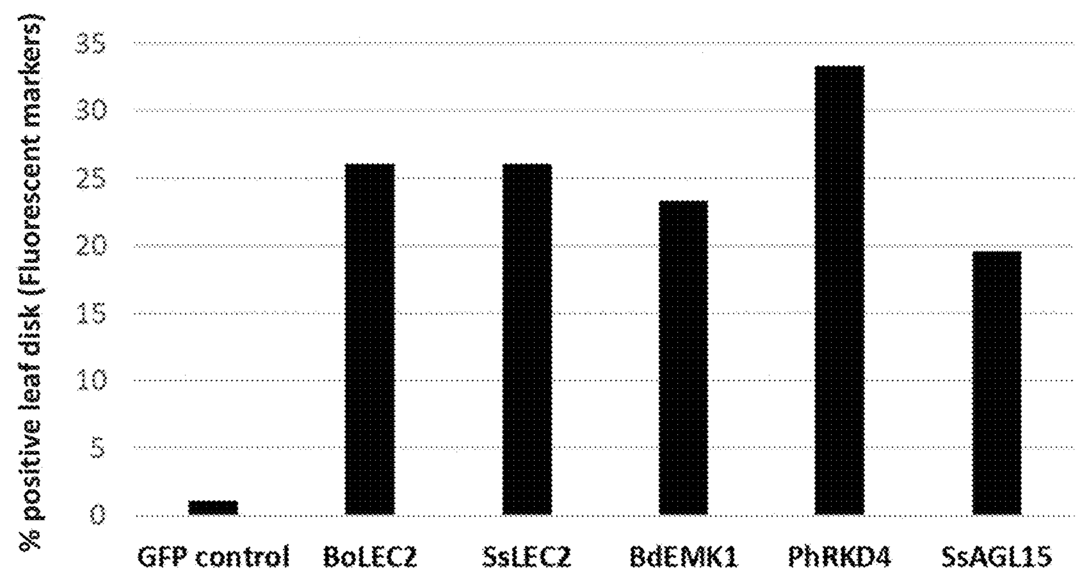
FIGS. 4A-4B show the results of leaf disk transformation of a sugarcane variety considered a moderately recalcitrant variety for transformation.
Figure 4B:
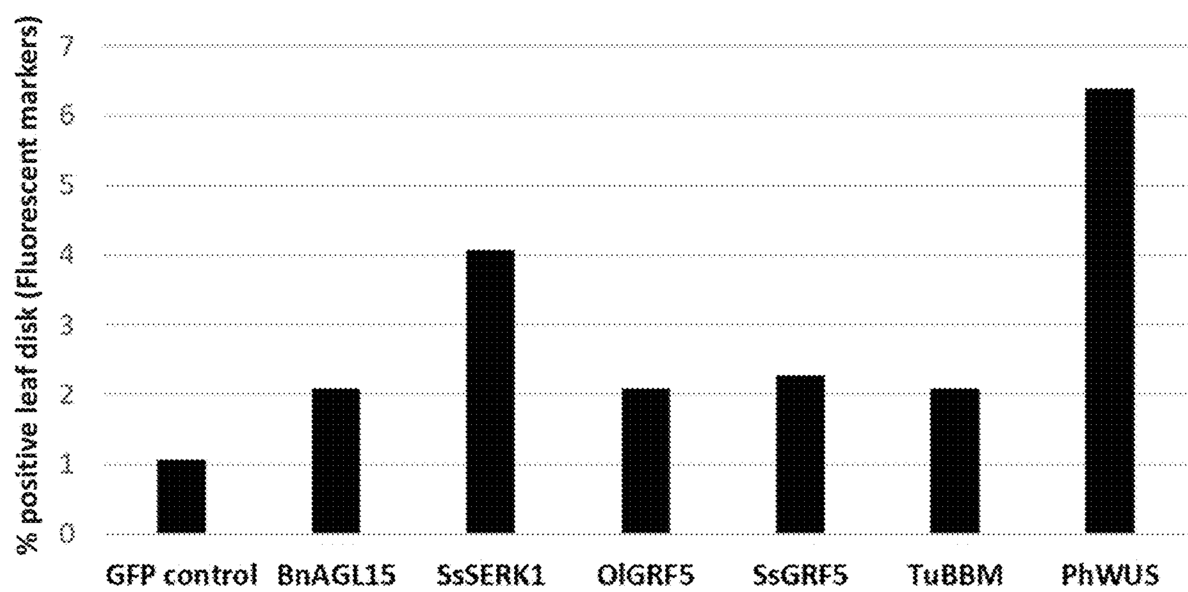

FIGS. 4A-4B show the experimental results for leaf disk transformation of the moderately recalcitrant sugarcane variety. The percentage of disks with tdTomato fluorescence clusters is shown after 21 days from the beginning of the experiments. Visualization of tdTomato fluorescence was used to observe increase in cell proliferation for leaf disks. Relatively high cell proliferation was seen for leaf disks transformed with plasmids containing some of the candidate morphogenes such as PhWUS, BdEMK1/BdPLT2, PhRKD4, BoLEC2, ScLEC2, and SsAGL15. Further, this increase was shown relative to the cell proliferation of callus clusters transformed with a control vector containing GFP (negative control) in place of the morphogene coding sequence.

As can be seen from the results shown, a number of effective morphogenes were identified. Foremost among them were PhRKD4 and BdEMK1/BdPLT2. Additional promising candidates included BoLEC2, SsLEC2, SsAGL15, and PhWUS.

Figure 5A:
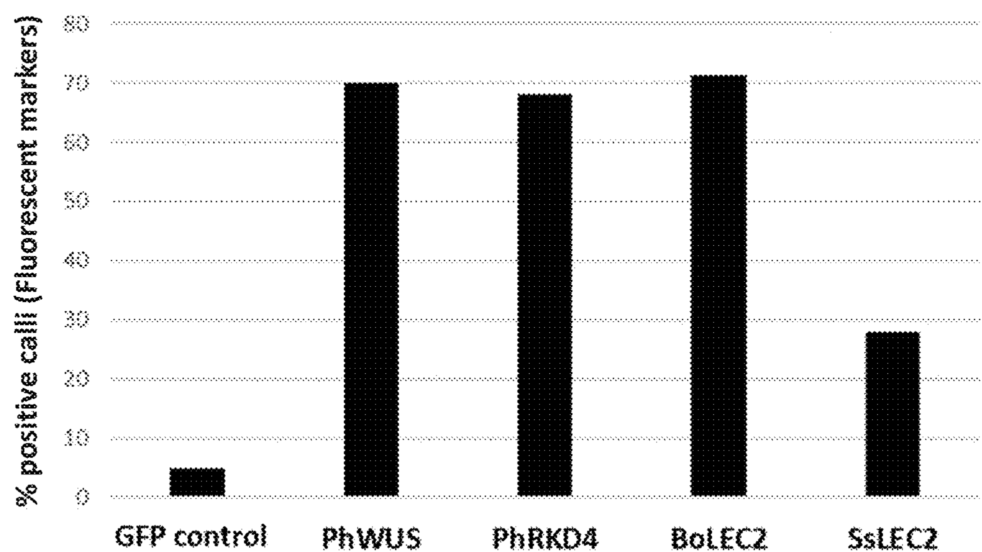
Figure 5B:
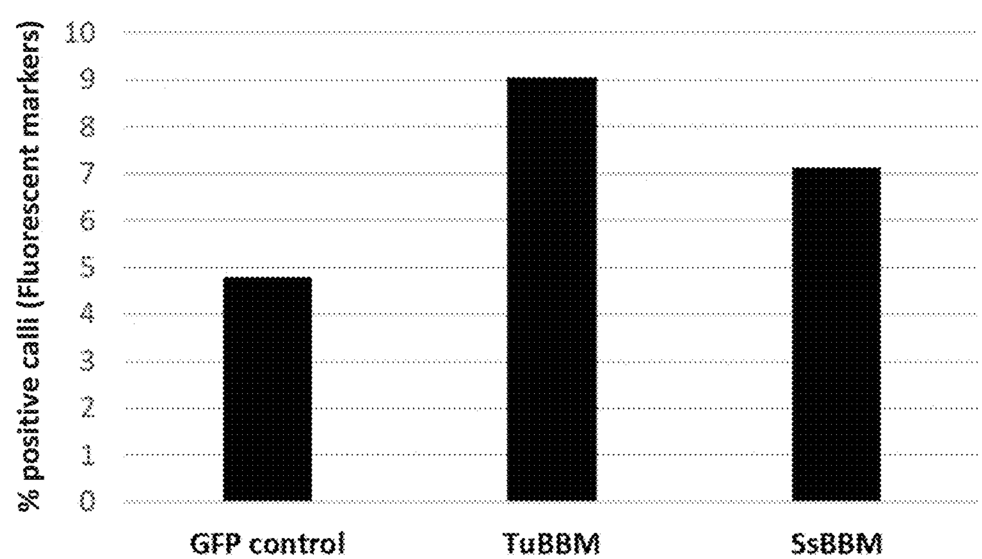
Figure 5C:
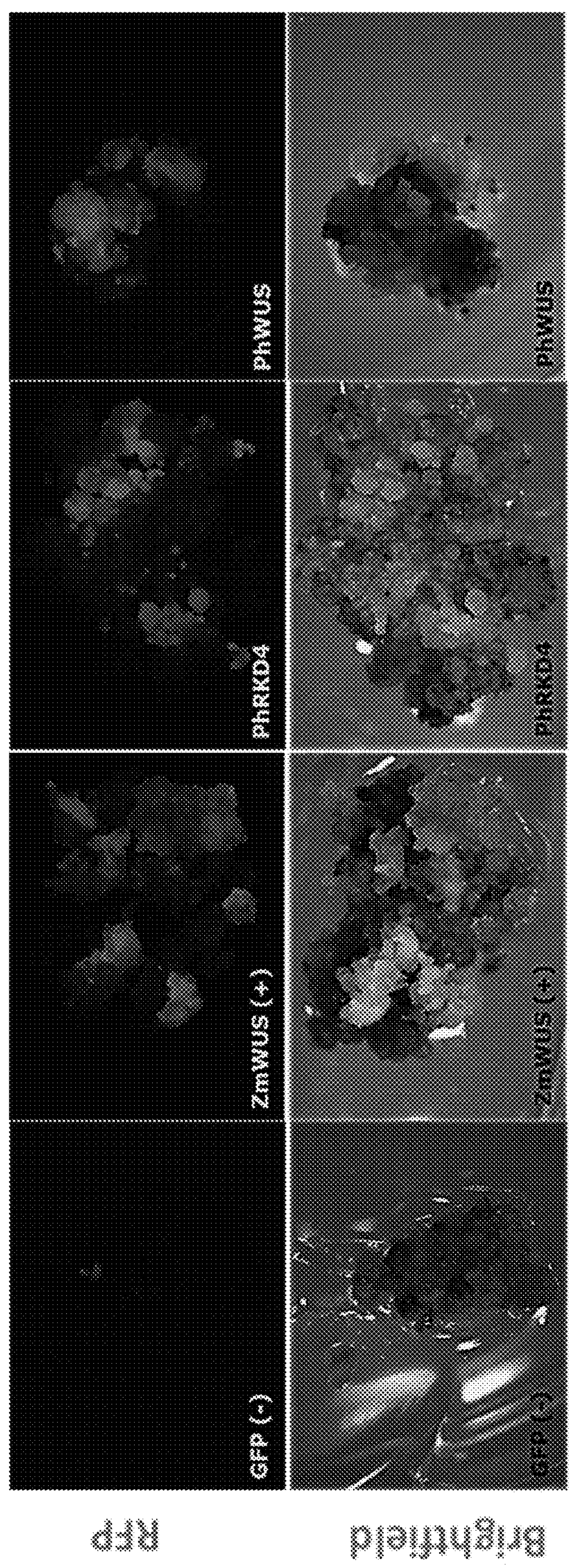
Figure 5D:
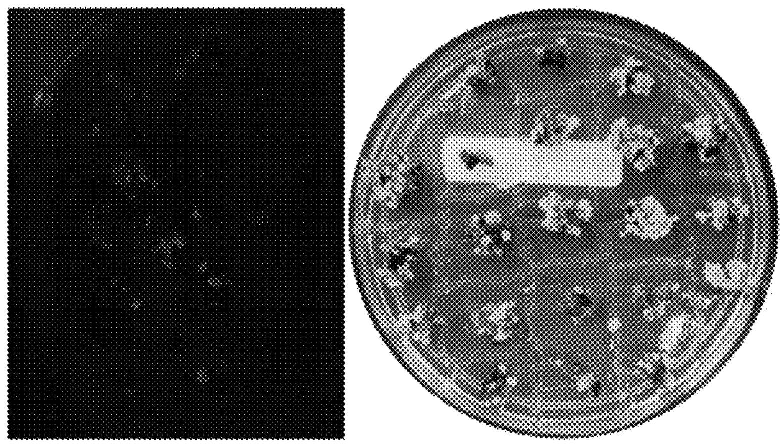
Figure 5D:
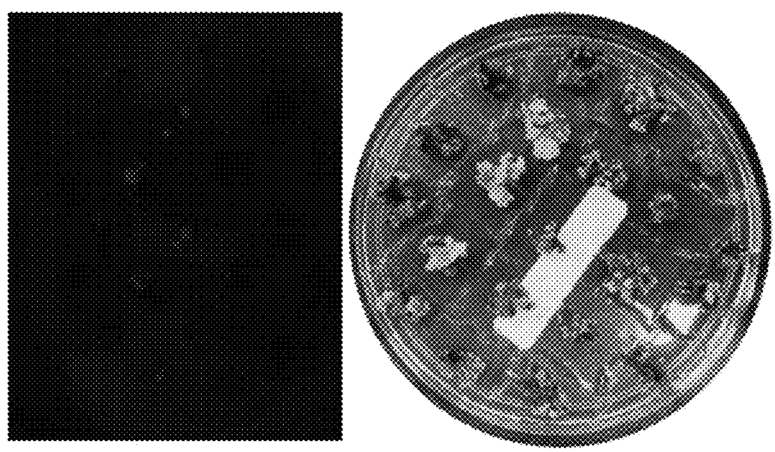
Figure 5D:
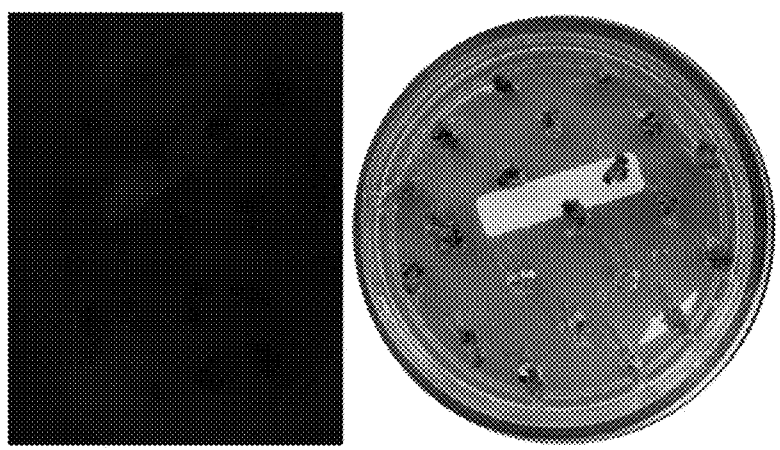
Figure 5E:
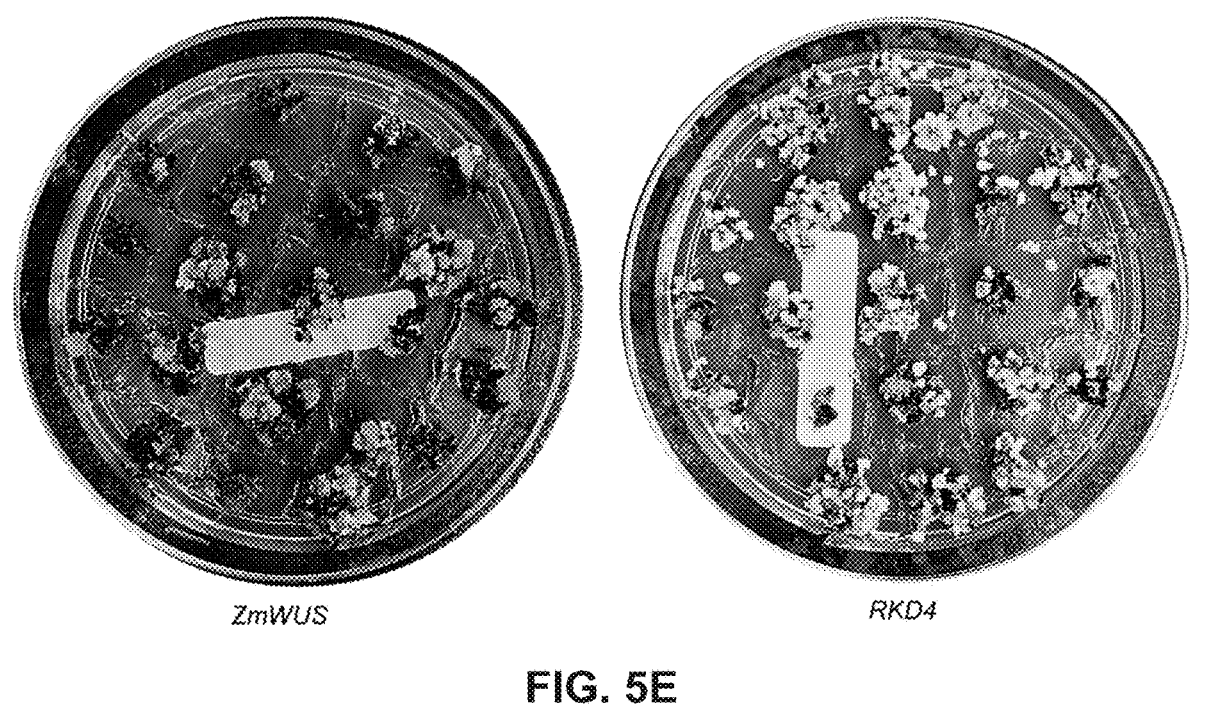

FIGS. 5A-5E show the experimental results for callus transformation of the highly recalcitrant sugarcane variety. FIGS. 5A-5B show summary graphs of the results of transforming sugarcane calli with candidate morphogenes. These results identified a number of effective morphogenes, primarily PhRKD4, BoLEC2, SsLEC2 and PhWUS. Without wishing to be bound by theory, it is thought that these four candidate morphogenes may be suitable for transforming both moderately recalcitrant sugarcane varieties and highly recalcitrant sugarcane varieties. FIG. 5C shows that multiple areas of fluorescence were observed in the callus transformed with the ZmWUS positive control, the PhRKD4 morphogene, and the PhWUS morphogene (light areas in RFP images), but no fluorescence was observed in the GFP negative control. FIG. 5D shows that the calli transformed with the ZmWUS positive control and the PhRKD4 morphogene grew more (e.g., proliferated), than the calli transformed with the GFP negative control. FIG. 5E shows a comparison of the calli transformed with the ZmWUS positive control and the PhRKD4 morphogene.

The transformed callus cells will be used to regenerate plantlets and plants for further evaluation.

The results of these tests will provide information regarding the efficacy of the morphogene itself and with additional hormones or triggers to enhance morphogene effect of cell division/embryo formation. The most effective morphogenes identified in these tests will be used for further testing.

Example 3: Co-delivery of Candidate Morphogenes With Genes of Interest to Sugarcane Leaf Disks or Callus The following example describes the co-delivery of candidate morphogenes with genes of interest (e.g., genome editing reagents) using a single plasmid containing a selectable marker. The genome editing reagents are used to edit the sugarcane genome and generate "native traits" based on the edited phenotype.

Materials and Methods

Homologous Recombination (HR) Events

In a first option, a single construct containing genome editing reagents pSCBV-ScoLbCPF1-LWcrRNAarray-tAtHSP18 and HR template, a fluorescent reporter pFMV-erGFP-Pin2A, a selectable marker pZmUbi-NPTII-T-Nos and candidate morphogenic genes is used. In a second option, a construct containing genome editing reagents pSCBV-ScoLbCPF1-LWcrRNAarray-tAtHSP18, a fluorescent reporter pFMV-erGFP-tPin2A, a selectable marker pZmUbi-NPTII-T-Nos, and candidate morphogenic genes is used, and the HR template is delivered separately. In a third option, a construct a fluorescent reporter pFMV-erGFP-tPin2A, a selectable marker pZmUbi-NPTII-T-Nos, and candidate morphogenic genes is used, the HR template is delivered separately, and the genome editing reagent is delivered separate in the form of a ribonucleoprotein (RNP). Table 1, above, describes the candidate morphogenic genes, and FIG. 2A illustrates the three options.

In order to generate, e.g., homologous recombination (HR) events, the plasmids described above are delivered to sugarcane leaf disks or sugarcane callus cells using either *Agrobacterium* transformation or particle bombardment as described in Example 2 and shown in FIG. 2A. HR events are suitable for testing as they can be used both to create small edits in a native gene or to insert a larger segment of DNA for the purposes of site-directed integration (SDI). Selection genes, e.g. geneticin, are used to screen the regenerated plants with stable integration of the transgene for the desired KO edits.

Knockout (KO) Events

In a first option, a single construct containing genome editing reagents pSCBV-ScoLbCPF1-LWcrRNAarray-tAtHSP18 (yellow arrow), a fluorescent reporter pFMV-erGFP-tPin2A (navy arrow), a selectable marker pZmUbi-NPTII-T-Nos (purple arrow), and morphogenic genes (bright blue box) is used. In a second option, a construct containing a fluorescent reporter pFMV-erGFP-tPin2A (navy arrow), a selectable marker pZmUbi-NPTII-T-Nos (purple arrow), and morphogenic genes (bright blue box) is used, and the genome editing reagent is delivered separately in the form of ribonucleoprotein (RNP). Table 1, above, describes the candidate morphogenic genes, and FIG. 2B illustrates the two options.

In order to generate knockout (KO) events, the plasmids described above are delivered to sugarcane leaf disks or sugarcane callus cells using either *Agrobacterium* transformation or particle bombardment as described in Example 2 and shown in FIG. 2B. Selection genes, e.g. geneticin, are used to screen the regenerated plants with stable integration of the transgene for the desired KO edits.

Results

Co-delivery of candidate morphogenes with genome editing reagents will result in improved HR and KO event outcomes. As HR occurs naturally in cells that are actively dividing, the morphogenes will increase the HR event efficiency, because the morphogenes directly increase the rate of cell division. For KO edits, the morphogenes will enable cells to be transformed more efficiently with the necessary genome editing reagents. The use of morphogenes will not result in higher KO event efficiencies, as the morphogenes are used for the transformation part of the gene editing.

Example 4: Generation of Transgene-free Knockout Events Using Genome Editing

The following example describes the co-delivery of candidate morphogenes with genome editing reagents in order to produce transgene-free knockout events.

Materials and Methods

Transgene-free Knockout (KO) Events

In a first option, a single construct containing genome editing reagents pSCBV-ScoLbCPF1-LWcrRNAarray-tAtHSP18, a fluorescent reporter pFMV-erGFP-tPin2A and candidate morphogenic genes is used. In a second option, a construct containing a fluorescent reporter pFMV-erGFP-tPin2A and candidate morphogenic genes is used, and the genome editing reagent is delivered separately in the form of ribonucleoprotein (RNP). Table 1, above, describes the candidate morphogenic genes, and FIG. 3 illustrates the two options.

In order to generate transgene-free knockout (KO) events, the plasmids described above are delivered to sugarcane leaf disks or sugarcane callus cells using either *Agrobacterium* transformation or particle bombardment as described in Example 2 and shown in FIG. 3.

Without selection, regenerated plants are screened for the desired KO edits without the transgene integration. Genes providing visual markers (e.g., LemonWhite, GFP, etc.) are used to screen for edits and/or are used for sequence-based analysis. Preferably, a phenotype is observed, and a confirmation of the edit is made using sequence information. The absence of the transgene is confirmed using sequence-based tools, e.g., PCR or sequencing.

Results

Co-delivery of candidate morphogenes with genome editing reagents will result in transgene-free KO events.

Example 5: Testing Combinations of Candidate Morphogenes

The following example describes testing of combinations of candidate morphogenes to identify their effectiveness.

Materials and Methods

Plasmids and Candidate Morphogenes

Combinations of the most effective morphogenes identified in Example 2 are tested. Different promoters are used for high expression testing and low expression testing, and various promoter combinations are used to fine tune morphogene expression.

Testing Systems

Dose/pulse experiments with different promoter combinations are used to determine the level of expression required. The timing of application and transformation is varied.

Results

Optimal combinations and expression levels of morphogenes will be identified.

What is claimed is:

1. A method of producing a sugarcane plant, comprising:

a) providing sugarcane cells or tissue;

b) introducing at least one morphogene nucleotide sequence comprising SEQ ID NO: 10 or SEQ ID NO: 11 into sugarcane cells or tissue and (i) at least one transgene nucleotide sequence, or (ii) at least one nucleotide sequence encoding a CRISPR/Cas enzyme and a targeting sequence or a ribonucleoprotein complex comprising a CRISPR/Cas enzyme and a guide RNA, wherein the targeting sequence or the guide RNA targets one or more gene sequences in the sugarcane genome to produce genetically modified sugarcane cells including one or more edited gene sequences; and c) cultivating the sugarcane cells for proliferation and/or regeneration, wherein the introduction of the at least one morphogene nucleotide sequence in step (b) is transient.

2. The method of claim 1, further comprising:

d) cultivating the sugarcane cells of step (c) into plantlets; and e) growing the plantlets into plants, wherein the plants comprise (i) the at least one transgene nucleotide sequence or (ii) the one or more edited gene sequences.

3. The method of claim 1, wherein the at least one morphogene sequence comprises SEQ ID NO: 10 and SEQ ID NO: 11.

4. The method of claim 1, wherein the at least one transgene nucleotide sequence is introduced in step (b), and further comprising screening the sugarcane cells between steps (b) and (c) for the transgene nucleotide sequence, screening the sugarcane cells during step (c) for the transgene nucleotide sequence, or screening the sugarcane cells after step (c) for the transgene nucleotide sequence, and optionally further comprising selecting the transgenic sugarcane cells between steps (b) and (c), or selecting the transgenic sugarcane cells after step (c), optionally by using selectable markers.

5. The method of claim 1, wherein step (b) is achieved through *Agrobacterium* transformation.

6. The method of claim 1, wherein the at least one nucleotide sequence encoding a CRISPR/Cas enzyme and a targeting sequence or the ribonucleoprotein complex comprising a CRISPR/Cas enzyme and a guide RNA is introduced in step (b), and further comprising screening the sugarcane cells between steps (b) and (c) for the one or more edited gene sequences, screening the sugarcane cells during step (c) for the one or more edited gene sequences, or screening the sugarcane cells after step (c) for the one or more edited gene sequences, and optionally further comprising selecting the genetically modified sugarcane cells between steps (b) and (c), or selecting the genetically modified sugarcane cells after step (c), optionally by using selectable markers.

* * * * *

SEQUENCE LISTING

```
Sequence total quantity: 40
SEQ ID NO: 1            moltype = DNA  length = 672
FEATURE                 Location/Qualifiers
source                  1..672
                        mol_type = unassigned DNA
                        organism = Saccharum hybrid
SEQUENCE: 1
atggggaggg aaaggattgc aattcgtcgg attgacaacc tcgccgcacg gcaggtcacc  60
ttctccaaga gacgccgggg actgttcaag aaagccgagg aactcagcat actctgcgat  120
gccgaggtcg gcctcgttgt attctccgca acgggtaaac tcttccactt cgcctctacg  180
tctatgaagc aggtgatcga tcgttacgac tcccactcca agaatctcca aaagagtgag  240
gctcttagcc agctacagag ccatattgat gacggcactt gctcgcggct caaggaggaa  300
ctcgcggaaa cgagcctaaa gctccgccag atgagggggg aagagttgca gcgactcagt  360
gtgcagcaac tacaggagtt ggaaaagacc ttggaatccg gcctgggtag tgtccttaag  420
acgaagagcc agaagatcct cgatgagatt tctggcctgg aacggaagcg gatggagttg  480
atcgaggaaa acagcaggct taaggaacag gtaacccata tggccaggat ggagacccag  540
ctcggcgtgg acagcgagat tgtgtatgaa gaggggcagt ctagcgagag cgtcacgaac  600
accagttatc cgcggccaag caccgatacg gatgactgca gcgataccag tctcaggttg  660
ggtctgccct aa                                                    672

SEQ ID NO: 2            moltype = DNA  length = 795
FEATURE                 Location/Qualifiers
source                  1..795
                        mol_type = unassigned DNA
                        organism = Brassica napus
SEQUENCE: 2
atggggaggg gcaagattga aattaagcgt attgagaacg ccaacagccg gcaggtcacc  60
ttctccaaga gacgcgcggg actgcttaag aaagcccatg aactaagcgt cctgtgtgac  120
gccgaagtgg ccgttatagt gttcagcaag tctggcaagc tgttcgagtt ctcttccact  180
cgctgcatga agaaaaccct tttgaggtac ggcaactacc agattagctc agatgtccct  240
ggtattaacc gcaaagcgga aaatcaggag tgcactgaag tggatctcct taaggacgag  300
```

```
atatccatgc tacaagagaa gcatttgcaa atgcagggca agcggctgaa cctcctttct  360
ctaaaggagt tgcaacatct ggagaaacag ctgaatttta gtctcatttc agtgagggaa  420
cgaaaggagc tccttctgac gaagcagctg gaagagtcga ggttgaagga gcaacgggca  480
gaactggaga atgaaacgct aaggcggcag gtgcaggagc ttaggtcctt cctcccatca  540
attaatcagc actatgttcc tagttacata aaatgcttcg cgatcgatcc gaagaaaagt  600
ctcctgtcga acacgtgcct aggtgacatc aactgctctc ttcagaacac aaatagcgat  660
acaacccttc aactcgggct cccaggagag gctcacgaca cacgcaagaa cgagggtgat  720
agggagtcgc catccagtga tagcgtgacc acgtccacca ctagagctac agcacaaaga  780
atctcgttgg tctaa                                                   795

SEQ ID NO: 3            moltype = DNA  length = 2061
FEATURE                 Location/Qualifiers
source                  1..2061
                        mol_type = unassigned DNA
                        organism = Saccharum spontaneum
SEQUENCE: 3
atggcgtcag ccaacaattg gttgggattt tctttgtctg gccaagacaa cccacagccg  60
aaccaccaag attcgagccc ggcggcagcg ggcatcgaca tcagcggagc aagcgacttt  120
tacggcctcc ccacccagca aggatccgat ggacatttgg gcgtccccgg cctgcgcgat  180
gaccatgctt cctacggcat catggaggct ttcaaccgcg tgccgcagga gacacaagat  240
tggaacatgc gtggtcttga atacaacggg ggaggttcgg agctgtctat gctcgtgggt  300
agctcgggcg gagggggagg gggaggcaag agggcggttg aggatagtga gccgaagctc  360
gaagattttc taggcggtaa tagctttgtg tctgaacagg accagtctgg cggatatctc  420
ttcagtggag tgcccatggc cagctcgacg aattctaact ccggatcgaa cactatggag  480
ttgagcatga ttaaaagctg gctgcggaat aaccaagtgc cacaaccgca gccccctgcc  540
gctccccacc agccacaacc cgaggaaatg tcgactgacg cttctgctag ttccttcggc  600
tgctccgaca gtatgggtcg caatggcaca gtggctgccg cgggcagctc tcaaagtctc  660
gccttgtcga tgtcaaccgg atcccacctg ccaatggtag tggccggagg gggcgccagc  720
ggggctgcct cagaatccac gtccagtgag aataaacgag cgagcggggc catggatagc  780
cccggctccg cggtcgaggc agttccaaga aaaagcatcg atactttcgg ccaacggaca  840
tcgatttaca gaggggtcac tagacatcgc tggactggac gttatgaagc tcacctgtgg  900
gataattcat gccgccggga aggccagtct cggaaaggaa ggcaagtgta cttgggcggt  960
tacgacaaag aagataaggc cgctagagcc tatgacctgg ccgcactcaa gtattggggg  1020
accacaacta ccacaaattt cccgatttca aactacgaga aggaggtgga ggaaatgaaa  1080
cacatgacta gacaggaata catcgcatat ctccgcagga attcttccgg gttctcccgc  1140
ggcgcttcta agtacagggg tgttacgcgg caccatcagc acggccgctg gcaagctcgc  1200
attggccgtg tggcgggtaa caaagatctt tacctgggta ccttttccac ggaggaagag  1260
gccgctgaag cctatgacat cgctgccatt aaattccggg ggctgaacgc agtcaccaac  1320
ttcgatatga gtcgatacga cgttaagagc atcttggaat catccactct gccggtaggc  1380
ggtgccgcga ggcgcctgaa ggacgctgtt gaccacgtgg aagctggagc aactatctgg  1440
cgcgctgaca tggacggcgg agtaatatca caacttgcag aggcgggtat gggaggctac  1500
gcgagctacg gtcaccatgg ctggccaacc attgccttcc agcaaccgtc gccactgtca  1560
gtccactatc catatggcca gcctccgtcg cgtgggtggt gtaagccaga gcaggacgct  1620
gcggtggcgg cagctgcaca ctccctccag gacctgcagc aacttcactt gggttccgct  1680
gcggcacaca atttctttca ggccagttcc tctagtgccg tgtacaactc gggcggggca  1740
gcctccggcg gatatcaggg tctcggaggc gggggttcct cgttcctgat gccaagtagc  1800
acggtcgtgg cagccgcaga ccaaggacat agttctacag ccaaccaagg ttccacttgc  1860
agttatggag atgaccacca ggagggaaag cttataggtt acgacgccat ggttgccgca  1920
acggcggctg caggtggaga tccctacgcg gctgcgcgct ctgggtacca gttcagtcag  1980
ggatccggca gcactgtgtc aatcgccagg gcgaacggat atagcaacaa ttggtcttcg  2040
cctttcaatg gaatgggata a                                            2061

SEQ ID NO: 4            moltype = DNA  length = 1455
FEATURE                 Location/Qualifiers
source                  1..1455
                        mol_type = unassigned DNA
                        organism = Triticum urartu
SEQUENCE: 4
atggcgtcag ccaacaattg gttgggattt tctttgtctg gccaaggctc ccaccctcag  60
ccacaccaaa atggtagccc ggcggcagcg gccatcgacg ggacttcta cggactgcag  120
gcccagaccg ccccagatgc acacctggga atgtcctctc tcagggccga cgccaactat  180
ggggttatgg acgccttcaa cggggggtaca caagagaccc aggattgggc gatgaggggc  240
cttgactatc atggtggatc cagcgagctc tctatgcttg tgggctctag cgggggtaga  300
atgacggtgg acgatgggga agcgccaaaa cttgaagatt ttctcggggg caattcgttc  360
tcagacgcgc aggaccacgc tggtagctat ctgtttagct ccggctccgc tatgggcagt  420
ggggccgcga gtggatcaca cggcgtcgat gggcggggtg gctccacaat tgaattgtcc  480
atgattaaaa cgtggctcag aaacgataat aacgaagctc aacacgatca ggagatgtcg  540
gccgatgcct ccgccacaag ctacgcgtgt tcgggcgctc ctggtagtac cagcaacggg  600
gtgggcgtcg cttcgtccag gggacagggt ctggcgctca gcatgtctat gggcagtaac  660
tcacatcctc agatgcccgt agtgccagcg gcagtaggga ccgaatccac cagtagcgag  720
aataagaggg tagattcccc gtcagctggg accgccgatg cagtgcaacg gaaatcaatc  780
gacaccttcg ggcaacgtac aagcatatac cgaggtgtta ccaggcaccg gtggacaggt  840
cggtacgaag ctcacttgtg ggacaattcc tgtagacgtg agggccagac ccgcaagggt  900
aagcaaggcg gttacgacaa ggaggataaa gcagccaggg cgtacgatct ggcggcactc  960
aaatactggg ggacgaccac tacaacgaat atccccatca gcacatatga gaaggagata  1020
gaggaaatga agcacatgac gcgccaggag tacatagcat acttgcgacg caatagctca  1080
ggtttctcta gaggggccag caagtaccgc ggcgtgactc gccatcacca acaggggcgc  1140
tggcaggctc gtattggaag ggttgctggg aataaggacc tgtaccttgg cacttttacg  1200
accgaggaag aggcggctga ggcgtacgat attgcagcga ttaagtttcg cgggcttaac  1260
```

```
gctgtcacca atttcgagat gtctcgctat gacgtgaagt cgatcctcga aggctcaaca  1320
ctcccgacct gcatgctacc gtgtatgcat ttcacggcta agtcaaactc tgcctcggaa  1380
aggcttaaat ccatagagct gtctaccggg cagtgcacaa tcttcgctaa cgtccagaag  1440
cagtttgaca cctaa                                                   1455

SEQ ID NO: 5            moltype = DNA  length = 2139
FEATURE                 Location/Qualifiers
source                  1..2139
                        mol_type = unassigned DNA
                        organism = Panicum hallii
SEQUENCE: 5
atggcgaccg tcaacaattg gttggcattt tctttgtctc cccaagacct gccaccttcc  60
caaaccgact ccactctaat ctcggcagcg gccacggacg aggtcagcgg agacgtgtgt  120
ttcaacatcc cccaagattg gggaatgcgc gggagcgagt tgagcgccct ggtctcagag  180
cctaagttgg aggacttcct cgggggtatc aacttctccg agcagcatca caaagccaat  240
ctcaatgtta ttccatccag ctcgagcact tgttatgcct ctagcggggc tagcacgggc  300
taccatcacc aactgtacca ccatccgagt tccgctctcc atttcgctga ttcagtcatg  360
gtcgcgtcta gcgccggtgt tcacgatggc ggtgcaatgc tgtccgcggc tgccgcaaat  420
ggcggggccg gagccgcggg cgcaaatggg ggctctatcg ggctctcgat gatcaagaat  480
tggttgaggt cgcaaccagc ccctccgcca cagccaaggg tggccgtggc ggagggggcc  540
caggccgcac aaggcctttc gcttagtatg aatatggctg gtacccaggg agccgggatg  600
ccgctgctcg ctggggagag gggacgagct ccggagagtg tatctaccag tgcccagggt  660
ggggccgtcg cagcgagaaa ggaagactcg ggcggagcgg gcgccctcgt ggctgtgtca  720
acagatacgg gcgggtctgg gggagcctcg gcagagaccg ttgcacgaaa gaccgtggac  780
acgttcggtc aaagaacaag catctatcgt ggcgtcacac ggcaccggtg gacgggcaga  840
tatgaagctc acctttggga taatagctgt cggagggagg gccagacgcg gaagggacgc  900
cagggagggt acgataagga agagaaagcc gcacgcgcct atgaccttgc cgcgctaaaa  960
tattggggc ccactacaac gactaacttc cccgtaagca attatgagaa ggaattggag  1020
gaaatgaaac atatgacccg ccaggagttc gtcgcctctc tgcgccgaaa aagttctgga  1080
tttagccgcg gcgcatcgat ctacaggggg gttacgcgcc accatcagca cggccgttgg  1140
caggctagga taggtcgtgt ggctggcaac aaggaccttt acttggggac gttctctacg  1200
caggaggaag cggccgaggc gtacgacatt gcggctatca agtttagggg tctcaacgct  1260
gtcaccaatt ttgatatgag ccgatatgat gtgaagagca tcctcgacag ttccgccctg  1320
ccaatcggtt ctgcagcgaa gaggctcaag gaggccgagg cagccgctag cgcgcaacat  1380
cacgccggtg tggtttcgta cgacgtggga cgtatagcat ctcagctggg tgacggcggg  1440
gccctagcag cgtacggtgc acattatcat gcagccgcag ctgcagcctg gcctacaatc  1500
gcattccagc caggcgccac cgcgggactg taccacccat atgcacagcc gcttcctcgg  1560
gggtggtgta agaaagagca ggaccatgct gtaattgctg cggcccactc tctccaagag  1620
ctcaatcacc tgaaccttgg cgctggtgcg catgatttct tttccgctgg ccaggccgcg  1680
atgcacggtc tcggctccat agacaattca agtctcgaac attcaaccgg gtctaattca  1740
gtcgtgtaca atggggtggg cgacagcaac ggcggtgcag tgggaggcgg atacatgatg  1800
accatgagcg cggccgctgc aaccacaacc gctatggtgt cgcacgaaca ggtacatgcc  1860
cgggcccaag gcgatcacga tgaggcatcc aagcacgccg cgcagatggg gtacgagagc  1920
tatctgatga acgcggaggc tgcgtatggg ggaggcagaa tgccctcctg gacacgccca  1980
agattgcata ggtggcgcag gcgccaggca gccactacaa cctggcctgc tttggccatg  2040
gctgcaagat cgtcatcggt ttctggtatg accctcaaca aattgcggac gcccacccgg  2100
cacaggggga agaaatatgc ggacatatcg aatacctaa                        2139

SEQ ID NO: 6            moltype = DNA  length = 729
FEATURE                 Location/Qualifiers
source                  1..729
                        mol_type = unassigned DNA
                        organism = Saccharum spontaneum
SEQUENCE: 6
atggggacca acccccgtct acaggagttg gctgccgtcg tggtcgcagc tgccgactca  60
gaaccgcggc cacgcgcgag agtggtccgc atcctggtcc acgacgcaga cgctaccgac  120
agctccagct ctgaagatga ggcaccgcct ccaccgcccc caccgcgccg tcgcgctcgc  180
ggcgggagtt cgtctgtcgg agtgcgccga catgtgatgg aaccagctgg cgcttcgtct  240
gcagtgagat tcaggggtgt gcgcaggcgt ccatgggggc ggtgggcagc ggagatacgc  300
gacccgcaca gccgcaggcg cttgtggctc gggaccttta ataccgccga agaggcggct  360
aacgcctatg atgcagctaa cattagattc cgcggggcta gtgccccgac caacttccca  420
gccgcgcgat actccccgcc tccggagccg gcaaagccca ttatctctct cacgccagaa  480
cccgggaagg tcattacact cccgcccgtg ccggtcaagc ccaccttccc actacaggtg  540
aaggaggaag gcggttcttg tgacggccaa gtcaagggcg cgagttctga ggttaaagca  600
ttcgctccga agcccgtatg ggagatgatc ccaagtaagc ggcagaagta cccagggtgc  660
gcggacggat cgggcctccg cgccatccac gcggcttcca tctacgtgga ggaagtgggc  720
ggtgcgtaa                                                          729

SEQ ID NO: 7            moltype = DNA  length = 870
FEATURE                 Location/Qualifiers
source                  1..870
                        mol_type = unassigned DNA
                        organism = Setaria italica
SEQUENCE: 7
atggaggacg ccaccaatgc acatttgtat gctcacgccc acctgcaccg gtccaaaagg  60
ccatcccctg cagcgtttaa agaggaagac ggcgactgcg acgcactcca caagggtgcc  120
aggtaccgag gcgttagacg ccggccatgg gggcgtttcg ccgcggagat ccgcgatccg  180
gcttcccgcg agaggcggtg gttgggcaca ttcgacacgg ctgagcaagc cgcttgcgct  240
tatgatgtcg cggcacgcgc catgcggggg tcgaaggcta ggacgaattt cccggtgcac  300
```

-continued

```
gcggcagcgg gattctggcc gtggggcgcg cctccccagc ccgctcatac cctcaacccg  360
tttctactgc ataatctaat tatgtcatct agccaccatg gctttcgtct cctgcatcaa  420
gcgggccacg gccacgtggt caattcgtcc gctccgtcca aacctccagc tccggttgcc  480
gctgcaatac ccgctccgag cccggtagcc ccgccccogt cggaccttga cgatgaggac  540
gtcgacgatt gggccgggct tatgcggggc gagcctgctg acgccggact ccttcaggac  600
gccttgcatg ggttctaccc cgctgggacg aggccacgtg gcggagcctc acggtcgctg  660
agtgcatccg gagcggacgc acgcgccgca gcggccgacg tcccggttaa gcaagaacgc  720
tatgatgcct ttgtggacat cgatggagag gaaggcggtg aataccccat gatgccgcag  780
ggccttctag gtgacgtaat acaataccct gctttcatgg aagtagttgc agctccgtca  840
gcaccgacac gtagagggcg ctggggttaa                                    870

SEQ ID NO: 8           moltype = DNA  length = 1011
FEATURE                Location/Qualifiers
source                 1..1011
                       mol_type = unassigned DNA
                       organism = Oryza longistaminata
SEQUENCE: 8
atgatgatga tgtcgggcag gccctctgga ggtgctggtg ggggcaggta cccgttcacg  60
gcgagccagt ggcaagagct tgaacaccag gcactgatct acaaatacat ggccagcgga  120
acaccgattc catcagacct gatcttgcca ctgcgcagat cctttctcct ggactcagcc  180
ctggctacgt ctccgtccct ggcctttcct ccacaaccgt ccctggggtg ggggtgcttc  240
gggatgggct ttggtcggaa agcggaagat ccagagccgg ggcgctgtag gcggactgac  300
gggaagaaat ggagatgcag caaggaagca tatcccgatt ctaagtactg cgagaagcac  360
atgcacaggg ggaagaaccg atctcgtaaa ccggtggaga tgagcctggc gacgcctcca  420
gccccgtcat ccagtgcaac ctcagccgca cttacgccgt cttccgagaa ccatctcaag  480
acgcgtccac ggacaccaga gcttgcgcca aagcaaacca ctatctcact tttcccgcca  540
ggctccagaa gggccccgaa tcagccccct atgcagcatc caaacagccc aaagccgatc  600
ccaactacgc ttaccgaaat ccctcccaat cccccagctt tcgccatccc cactacgagg  660
cgactacatc acacacgcaa cgaacgcagg gaacgcctca cctggccacc gtcgctggcc  720
ggatggccgg cggatagggg tcgctgccga cgcagacagc aacagcaaca gcaacagcaa  780
cactgtttcc tgctcggcgc ggaccttaga ttggaaaaac cagcaggcca tgatcacgcc  840
gcagctgcac agaagcccct ccggcacttt ttcgacgagt ggccgcatga aaagtcgagc  900
aagggctcct ggatggggct tgagggagag acgcaactgt caatgtctat tccaatggca  960
gccaacgatc tccctatcac gacaaccagc aggtatcata acgatgacta a           1011

SEQ ID NO: 9           moltype = DNA  length = 1008
FEATURE                Location/Qualifiers
source                 1..1008
                       mol_type = unassigned DNA
                       organism = Saccharum spontaneum
SEQUENCE: 9
atgatgcttt caggccacgg tggaggtcgt cggttgttca ccgcctccca atggcaggag  60
ctcgagcacc aggctctaat ctttaaatac atggcgtccg gcgcgccagt accacacgac  120
ttggtcctgc cactgaggtt ggcaacgggg gtcgatactg ccccctcact cgccttccct  180
ccccagcact cccccagtct tgcttactgg ggatgctacg gcgctggggc cccatttggc  240
cgtaaggctg aagatccaga gccaggtcgc tgtcgccgta cagatggtaa aaagtggcgc  300
tgcagccgcg aagcgcacgg agagagtaag tattgcgaga agcatattca caggggcaag  360
tctagatcac ggaagccagt ggaggttaca tcctcagcga ctagtccagc ggccgcggcc  420
taccgaccct cagcactttc gatttctccg cccagagctg ccgatgcgcc tccacctagc  480
ctaggccatc cgcaacagca tctaaggcat ggcgcctcga gtgctgccgc gcgagcacca  540
gcccaggcga ctgccggggg tgctctccag ctccacctgg acgcgagttt gcatgctgcc  600
agccccccct cctcctacca ccgttacgcc cactcacatg ctcactacac aacgccaacg  660
ccaacaccga ccccatccct cttcccaggg ggtggcgggg gatacgggta cgactatggg  720
caatcaaagg aactgaggga ggcagagctc cgcaggcgcc atttccatac actaggagca  780
gacctttctc tcgacaaacc tctccctctt gccgcaacgg gctctgacgc ggccgctgca  840
gagaagccac ttaggcggtt tttcgatgag tggccacgcg agagcggcga cactcggcca  900
agctgggccg gcgcggaaga tgcgacgcaa ctcagcatct cgattcccgc tgcatcccct  960
agtgacctgg cagcctctgc tgcggccaga tatcacaacg gggagtaa               1008

SEQ ID NO: 10          moltype = DNA  length = 1092
FEATURE                Location/Qualifiers
source                 1..1092
                       mol_type = unassigned DNA
                       organism = Saccharum spontaneum
SEQUENCE: 10
atggggggcc cagacggtga cggtgatggt gggccccacc atcaatacca ctatcaggca  60
ctgctcgcgg ctgtacagaa tccatcccag ggcctccatc cattcccact cccgtttcac  120
ctgccactgc acgctggagc gggggcaggg gctccagccg cgggccccgg cgctgatgct  180
gacgcctcaa gtacgcataa cgtccacgcg gcccctcata gccaacctcc acgtggtttt  240
acagattgga gcccgagcaa ttcggcgttc gctgcagtgg ctgcacagcc cgcaccggca  300
acgacaaaca cgcccctgca ttacaacctc tctcagccct acaccctttg gactcactac  360
atgttgaata aaaatgtgtc ttgctccacg taccctaccc aacatgagga aaaccccaac  420
cccctccgac acacgcatat tcctgaggaa aatccacatc ccttgcgcca tacacatata  480
ccagacaagg atagcgggtg cgcctcctca ctggggttcg atagtttcac cacaatgagc  540
ctggggccga atatctgtgc tcatatgacc cccatggaag gctccatctc cgccaaggag  600
cctgaaaact cagaggatct gcccgcagtt gtcaggagtt cagatgagat ggacaccaga  660
aatagcgggg aaatacatag ggacacggtc ggcccactgc ctgagtcaaa acagtcccac  720
gagtcttgtg cctcaaagtt caatagtggt gaataccaag tgatcctccg caaagagctc  780
acaaaaagcg acgttgctaa cagtggacgg atagttcttc ccaaaaagga tgccgaggca  840
```

```
gggctgcctc cattggttca aggtgacccg cttattctgc aaatggacga tatggtgcta  900
ccgatcattt ggaagttcaa atacaggttc tggcccaata acaagtcgag gatgtacata  960
ctcgaggcgg ccggtgaatt cgttaaaacc cacggactcc aggctgggga cgcattgatc  1020
atatataaga actctgagcc aggaaagttt atcattcgcg gagaaaagag cattcaacag  1080
acgaacccat aa                                                       1092

SEQ ID NO: 11          moltype = DNA  length = 1050
FEATURE                Location/Qualifiers
source                 1..1050
                       mol_type = unassigned DNA
                       organism = Brassica oleracea
SEQUENCE: 11
atggataact tcctcccttt ctcttcgtct aatgccaaca gtgtgcaaga gctgagcatg  60
gacctcaata agaaccgctc gcacttctcc atggcgcaac cgcaacacct cctgccgcct  120
tactcatacg tggcctgtcc agtgctggac cagactggcg ccatgaacca ccagccgttg  180
cattcttcag acgccttccc gcagatccca gtggtccaga ctgggggaga atttggctat  240
cttgtttgca agccaggggt ccggcaggag cgcggtggat ttcttgaccc gcacagcacg  300
aaaatggcga gaataaatag gaagaaagct atgatccgca gtcggaataa ctcatacctc  360
aattctagct ccaatgagct agtggactct agacgccagg tggctctcac catgaagaac  420
aatgcggaaa tagccgcgcg aaaagatttt tatcgtttct ccagctttga caataagaaa  480
ttgagggtgc tcctagtcaa gcatctcaag aacagtgatg tgggctcgct cgggaggatc  540
gtgctcccaa agcgcgaggc tgaagggaat ttgccagagc tcagtgataa ggagggcatg  600
gttcttcaga tgagggacgt ggattccgtg caaagctggt ctttcaaata caagtattgg  660
tcgaacaata aaagccgcat gtacgtgctc gaaaataccg gagagttcgt caaaaagaac  720
ggtgtgctca tgggagatta tctgaccatt tatgaagacg agagcaagaa cctttacttc  780
agtatccgca agcatccaca taaacaaaac gacggccggg aggacgaaag catggaggtc  840
attgagatga acttctatga agatataatg tttgattata tacctaatgg cgaggacgat  900
tccattgcta tgctgctcgg caatctaaac gagcattatc catacccaaa cgatatcatg  960
gatctgacgg tcgacctaga ccagcatcag caagctacat cctctagccc cccggcagac  1020
catatgtctt ccaacgactt tctgtggtaa                                     1050

SEQ ID NO: 12          moltype = DNA  length = 1476
FEATURE                Location/Qualifiers
source                 1..1476
                       mol_type = unassigned DNA
                       organism = Brachypodium distachyon
SEQUENCE: 12
atggatatgg acgccgcgca gcaacagcac catcactatc cttggttgaa tttctcactc  60
gcccaccatt gtgggatgga agaggaagag aggggagcgg ctgcagagct tgcagcgatc  120
gcgggcgcgg caccaccccc aaagttggaa gacttcctgg gcggtggagg gggcaacggg  180
aatggcgggg gcgggggccc ggttgtgcct gccggcgccg cggctgagat gtacgaatcc  240
gagctgaagt ttctcgccgc tggcggtttt cttggatccg gagggacagg tacgtcgccg  300
gctgcaccgc ctccagtggt cgcactggaa gagcaggcag ccgaggccaa gttggccctg  360
cccttggtgg ccgcgcccgc gcctgaaacc aagaaagctg tagattcatt tggacagcgc  420
acgtctatct accgcggcgt gaccagacac aggtggaccg gacgctatga ggctcacctg  480
tgggacaata gttgtcgccg tgaagggcaa agcaggaagg ggagacaggt ataccttggc  540
gggtatgaca aggaagagaa ggccgcaaga gcctatgatc ttgccgcttt gaagtactgg  600
ggcgcaagta cgaccacgaa ctttccggtt gccgactacg agaacgagct cgaagagatg  660
aagcacatga ccaggcagga gtttgtcgcc agccttagac gcaaaagctc gggcttctcc  720
aggggcgcat ccatttacag gggagtgacg cgccaccatc agcatggccg atggcaggca  780
cgcatcggta gggtggccgg caacaaggat ctctatctcg gaacattctc aactgaggaa  840
gaggccgcag aagcttacga tattgccgca attaaattta gagggctgaa tgcagttact  900
aactttgaaa tcgggcggta caacgtggag agcatctcat cttcgaacct accaatcggg  960
accgcttccg gggccaacag aggctcgaag tgcgctctag agcctacccc cgtgataagc  1020
gatgttgatg ccccatctat cgcaccgcac tccttggcct tcacagcctt gcccatgaag  1080
tacaaccaac atgaaaatga ctacctcagc tttctcgcga tgcagcatca ccagcaaggg  1140
aatctacagg gcctgggtta tggtctctac tcttcggggg ttaacctgga cttcgcgaac  1200
gctcataatg cggctacgat gacggctgcc caatgttatg gaaacggtgg cggttccctg  1260
catcaccaac agcaacagga gcaagaccat caccaacagc aacagcaaca gcaagaccag  1320
gagcagaact caaatgggtg ccccagctca gtcccattcg cgacccccat ggcattctcg  1380
ggtggaacgt atgaatcatc cgttacccg agcccctttg gctactatag cccgaacatg  1440
gctgcctttc agaccccaat cttcggtatg gaataa                               1476

SEQ ID NO: 13          moltype = DNA  length = 1395
FEATURE                Location/Qualifiers
source                 1..1395
                       mol_type = unassigned DNA
                       organism = Leersia perrieri
SEQUENCE: 13
atggatatgg acatgagctc cgcttaccct catcactggt tgtctttctc actctccaac  60
aataactatc atcacggact gctcgaggct ctatccacga gctccgcgcc gccactggac  120
ggagcagccg aggaagctcc aaagatggaa gacttcttgg gaggggtggg agggggtagc  180
gccgcgcccg ccgcggctcc ggaggaccag ctgggctgtg gtggagaact gggctccatt  240
gcggcaggct ttatgaggcg ttatcctaca ccggacgaga accctggggg cgtgactata  300
gcgatggcta cagatgccgt cgaggcagat ccagcacgca ggacggctga gacgttcggt  360
cagcgaacca gtatttatag aggcgttact agacatcgat ggactggacg ctacgaggct  420
cacctctggg ataactcctg cagacgcgag ggccaatccc gcaagggtcg ccagggaggt  480
tacgataagg aggaaaaagc ggcaagagcc tatgatctcg ctgcactcaa gtactggggc  540
ccgaccacta ccacgaactt cccagtggcg aattatgaaa aggagttgga agagatgaag  600
```

```
agcatgaccc gccaggagtt cattgcgtcg ctcaggcgca agtcctcggg cttctctagg  660
ggcgcctcaa tttatagggg cgtaacgaga catcaccaac acgggaggtg gcaagcgagg  720
atcggacgcg ttgccggcaa caaggatctg tacttgggga ccttctcgac acaggaagag  780
gctgcagagg cctacgacat cgcggcaatt aaattcagag gactgaatgc tgtcaccaac  840
tttgacatgt cgcggtacga cgttgactct atacttaatt ctgacttgcc tgtcggtggc  900
ggggcggctt cagcagcgac gagagcggcc aagtttccaa gcgacccatc cctccctccc  960
cctcacggcg caggcgcttc ggccgctatg acaccctctg aaaaggacta ctggagcttg  1020
cttgctctcc actatcagca acagcaacag caacagcaac agttcccggc ctccgctttc  1080
gacacatacg gttgctcctc gggagtcaat gtagatttca cgatgggcac atcgagtcat  1140
tcagggtcta attccagctc ctcatccgct atgtggggta ctgcagccgc tatgggtcag  1200
caagattcct caaaccgaca gagtaattcg tattcctctc atcacaatat tccgtacgcg  1260
tccgcagcgg ctgccgctgc catggcgtcg ggctctgccg gctatgaagg ctctacgggg  1320
aacaatggca cttgggttgc cagtaacacc tcaacagccc cgcacttcta caactatttg  1380
ttcggcatgg agtaa                                                    1395

SEQ ID NO: 14          moltype = DNA  length = 966
FEATURE                Location/Qualifiers
source                 1..966
                       mol_type = unassigned DNA
                       organism = Panicum hallii
SEQUENCE: 14
atggcgccct gcggcgatgg acgtgatgac gattggtatc agtacggcct cgacgatttc  60
cctccgctct gcagcgcgcc tccaccgctt gcactgcttc gcagcccgta cttcagcaac  120
cagttgccaa gggtccccgt cgatggagcg acggtcgggt tggacgatgc cctgctcctg  180
ccgttggggg atatcgacct ggaagcgttt gacagcgcgg acgagcataa gatgatccca  240
cctgccggtc agcatacagt gggacaggac tatgcggggg tggatgtcgt tcatgaagat  300
cagaaaccga tggcaatcgc agactccttc cgccctaggg cgaacgctct tgagctcacc  360
atgtcgcggc acggcgagca tcaaaagtca tctagcgtgg cggccgctct cgtcccgcca  420
ccgccacccc cgctccccag gccgcgcggg cgtcgctccg tcgatcaccg gtccgctcca  480
gcgcacggaa agactcgcct cgatcacatc gggttcgacg agctccggaa gtacttctac  540
atgccaatca cgcgcgctgc ccgggagttg aacgtgggac tcacggtgct gaaaaagcgt  600
tgtcgggaac tcggcattgc gcgctggccc caccgtaaaa tgaaaagtct caagtcgctg  660
atcctaaatg tacaggaaat gggaacgggc atgaacccgg ccgcagtcca gcatgagctc  720
gcagcgcttg agacctattg tgccctgatg gaggaaaacc cggccattga actgaccgag  780
cgcaccaaga aactccgtca agcatgcttc aaggagtctt acaagagacg gagagctgcg  840
gccgtcaatg tcatggatag aattttctct ttcgatgacc ataaatatag gcatccgctt  900
cgaccaccgc ctccaccgtc atctgctgaa agacacggcc atggctcttc atttctcggc  960
tactaa                                                              966

SEQ ID NO: 15          moltype = DNA  length = 1875
FEATURE                Location/Qualifiers
source                 1..1875
                       mol_type = unassigned DNA
                       organism = Saccharum spontaneum
SEQUENCE: 15
atggcggccg cagccggtag atggtgggct gttgtgttgg ccgtcgccgt gctccttggg  60
ccaggcagag tggttgcaaa cacggaaggc gacgcgctct acagcctaag gcaatccttg  120
aaagacacca acaatgtctt gcaatcctgg gatccaacgt tggtcaaccc ctgcacctgg  180
ttccatgtga cttgcaacaa tgacaactcg gttatcaggg tggacctggg gaatgcccaa  240
cttagtggtg ttcttgtccc gcaactgggc cagcttaaga acttgcaata tcttgaactg  300
tacagcaaca atatatccgg aacaatcccc ccggagctcg ggaacttgac gaacctcgtc  360
tcgttggacc tgtatatgaa taacttctcg ggcattatac cggactcctt gggcaacctt  420
ctcaagctca gattcctccg actcaataac aattcgcttg ttggccagat acctgtctct  480
ctgactaaca ttagcacact gcaggtgctc gatctaagta ataacaatct gtcagggcag  540
gtgccctcca ccggaagctt ctcccttttt accectattt ctttcgccaa caatccattc  600
ctgtgcggcc ctgggactac aaaaccctgt ccgggggccc cacctttcag tcccccgcct  660
ccgttcaacc caccgagccc gccaacacag agtacagggg ccagtagcac gggtgccatc  720
gcagggggcg tggccgctgg ggccgcgctt gtatttgccg ttccagccat cgcgttcgcc  780
atgtggcgca gacgtaaacc agaagagcac ttctttgatg ttcccgccga agaggatcca  840
gaggtgcacc tcgggcaatt gaaaaagttt tccttgagag agcttcaagt tgccacggat  900
aatttcagca acaagaacat cctcggtcgg ggaggcttcg gcaaggtcta taaggggagg  960
ctcgcagacg ggtcgctggt tgcagtgaag aggctgaagg aagagagaac tcctgggggc  1020
gaattgcagt tccagaccga ggttgagatg ataagcatgg ccgttcaccg caatctcctg  1080
cggctacggg gattctgcat gacacctacc gagaggctgt tggtgtaccc atacatggcg  1140
aacggttctg ttgcaagccg tttgcgggag cgccagccct cagagccccc tcttcagtgg  1200
gagactcggc gccggatcgc ccttgggagc gcccggggcc tttcctacct tcacgatcac  1260
tgcgatccca agattatcca tagagacgtt aaggccgcga acatcctcct ggacgaggac  1320
ttcgaagcgg ttgtgggaga ctttggcctc gccaagctga tggattacaa ggatacacac  1380
gtcacgaccg ctgtgcgggg taccataggc cacattgcac cagagtacct gtctacaggc  1440
aagagtagcg aaaagacaga tgtatttggg tatggaataa tgctccttga actcattaca  1500
ggccaaaggg cgttcgacct ggcccgccta gcgaacgacg atgacgtaat gttgctagat  1560
tgggtgaagg gtcttctgaa ggagaagaaa gtggaaatgc ttgttgaccc tgatcttcag  1620
aacgcttacg aagagatcga agtggaaaac ctgattcaag ttgctctttt gtgtacacag  1680
ggttccccgc tcgaccgacc taaaatgtca gaggtagtcc ggatgctgga gggagacggg  1740
ctcgccgagc ggtgggatga gtggcaaaaa gtcgaggtgg ttaggcagga agccgaatcg  1800
gcaccgctaa ggaacgactg gatcgtagat agtacttaca acctcagggc tgtggagctc  1860
agtggtccac gttaa                                                    1875

SEQ ID NO: 16          moltype = DNA  length = 1896
```

```
FEATURE               Location/Qualifiers
source                1..1896
                      mol_type = unassigned DNA
                      organism = Setaria italica
SEQUENCE: 16
atggcggccg cagccggtgc aactcgtcgg cgttgggccg tctgggccct gctacttctg  60
aggctgctcc ttcatccagc ggctagagtg ctggcgaaca cggaaggaga cgcactgcat  120
agtctgagga ccaacttgaa cgatccgaac aatgtgttgc aatcatggga ccccaccctg  180
gttaatcctt gcacctggtt ccacgtgact tgcaacaatg acaactccgt tattagggtc  240
gatctcggta atgctgcact gagcgggaca ttggtgccgc agttgggaca gcttaaaaac  300
ctgcaatacc tagagctata ctccaactcc atttcaggga ccattccgtc agagctcggg  360
aatctaacca atttggtatc gctggatcta tacctgaata actttaccgg cccgatcccg  420
gacagcctgg gcaacctcct taagcttcgt ttcctgagac ttaacaataa ctctctgtct  480
ggctcgatac caaagtcgct tacagctata accgcgctgc aggtgctcga tctctccaac  540
aataacctca gcggcgaggt gcctagtact ggttctttct cactcttcac gccgatcagt  600
tttgcgaata acccaaacct gtgtgggccg ggcacaacta aaccatgccc cggtgctccc  660
ccattctccc caccgccacc ctataaccca cctaccccag tccaggctgg ctcaagctcc  720
tcgtccaccg gtgcgatcgc cgggggagtg gccgctggag ccgcgctgct cttcgcggtc  780
cctgcaatag gattcgccta ttggcgtagg cgaaaacctc aagagcattt ctttgacgtt  840
ccagctgaag aggatccgga ggtccatctt ggccagctca agcgcttttc actccgcgag  900
ctacaggtcg ctactgacgg attcagtaat aagaatatcc ttggaagggg aggctttggg  960
aaggtttaca agggtaggct ggccgacgga actttggttg ccgtcaagcg actcaaggag  1020
gaacgcactc ccggaggcga gttgcagttc cagacagaag ttgaaatgat tagcatggcg  1080
gtccaccgga acctgctccg cttgcgcggg ttctgcatga ccccgactga gcgtctcctg  1140
gtttatccgt atatggcgaa cggctcagtg gcctctcgcc ttcgcgagcg gccggagtcc  1200
gaaccgcctc tagactggca gacccgcagg cgcattgcct tgggctcagc taggggcttg  1260
tcctatctcc acgatcattg cgacccaaaa atcatacacc gcgacgtgaa agcggctaat  1320
atactgttgg acgaggactt tgaggcggta gtcggggact tcggactggc caagctgatg  1380
gattataagg acacccacgt tacaaccgct gtgcgcggta caatcggcca catagcaccc  1440
gaatatctat cgacgggtaa aagcagtgag aaaaccgatg tcttcggata cgggatcatg  1500
ctgctcgagc ttataacggg ccagagagct ttcgatctgg ctcggcttgc taatgatgac  1560
gatgttatgc tgctagattg ggttaaaggt cttctgaagg aaaagaggct agagagtctt  1620
gtcgacgagg atctccagca taattatatt gacgtggagg tggagagcct catccaggtc  1680
gccctgctat gcacgcagtc aagcccaatg gagaggccca agatgtctga ggtcgtaagg  1740
atgctggagg gggatggcct ggcagaaagg tgggaggaat ggcaaaaggt agaggtagtg  1800
aggcaagagg tcgagctagg cccacaccgg acgtcggaat ggatccttga ctctaccgat  1860
aacctccacg cggtcgagct gagcggccct aggtaa                           1896

SEQ ID NO: 17         moltype = DNA  length = 1071
FEATURE               Location/Qualifiers
source                1..1071
                      mol_type = unassigned DNA
                      organism = Saccharum spontaneum
SEQUENCE: 17
atggaggaaa tcacacacca ttttggagtt gctgcgtctt cacacagtca cggacatggg  60
caacaccatc acccatgggc gtcgagcctg tcggcagtgg tcgcgccacc gccacaacag  120
ccaccctccg ctggcctgcc actgaccttg aacacggtgg cagcgactgg caactcaggc  180
gcctccggta atcctgtgct gcagctcgcg aatggcggat ccctgcttga tgcgtgcgtc  240
aatgtcaagg ctaagggaga gccatccagc tcttccccgt acgctggaga tcttgaagcg  300
atcaaagcga aaatcataag ccatccccat tattactcac tgctcgctgc gtacctcgaa  360
tgtaagaaag taggcgctcc tccagaggtg tctgcacgcc tgacggctat ggcccaagag  420
ctcgaggcca gacagaggac cgcacttggg ggcttgggcg cggcaacgga acctgagttg  480
gaccagttca tggaagccta tcatgaaatg cttgtaaagt ttcgagagga acttacccgg  540
cccctgcagg aagcaatgga gtttatgcgc cgggtcgagt ctcagctcaa cagcctctcc  600
atctccggcc gttcgcttag gaacatcctt tcctcgggca gctctgaaga ggaccaagag  660
ggttcgggcg gagaaacgga actgccagaa gtggacgtcc atggcgtcga ccaggagctg  720
aagcaccatc tgcttaagaa atactctggg tacctgtcga gcctgaagca ggaactgagt  780
aagaaaaaga aaaagggcaa gcttccaaag gaagcaagac aacagctgtt gtcttggtgg  840
gacctccact ataaatggcc ttatcccagc gagacacaga aagtggcgtt ggcagagtcg  900
acaggtctcg atcttaagca gataaacaat tggtttataa accagcggaa gagacactgg  960
aaaccatccg aagagatgca tcacctgatg atggatggat accacaccac taatgccttt  1020
tacatggacg gtcacttcat caacgacggt gggctttaca gattgggcta a          1071

SEQ ID NO: 18         moltype = DNA  length = 981
FEATURE               Location/Qualifiers
source                1..981
                      mol_type = unassigned DNA
                      organism = Saccharum spontaneum
SEQUENCE: 18
atggcggccg caatcgatat gtacaagtat tttaatgccc accaaatcgc atcgtccagc  60
cccagcgatc aggaactggc gaaagccctg gagccattca tcacaagcgc atcctctagc  120
ccctaccaca ggtatagctc ctcgccatcc atgtctcaag actcatacat gcccacccct  180
tcctatacct ccttcagtac gtctccactc ccgaccccgg ctgcggcaac ctcgagctct  240
tccccttct cccaactgcc acctctttat tcctctccat atgctgcacc gggcatggca  300
gggccaatgg gcctaaacca gctcgggcct gcccagatcc agcaaattca ggcccaattt  360
atgtttcaac agcaacagcg aggtttgcac gctgcctttc taggcccgcg cgctcaacca  420
atgaagcaat ccggcagccc cccgctggca ccggcgcagt ctaagctgta ccggggcgtt  480
cgccagaggc attggggaaa atgggtcgct gagatacggc tacccaagaa caggacgagg  540
ctttggctcg gcaccttcga caccgcggag gatgccgctt tggcttacga caaagccgct  600
```

```
ttccgcctcc gtggggatat ggccaggctg aatttcccgg ccctacgtag ggacggcgcc  660
catcttgccg gcccacttca cgcgagcgta gatgccaaac ttaccgccat atgccagtcc  720
ctcgcagggt ccaagaacgg ttccagcggc gatgaatccg ccgctagccc cccagactcc  780
cccaagtgct ctgcaagcac agaaggcgag ggtgaggaag agagtggatc ggcaggttcg  840
cccccatcgc caactctagc gccgcctgtc cctgagatgg ccaagctcga ttttactgag  900
gcaccgtggg atgaaacgga gacttttcac ctaaggaaat acccctcttg ggagattgac  960
tgggacagca tcctttcgta a                                            981

SEQ ID NO: 19          moltype = DNA  length = 966
FEATURE                Location/Qualifiers
source                 1..966
                       mol_type = unassigned DNA
                       organism = Brassica napus
SEQUENCE: 19
atggaggccg caatgaactt gaactcttcg cgtactttcc aacagcccga cagctttggg  60
ggaggcggag agcttatgga agcgcttctc cccttcatca aatccgtcag cgacagcccg  120
tctgcctcag cctcagcctt tataaacccg gcagcgtctg ccttccccct ccccaccttt  180
cgcgattaca accccgaaca ttatctcaca cagccgttcc cttatggcag tgatctccag  240
caaactggta gcctgatagg gctcaataac ctttcgtcat ctcaaattca tcaaatccag  300
agccagatac accataacca cccgctcccg cctacccgca gtaatcttaa cctcagtccg  360
aagccactgt tgatgaagca accgggcgtt gcaggctcct gctttgccta cggggccccg  420
ccaaaacccg ccaagctcta tcgcggggtt cgccagagac attggggcaa gtgggtggct  480
gaaattaggc taccccggaa tagaacgaga ctctggcttg gcacctttga cacggccgag  540
gaagccgcac tagcctatga tactgccgct tttaagctcc gaggagactt cgcgcgcctc  600
aattttccta acctccgaca tgatgggagt agaattggcg gagaattcgg tgagtacaaa  660
ccacttcact ccacagtaga tgccaaactt gaggccatat gcaagtccat ggccgaaacg  720
gagaagcagg agaagaccac gaaggcatcc aagaaacggg catcaaccgc ggccgtcaag  780
gcagaggaaa acagcaacag catcggtgag tcacccccaa tgactgaact tgtggagagc  840
gctggctcta gcccgctgtc tgaattgact ttcgctgacg cggaggaaca gccccaatgg  900
aacgagacat tcgccttgga gaaataccca agttacgaaa ttgactggga tagcatccta  960
ccataa                                                             966

SEQ ID NO: 20          moltype = DNA  length = 954
FEATURE                Location/Qualifiers
source                 1..954
                       mol_type = unassigned DNA
                       organism = Panicum hallii
SEQUENCE: 20
atggcggcca acgtcggtgg aaagtctgtt ggtggcgggg ccggcggagg tggcacaggc  60
ggagcggtta cagcgtgtag agcctccggc agccgctgga caccaacacc agagcagatc  120
aggatcctga aagagctata ctatgggtgc gggattaggt cacccaactc agagcagatc  180
cagcgcatca ccgccatgct tcgtcaacac ggcaagatcg aggggaaaaa cgtttttctat  240
tggtttcaga accataaagc gagggagcgc cagaagcgta gacttactaa cctggacgtc  300
aacgtaccgg cagccgtgga cgcgtctcac ctgggcgctc tttcactcag ttcgcctagc  360
ggcgctgcgc caccttcatc tccactgggc ctgtatccaa gtaatggcgg gggcagcacc  420
ctccagctcg atacgtcgtc tgattggggg agcgctaccg ctatggcgac tgaaacgtgc  480
ttcctgcagg attacatggg ggtaatgagg tccaccggcg gtcaccatgg gagttccgcc  540
ggagcagcgg tgtcgccttg ggcctgtttg tctagctccg acagttgggc ggccgtggcc  600
cctacgacta caagggcccc tgagacgctc ccattgttcc caaccggcga ttcgtcacac  660
ccacagagac cgaggcacgg ggccccagcg cccaccggag atgctatcag gggagggtcc  720
tcaagtggtt atctccccac gctaccgttc tggggtgcag cggccaccgc ggccacgaca  780
actacaagcg taacaatcca gcaacagcat caccaactcc tacagctcca ggagcagtac  840
tcgttcaata caactacctc tcaacctccg agccaggacg cgtcggctgc cacagcctcg  900
ctagagctct ctttgagcag ttggtgcagt ccgtacactg cggggacaat gtaa        954

SEQ ID NO: 21          moltype = AA  length = 223
FEATURE                Location/Qualifiers
source                 1..223
                       mol_type = protein
                       organism = Saccharum hybrid
SEQUENCE: 21
MGRERIAIRR IDNLAARQVT FSKRRRGLFK KAEELSILCD AEVGLVVFSA TGKLFHFAST  60
SMKQVIDRYD SHSKNLQKSE ALSQLQSHID DGTCSRLKEE LAETSLKLRQ MRGEELQRLS  120
VQQLQELEKT LESGLGSVLK TKSQKILDEI SGLERKRMEL IEENSRLKEQ VTHMARMETQ  180
LGVDSEIVYE EGQSSESVTN TSYPRPSTDT DDCSDTSLRL GLP                    223

SEQ ID NO: 22          moltype = AA  length = 264
FEATURE                Location/Qualifiers
source                 1..264
                       mol_type = protein
                       organism = Brassica napus
SEQUENCE: 22
MGRGKIEIKR IENANSRQVT FSKRRAGLLK KAHELSVLCD AEVAVIVFSK SGKLFEFSST  60
RCMKKTLLRY GNYQISSDVP GINRKAENQE CTEVDLLKDE ISMLQEKHLQ MQGKRLNLLS  120
LKELQHLEKQ LNFSLISVRE RKELLLTKQL EESRLKEQRA ELENETLRRQ VQELRSFLPS  180
INQHYVPSYI KCFAIDPKKS LLSNTCLGDI NCSLQNTNSD TTLQLGLPGE AHDTRKNEGD  240
RESPSSDSVT TSTTRATAQR ISLV                                         264

SEQ ID NO: 23          moltype = AA  length = 686
```

```
FEATURE                Location/Qualifiers
source                 1..686
                       mol_type = protein
                       organism = Saccharum spontaneum
SEQUENCE: 23
MASANNWLGF SLSGQDNPQP NHQDSSPAAA GIDISGASDF YGLPTQQGSD GHLGVPGLRD  60
DHASYGIMEA FNRVPQETQD WNMRGLEYNG GGSELSMLVG SSGGGGGGGK RAVEDSEPKL  120
EDFLGGNSFV SEQDQSGGYL FSGVPMASST NSNSGSNTME LSMIKSWLRN NQVPQPQPPA  180
APHQPQPEEM STDASASSFG CSDSMGRNGT VAAAGSSQSL ALSMSTGSHL PMVVAGGGAS  240
GAASESTSSE NKRASGAMDS PGSAVEAVPR KSIDTFGQRT SIYRGVTRHR WTGRYEAHLW  300
DNSCRREGQS RKGRQVYLGG YDKEDKAARA YDLAALKYWG TTTTTNFPIS NYEKEVEEMK  360
HMTRQEYIAY LRRNSSGFSR GASKYRGVTR HHQHGRWQAR IGRVAGNKDL YLGTFSTEEE  420
AAEAYDIAAI KFRGLNAVTN FDMSRYDVKS ILESSTLPVG GAARRLKDAV DHVEAGATIW  480
RADMDGGVIS QLAEAGMGGY ASYGHHGWPT IAFQQPSPLS VHYPYGQPPS RGWCKPEQDA  540
AVAAAAHSLQ DLQQLHLGSA AAHNFFQASS SSAVYNSGGA ASGGYQGLGG GGSSFLMPSS  600
TVVAAADQGH SSTANQGSTC SYGDDHQEGK LIGYDAMVAA TAAAGGDPYA AARSGYQFSQ  660
GSGSTVSIAR ANGYSNNWSS PFNGMG                                       686

SEQ ID NO: 24          moltype = AA  length = 484
FEATURE                Location/Qualifiers
source                 1..484
                       mol_type = protein
                       organism = Triticum urartu
SEQUENCE: 24
MASANNWLGF SLSGQGSHPQ PHQNGSPAAA AIDGDFYGLQ AQTAPDAHLG MSSLRADANY  60
GVMDAFNGGT QETQDWAMRG LDYHGGSSEL SMLVGSSGGR MTVDDGEAPK LEDFLGGNSF  120
SDAQDHAGSY LFSSGSAMGS GAASGSHGVD GRGGSTIELS MIKTWLRNDN NEAQHDQEMS  180
ADASATSYAC SGAPGSTSNG VGVASSRGQG LALSMSMGSN SHPQMPVVPA AVGTESTSSE  240
NKRVDSPSAG TADAVQRKSI DTFGQRTSIY RGVTRHRWTG RYEAHLWDNS CRREGQTRKG  300
KQGGYDKEDK AARAYDLAAL KYWGTTTTTN IPISTYEKEI EEMKHMTRQE YIAYLRRNSS  360
GFSRGASKYR GVTRHHQQGR WQARIGRVAG NKDLYLGTFT TEEEAAEAYD IAAIKFRGLN  420
AVTNFEMSRY DVKSILEGST LPTCMLPCMH FTAKSNSASE RLKSIELSTG QCTIFANVQK  480
QFDT                                                               484

SEQ ID NO: 25          moltype = AA  length = 712
FEATURE                Location/Qualifiers
source                 1..712
                       mol_type = protein
                       organism = Panicum hallii
SEQUENCE: 25
MATVNNWLAF SLSPQDLPPS QTDSTLISAA ATDEVSGDVC FNIPQDWGMR GSELSALVSE  60
PKLEDFLGGI NFSEQHHKAN LNVIPSSSST CYASSGASTG YHHQLYHHPS SALHFADSVM  120
VASSAGVHDG GAMLSAAAAN GGAGAAGANG GSIGLSMIKN WLRSQPAPPP QPRVAVAEGA  180
QAAQGLSLSM NMAGTQGAGM PLLAGERGRA PESVSTSAQG GAVAARKEDS GGAGALVAVS  240
TDTGGSGGAS AETVARKTVD TFGQRTSIYR GVTRHRWTGR YEAHLWDNSC RREGQTRKGR  300
QGGYDKEEKA ARAYDLAALK YWGPTTTTNF PVSNYEKELE EMKHMTRQEF VASLRRKSSG  360
FSRGASIYRG VTRHHQHGRW QARIGRVAGN KDLYLGTFST QEEAAEAYDI AAIKFRGLNA  420
VTNFDMSRYD VKSILDSSAL PIGSAAKRLK EAEAAASAQH HAGVVSYDVG RIASQLGDGG  480
ALAAYGAHYH AAAAAWPTI AFQPGATAGL YHPYAQPLPR GWCKKEQDHA VIAAAHSLQE  540
LNHLNLGAGA HDFFSAGQAA MHGLGSIDNS SLEHSTGSNS VVYNGVGDSN GGAVGGGYMM  600
TMSAAAATTT AMVSHEQVHA RAQGDHDEAS KHAAQMGYES YLMNAEAAYG GGRMPSWTRP  660
RLHRWRRRQA ATTTWPALAM AARSSSVSGM TLNKLRTPTR HRGKKYADIS NT          712

SEQ ID NO: 26          moltype = AA  length = 242
FEATURE                Location/Qualifiers
source                 1..242
                       mol_type = protein
                       organism = Saccharum spontaneum
SEQUENCE: 26
MGTNPRLQEL AAVVVAAADS EPRPRARVVR ILVHDADATD SSSSEDEAPP PPPPPRRRAR  60
GGSSSVGVRR HVMEPAGASS AVRFRGVRRR PWGRWAAEIR DPHSRRRLWL GTFNTAEEAA  120
NAYDAANIRF RGASAPTNFP AARYSPPPEP AKPIISLTPE PGKVITLPPV PVKPTFPLQV  180
KEEGGSCDGQ VKGASSEVKA FAPKPVWEMI PSKRQKYPGC ADGSGLRAIH AASIYVEEVG  240
GA                                                                 242

SEQ ID NO: 27          moltype = AA  length = 289
FEATURE                Location/Qualifiers
source                 1..289
                       mol_type = protein
                       organism = Setaria italica
SEQUENCE: 27
MEDATNAHLY AHAHLHRSKR PSPAAFKEED GDCDALHKGA RYRGVRRRPW GRFAAEIRDP  60
ASRERRWLGT FDTAEQAACA YDVAARAMRG SKARTNFPVH AAAGFWPWGA PPQPAHTLNP  120
FLLHNLIMSS SHHGFRLLHQ AGHGHVVNSS APSKPPAPVA AAIPAPSPVA PPPSDLDDED  180
VDDWAGLMRG EPADAGLLQD ALHGFYPAGT RPRGGASRSL SASGADARAA AADVPVKQER  240
YDAFVDIDGE EGGEYPMMPQ GLLGDVIQYP AFMEVVAAPS APTRRGRWG              289

SEQ ID NO: 28          moltype = AA  length = 336
FEATURE                Location/Qualifiers
```

```
source                 1..336
                       mol_type = protein
                       organism = Oryza longistaminata
SEQUENCE: 28
MMMMSGRPSG GAGGGRYPFT ASQWQELEHQ ALIYKYMASG TPIPSDLILP LRRSFLLDSA  60
LATSPSLAFP PQPSLGWGCF GMGFGRKAED PEPGRCRRTD GKKWRCSKEA YPDSKYCEKH  120
MHRGKNRSRK PVEMSLATPP APSSSATSAA LTPSSENHLK TRPRTPELAP KQTTISLFPP  180
GSRRAPNQPP MQHPNSPKPI PTTLTEIPPN PPAFAIPTTR RLHHTRNERR ERLTWPPSLA  240
GWPADRGRCR RRQQQQQQQQ HCFLLGADLR LEKPAGHDHA AAAQKPLRHF FDEWPHEKSS  300
KGSWMGLEGE TQLSMSIPMA ANDLPITTTS RYHNDD                            336

SEQ ID NO: 29          moltype = AA  length = 335
FEATURE                Location/Qualifiers
source                 1..335
                       mol_type = protein
                       organism = Saccharum spontaneum
SEQUENCE: 29
MMLSGHGGGR RLFTASQWQE LEHQALIFKY MASGAPVPHD LVLPLRLATG VDTAPSLAFP  60
PQHSPSLAYW GCYGAGAPFG RKAEDPEPGR CRRTDGKKWR CSREAHGESK YCEKHIHRGK  120
SRSRKPVEVT SSATSPAAAA YRPSALSISP PRAADAPPPS LGHPQQHLRH GASSAAARAP  180
AQATAGGALQ LHLDASLHAA SPPPSYHRYA HSHAHYTTPT PTPTPSLFPG GGGGYGYDYG  240
QSKELREAEL RRRHFHTLGA DLSLDKPLPL AATGSDAAAA EKPLRRFFDE WPRESGDTRP  300
SWAGAEDATQ LSISIPAASP SDLAASAAAR YHNGE                             335

SEQ ID NO: 30          moltype = AA  length = 363
FEATURE                Location/Qualifiers
source                 1..363
                       mol_type = protein
                       organism = Saccharum spontaneum
SEQUENCE: 30
MGGPDGDGDG GPHHQYHYQA LLAAVQNPSQ GLHPFPLPFH LPLHAGAGAG APAAGPGADA  60
DASSTHNVHA APHSQPPRGF TDWSPSNSAF AAVAAQPAPA TTNTPLHYNL SQPYTLWTHY  120
MLNKNVSCST YPTQHEENPN PLRHTHIPEE NPHPLRHTHI PDKDSGCASS LGFDSFTTMS  180
LGPNICAHMT PMEGSISAKE PENSEDLPAV VRSSDEMDTR NSGEIHRDTV GPLPESKQSH  240
ESCASKFNSG EYQVILRKEL TKSDVANSGR IVLPKKDAEA GLPPLVQGDP LILQMDDMVL  300
PIIWKFKYRF WPNNKSRMYI LEAAGEFVKT HGLQAGDALI IYKNSEPGKF IIRGEKSIQQ  360
TNP                                                                363

SEQ ID NO: 31          moltype = AA  length = 349
FEATURE                Location/Qualifiers
source                 1..349
                       mol_type = protein
                       organism = Brassica oleracea
SEQUENCE: 31
MDNFLPFSSS NANSVQELSM DLNKNRSHFS MAQPQHLLPP YSYVACPVLD QTGAMNHQPL  60
HSSDAFPQIP VVQTGGEFGY LVCKPGVRQE RGGFLDPHST KMARINRKKA MIRSRNNSYL  120
NSSSNELVDS RRQVALTMKN NAEIAARKDF YRFSSFDNKK LRVLLVKHLK NSDVGSLGRI  180
VLPKREAEGN LPELSDKEGM VLQMRDVDSV QSWSFKYKYW SNNKSRMYVL ENTGEFVKKN  240
GVLMGDYLTI YEDESKNLYF SIRKHPHKQN DGREDESMEV IEMNFYEDIM FDYIPNGEDD  300
SIAMLLGNLN EHYPYPNDIM DLTVDLDQHQ QATSSSPPAD HMSSNDFLW              349

SEQ ID NO: 32          moltype = AA  length = 491
FEATURE                Location/Qualifiers
source                 1..491
                       mol_type = protein
                       organism = Brachypodium distachyon
SEQUENCE: 32
MDMDAAQQQH HHYPWLNFSL AHHCGMEEEE RGAAAELAAI AGAAPPPKLE DFLGGGGGNG  60
NGGGGGPVVP AGAAAEMYES ELKFLAAGGF LGSGGTGTSP AAPPPVVALE EQAAEAKLAL  120
PLVAAPAPET KKAVDSFGQR TSIYRGVTRH RWTGRYEAHL WDNSCRREGQ SRKGRQVYLG  180
GYDKEEKAAR AYDLAALKYW GASTTTNFPV ADYENELEEM KHMTRQEFVA SLRRKSSGFS  240
RGASIYRGVT RHHQHGRWQA RIGRVAGNKD LYLGTFSTEE EAAEAYDIAA IKFRGLNAVT  300
NFEIGRYNVE SISSSNLPIG TASGANRGSK CALEPTPVIS DVDAPSIAPH SLAFTALPMK  360
YNQHENDYLS FLAMQHHQQG NLQGLGYGLY SSGVNLDFAN AHNAATMTAA QCYGNGGGSL  420
HHQQQQEQDH HQQQQQQQDQ EQNSNGCPSS VPFATPMAFS GGTYESSVTP SPFGYYSPNM  480
AAFQTPIFGM E                                                       491

SEQ ID NO: 33          moltype = AA  length = 464
FEATURE                Location/Qualifiers
source                 1..464
                       mol_type = protein
                       organism = Leersia perrieri
SEQUENCE: 33
MDMDMSSAYP HHWLSFSLSN NNYHHGLLEA LSTSSAPPLD GAAEEAPKME DFLGGVGGGS  60
AAPAAAPEDQ LGCGGELGSI AAGFMRRYPT PDENPGGVTI AMATDAVEAD PARRTAETFG  120
QRTSIYRGVT RHRWTGRYEA HLWDNSCRRE GQSRKGRQGG YDKEEKAARA YDLAALKYWG  180
PTTTTNFPVA NYEKELEEMK SMTRQEFIAS LRRKSSGFSR GASIYRGVTR HHQHGRWQAR  240
IGRVAGNKDL YLGTFSTQEE AAEAYDIAAI KFRGLNAVTN FDMSRYDVDS ILNSDLPVGG  300
GAASAATRAA KFPSDPSLPP PHGAGASAAM TPSEKDYWSL LALHYQQQQQ QQQQFPASAF  360
```

-continued

```
DTYGCSSGVN VDFTMGTSSH SGSNSSSSSA MWGTAAAMGQ QDSSNRQSNS YSSHHNIPYA  420
SAAAAAAMAS GSAGYEGSTG NNGTWVASNT STAPHFYNYL FGME                   464

SEQ ID NO: 34          moltype = AA  length = 321
FEATURE                Location/Qualifiers
source                 1..321
                       mol_type = protein
                       organism = Panicum hallii
SEQUENCE: 34
MAPCGDGRDD DWYQYGLDDF PPLCSAPPPL ALLRSPYFSN QLPRVPVDGA TVGLDDALLL  60
PLGDIDLEAF DSADEHKMIP PAGQHTVGQD YAGVDVVHED QKPMAIADSF RPRANALELT  120
MSRHGEHQKS SSVAAALVPP PPPPLPRPRG RRSVDHRSAP AHGKTRLDHI GFDELRKYFY  180
MPITRAAREL NVGLTVLKKR CRELGIARWP HRKMKSLKSL ILNVQEMGTG MNPAAVQHEL  240
AALETYCALM EENPAIELTE RTKKLRQACF KESYKRRRAA AVNVMDRIFS FDDHKYRHPL  300
RPPPPPSSAE RHGHGSSFLG Y                                            321

SEQ ID NO: 35          moltype = AA  length = 624
FEATURE                Location/Qualifiers
source                 1..624
                       mol_type = protein
                       organism = Saccharum spontaneum
SEQUENCE: 35
MAAAAGRWWA VVLAVAVLLG PGRVVANTEG DALYSLRQSL KDTNNVLQSW DPTLVNPCTW  60
FHVTCNNDNS VIRVDLGNAQ LSGVLVPQLG QLKNLQYLEL YSNNISGTIP PELGNLTNLV  120
SLDLYMNNFS GIIPDSLGNL LKLRFLRLNN NSLVGQIPVS LTNISTLQVL DLSNNNLSGQ  180
VPSTGSFSLF TPISFANNPF LCGPGTTKPC PGAPPFSPPP PFNPPSPPTQ STGASSTGAI  240
AGGVAAGAAL VFAVPAIAFA MWRRRKPEEH FFDVPAEEDP EVHLGQLKKF SLRELQVATD  300
NFSNKNILGR GGFGKVYKGR LADGSLVAVK RLKEERTPGG ELQFQTEVEM ISMAVHRNLL  360
RLRGFCMTPT ERLLVYPYMA NGSVASRLRE RQPSEPPLQW ETRRRIALGS ARGLSYLHDH  420
CDPKIIHRDV KAANILLDED FEAVVGDFGL AKLMDYKDTH VTTAVRGTIG HIAPEYLSTG  480
KSSEKTDVFG YGIMLLELIT GQRAFDLARL ANDDDVMLLD WVKGLLKEKK VEMLVDPDLQ  540
NAYEEIEVEN LIQVALLCTQ GSPLDRPKMS EVVRMLEGDG LAERWDEWQK VEVVRQEAES  600
APLRNDWIVD STYNLRAVEL SGPR                                         624

SEQ ID NO: 36          moltype = AA  length = 631
FEATURE                Location/Qualifiers
source                 1..631
                       mol_type = protein
                       organism = Setaria italica
SEQUENCE: 36
MAAAAGATRR RWAVWALLLL RLLLHPAARV LANTEGDALH SLRTNLNDPN NVLQSWDPTL  60
VNPCTWFHVT CNNDNSVIRV DLGNAALSGT LVPQLGQLKN LQYLELYSNS ISGTIPSELG  120
NLTNLVSLDL YLNNFTGPIP DSLGNLLKLR FLRLNNNSLS GSIPKSLTAI TALQVLDLSN  180
NNLSGEVPST GSFSLFTPIS FANNPNLCGP GTTKPCPGAP PFSPPPPYNP PTPVQAGSSS  240
SSTGAIAGGV AAGAALLFAV PAIGFAYWRR RKPQEHFFDV PAEEDPEVHL GQLKRFSLRE  300
LQVATDGFSN KNILGRGGFG KVYKGRLADG TLVAVKRLKE ERTPGGELQF QTEVEMISMA  360
VHRNLLRLRG FCMTPTERLL VYPYMANGSV ASRLRERPES EPPLDWQTRR RIALGSARGL  420
SYLHDHCDPK IIHRDVKAAN ILLDEDFEAV VGDFGLAKLM DYKDTHVTTA VRGTIGHIAP  480
EYLSTGKSSE KTDVFGYGIM LLELITGQRA FDLARLANDD DVMLLDWVKG LLKEKRLESL  540
VDEDLQHNYI DVEVESLIQV ALLCTQSSPM ERPKMSEVVR MLEGDGLAER WEEWQKVEVV  600
RQEVELGPHR TSEWILDSTD NLHAVELSGP R                                 631

SEQ ID NO: 37          moltype = AA  length = 356
FEATURE                Location/Qualifiers
source                 1..356
                       mol_type = protein
                       organism = Saccharum spontaneum
SEQUENCE: 37
MEEITHHFGV AASSHSHGHG QHHHPWASSL SAVVAPPPQQ PPSAGLPLTL NTVAATGNSG  60
ASGNPVLQLA NGGSLLDACV NVKAKGEPSS SSPYAGDLEA IKAKIISHPH YYSLLAAYLE  120
CKKVGAPPEV SARLTAMAQE LEARQRTALG GLGAATEPEL DQFMEAYHEM LVKFREELTR  180
PLQEAMEFMR RVESQLNSLS ISGRSLRNIL SSGSSEEDQE GSGGETELPE VDVHGVDQEL  240
KHHLLKKYSG YLSSLKQELS KKKKKGKLPK EARQQLLSWW DLHYKWPYPS ETQKVALAES  300
TGLDLKQINN WFINQRKRHW KPSEEMHHLM MDGYHTTNAF YMDGHFINDG GLYRLG      356

SEQ ID NO: 38          moltype = AA  length = 326
FEATURE                Location/Qualifiers
source                 1..326
                       mol_type = protein
                       organism = Saccharum spontaneum
SEQUENCE: 38
MAAAIDMYKY FNAHQIASSS PSDQELAKAL EPFITSASSS PYHRYSSSPS MSQDSYMPTP  60
SYTSFSTSPL PTPAAATSSS SPFSQLPPLY SSPYAAPGMA GPMGLNQLGP AQIQQIQAQF  120
MFQQQQRGLH AAFLGPRAQP MKQSGSPPLA PAQSKLYRGV RQRHWGKWVA EIRLPKNRTR  180
LWLGTFDTAE DAALAYDKAA FRLRGDMARL NFPALRRDGA HLAGPLHASV DAKLTAICQS  240
LAGSKNGSSG DESAASPPDS PKCSASTEGE GEEESGSAGS PPSPTLAPPV PEMAKLDFTE  300
APWDETETFH LRKYPSWEID WDSILS                                       326

SEQ ID NO: 39          moltype = AA  length = 321
```

-continued

```
FEATURE                Location/Qualifiers
source                 1..321
                       mol_type = protein
                       organism = Brassica napus
SEQUENCE: 39
MEAAMNLNSS RTFQQPDSFG GGGELMEALL PFIKSVSDSP SASASAFINP AASAFPLPTF  60
RDYNPEHYLT QPFPYGSDLQ QTGSLIGLNN LSSSQIHQIQ SQIHHNHPLP PTRSNLNLSP  120
KPLLMKQPGV AGSCFAYGAP PKPAKLYRGV RQRHWGKWVA EIRLPRNRTR LWLGTFDTAE  180
EAALAYDTAA FKLRGDFARL NFPNLRHDGS RIGGEFGEYK PLHSTVDAKL EAICKSMAET  240
EKQEKTTKAS KKRASTAAVK AEENSNSIGE SPPMTELVES AGSSPLSELT FADAEEQPQW  300
NETFALEKYP SYEIDWDSIL P                                            321

SEQ ID NO: 40          moltype = AA  length = 317
FEATURE                Location/Qualifiers
source                 1..317
                       mol_type = protein
                       organism = Panicum hallii
SEQUENCE: 40
MAANVGGKSV GGGAGGGGTG GAVTACRASG SRWTPTPEQI RILKELYYGC GIRSPNSEQI  60
QRITAMLRQH GKIEGKNVFY WFQNHKARER QKRRLTNLDV NVPAAVDASH LGALSLSSPS  120
GAAPPSSPLG LYPSNGGGST LQLDTSSDWG SATAMATETC FLQDYMGVMR STGGHHGSSA  180
GAAVSPWACL SSSDSWAAVA PTTTRAPETL PLFPTGDSSH PQRPRHGAPA PTGDAIRGGS  240
SSGYLPTLPF WGAAATAATT TTSVTIQQQH HQLLQLQEQY SFNTTTSQPP SQDASAATAS  300
LELSLSSWCS PYTAGTM                                                 317
```